United States Patent
Converso et al.

(10) Patent No.: US 12,492,183 B2
(45) Date of Patent: Dec. 9, 2025

(54) TETRAHYDROQUINAZOLINE DERIVATIVES AS SELECTIVE CYTOTOXIC AGENTS

(71) Applicant: Merck Sharp & Dohme LLC, Rahway, NJ (US)

(72) Inventors: Antonella Converso, Elkins, PA (US); David N. Hunter, Hatfield, PA (US); Abdellatif El Marrouni, Ambler, PA (US); Anthony J. Roecker, Harleysville, PA (US); Anthony W. Shaw, Harleysville, PA (US); William D. Shipe, Chalfont, PA (US); Cheng Wang, Fort Washington, PA (US); Deping Wang, Sharon, MA (US); Yunlong Zhang, Valhalla, NY (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 400 days.

(21) Appl. No.: 18/254,917

(22) PCT Filed: Dec. 6, 2021

(86) PCT No.: PCT/US2021/061944
§ 371 (c)(1),
(2) Date: May 30, 2023

(87) PCT Pub. No.: WO2022/125412
PCT Pub. Date: Jun. 16, 2022

(65) Prior Publication Data
US 2024/0043402 A1 Feb. 8, 2024

Related U.S. Application Data
(60) Provisional application No. 63/123,846, filed on Dec. 10, 2020.

(51) Int. Cl.
| | | |
|---|---|---|
| C07D 401/10 | (2006.01) | |
| A61P 31/18 | (2006.01) | |
| C07D 239/82 | (2006.01) | |
| C07D 403/10 | (2006.01) | |

(52) U.S. Cl.
CPC ........... *C07D 401/10* (2013.01); *A61P 31/18* (2018.01); *C07D 239/82* (2013.01); *C07D 403/10* (2013.01)

(58) Field of Classification Search
CPC .. C07D 401/10; C07D 239/82; C07D 403/10; A61P 31/18
See application file for complete search history.

(56) References Cited

U.S. PATENT DOCUMENTS

| | | | |
|---|---|---|---|
| 4,764,512 | A | 8/1988 | Molino et al. |
| 6,124,302 | A | 9/2000 | Corbett et al. |
| 6,127,375 | A | 10/2000 | Corbett |
| 2001/0044540 | A1 | 11/2001 | Parsons et al. |
| 2003/0092722 | A1 | 5/2003 | Corbett et al. |
| 2008/0176830 | A1 | 7/2008 | Adams et al. |

FOREIGN PATENT DOCUMENTS

WO 2022046844 A1 3/2022

OTHER PUBLICATIONS

Corbett, Jeffrey W. et al., Inhibition of Clinically Relevant Mutant Variants of HIV-1 by Quinazolinone Non-Nucleoside Reverse Transcriptase Inhibitors, J. Med. Chem., 43, 2019-2030, 2000.
Gomez, Design and synthesis of pyridone inhibitors of non-nucleoside reverse transcriptase, Bioorganic and Medicinal Chemistry Letters, 21, 7344-7350, 2011.
Hennequin, Laurent F. et al., Novel 4-Anilinoquinazolines with C-7 Basic Side Chains: Design and Structure Activity Relationship of a Series of Potent, Orally Active, VEGF Receptor Tyrosine Kinase Inhibitors, J. Med. Chem., 45, 1300-1312, 2002.
Jochmans, Dirk et al., Selective killing of human immunodeficiency virus infected cells by non-nucleoside reverse transcriptase inhibitor-induced activation of HIV protease, Retrovirology, 7:89, 1-14, 2010.
Sweeney, Z.K., et al., "Discovery Of Triazolinone Non-Nucleoside Inhibitors Of HIV Reverse Transcriptase", Bioorganic & Medicinal Chemistry Letters, vol. 18, No. 15, pp. 4348-4351, Aug. 1, 2008.

*Primary Examiner* — Rebecca L Anderson
(74) *Attorney, Agent, or Firm* — Patricia A. Shatynski; John C. Todaro

(57) ABSTRACT

The present disclosure is directed to tetrahydroquinazoline derivatives of Formula (I) and their use for selectively killing HIV infected GAG-POL expressing cells without concomitant cytotoxicity to HIV naive cells, and for the treatment or prophylaxis of infection by HIV, or for the treatment, prophylaxis or delay in the onset or progression of AIDS or AIDS Related Complex (ARC).

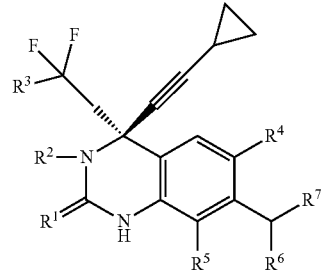

25 Claims, No Drawings

TETRAHYDROQUINAZOLINE DERIVATIVES AS SELECTIVE CYTOTOXIC AGENTS

CROSS-REFERENCE TO RELATED APPLICATIONS

This application is a U.S. National Stage application of International Patent Application No. PCT/US21/061944, filed Dec. 6, 2021, which claims priority to U.S. Provisional Patent Application No. 63/123,846, filed Dec. 10, 2020.

BACKGROUND OF THE INVENTION

Human immunodeficiency virus (HIV) is the causative agent of acquired immunodeficiency syndrome (AIDS). In the absence of viral suppression, people living with HIV exhibit severe immunodeficiency which makes them highly susceptible to debilitating and ultimately fatal opportunistic infections. Multiple clinically approved antiretroviral drugs are available which demonstrate multi-log reductions in viral loads. Treated patients are at risk for acquiring mutations which render the virus in their bodies resistant to available therapies and rapid rebound of viremia is seen when therapy is removed, indicating that current regimens are not curative.

HIV is a retrovirus whose life cycle involves reverse transcription of a viral RNA genome into DNA via an enzyme known as reverse transcriptase and subsequent integration of the DNA copy into the host chromosomal DNA via the virally encoded integrase. Viral RNA is transcribed and viral proteins are translated using the host cellular machinery in conjunction with viral accessory proteins. Many viral proteins are contained within the GAG and GAG-POL polyproteins, with GAG containing structural proteins and GAG-POL resulting from a frameshift near the carboxy-terminus of GAG and containing protease (PR), reverse transcriptase (RT), and integrase (IN) viral enzymes, in addition to the structural proteins. GAG and GAG-POL are cleaved into individual proteins through the process of maturation which occurs during budding of virions from the infected cell. At this time GAG-POL dimerizes and the now dimeric HIV PR within the GAG-POL dimer forms an active enzyme which can cleave itself out of the polyprotein and catalyze further cleavage to form the remaining viral enzymes and structural proteins.

Available antiretroviral drugs act by blocking the virus at different stages in the viral life cycle. For example, reverse transcriptase inhibitors target the viral reverse transcriptase and prevent the RNA genome from being copied into DNA, integrase inhibitors block the ability of the copied DNA from being integrated into the host cell, and protease inhibitors prevent viral maturation so that virions produced from cells treated with protease inhibitors are immature and non-infectious. Once integration has occurred, a cell is infected until it dies through either normal cell death pathways, accelerated death due to viral factors, or is targeted by the immune system. While most infected cells are expected to die within ~2 days of being infected, the rapid rebound of viremia when therapy is removed is an indication that infected cells remain even after years on therapy (See, e.g., J. B. Dinoso et al., Proc. Natl. Acad. Sci. U.S.A., 2009, 106(23): 9403-9408). These latently infected and/or persistently virus-expressing cells that remain even during anti-retroviral therapy are collectively termed the HIV reservoir and are the reason that people living with HIV require life-long treatment with a high level of adherence to maintain virus at undetectable levels. Thus, new therapies that can selectively kill the HIV infected cells would provide new treatment options for HIV infection. Treatment with compounds that can accelerate death of HIV infected cells and decrease the overall number of virally infected cells that persist within patients has the potential to decrease residual viremia in HIV suppressed individuals and address co-morbidities associated with chronic viral infection such as chronic inflammation, immune dysfunction, accelerated aging, cardiovascular disease (CVD), central nervous system (CNS) and other tissue and end-organ damage. Furthermore, treatment with compounds that can purge the remaining HIV reservoir may prolong viral remission off therapy and play a role in an HIV cure strategy.

SUMMARY OF THE INVENTION

The present disclosure is directed to tetrahydroquinazoline derivatives and their use as HIV-Targeted Activator of Cell Kill agents which accelerate the death of HIV GAG-POL expressing cells without concomitant cytotoxicity to HIV naïve cells. Accordingly, the compounds are useful for selectively killing HIV infected, GAG-POL expressing cells in a subject infected with HIV. Additionally, the compounds disclosed herein are useful for the treatment or prophylaxis of infection by HIV, or for the treatment, prophylaxis or delay in the onset or progression of AIDS or AIDS Related Complex (ARC). Compositions and methods of use comprising the compounds of this disclosure are also provided.

DETAILED DESCRIPTION OF THE INVENTION

The present disclosure is directed to tetrahydroquinazoline derivative compounds and their use for accelerating the death of HIV GAG-POL expressing cells without concomitant cytotoxicity to HIV naïve cells. In the absence of compounds such as those from the present disclosure, protease (PR) activation takes place during viral maturation and the concentration of mature PR in the cytoplasm is limited. In contrast, the present compounds promote the desired phenotype by catalyzing GAG-POL dimerization inside the infected cell by binding to the immature RT binding site and triggering premature activation of the HIV PR enzyme inside the host infected cell prior to budding. As a result, PR cleaves host substrates within the cell, leading to cytotoxicity and cell death. This effect can be blocked in the presence of an HIV protease inhibitor such as indinavir or darunavir demonstrating the role of HIV protease in the process.

The compounds presently disclosed herein also have activity as Non-Nucleoside Reverse Transcriptase Inhibitors (NNRTIs), due to the homology between the mature and immature RT pocket in HIV that allows the compounds to bind to the mature hydrophobic pocket near the active site of the viral RT enzyme. Binding to mature RT results in inhibition of enzymatic activity and production of the DNA provirus, which prevents infection of naïve CD4+ T-cells.

While effects of NNRTIs on dimerization of RT and GAG-POL have been documented (Tachedjian et al. Proc. Natl. Acad. Sci. U.S.A. 2001, 98(13):7188; Tachedjian et al. FEBS Lett. 2005, 579:379; Figueiredo et al. PLOS Path. 2006, 2(11):1051; Sudo et al. J. Virol. 2013, 87(6):3348), selective killing of HIV infected cells as a result of enhanced dimerization was first reported by Jochmans et al. (Jochmans et al. Retrovirology 2010, 7:89). The authors generated data showing these effects in chronically infected MT-4 cells, PBMCs, and CD4+ cells. Based on the potencies of tested molecules they concluded that "These data present proof of concept for targeted drug induced elimination of HIV producing cells. While NNRTIs themselves may not be sufficiently potent for therapeutic application, the results provide a basis for the development of drugs exploiting this mechanism of action." More recently, Zerbato et al. (Zerbato et al. Antimicrob. Agents Chemother. 2017, 61(3)) measured the activity of NNRTIs in a primary cell model for HIV latency. They saw significant reduction in virus production for certain NNRTIs compared to other classes of antiretrovirals and inferred that this was due to these compounds' ability to eliminate cells expressing HIV GAG-POL proteins. More recently, in their paper Trinité et al. (Trinité et al., Retrovirology, 2019, 16(17)) stated that NNRTI-induced PR-activation triggers apoptotic cell death of productively HIV-infected resting or activated T-cells.

The present disclosure is directed to a compound of Formula I

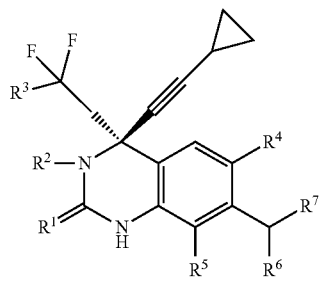

or a pharmaceutically acceptable salt thereof, wherein:
$R^1$ is O or S;
$R^2$ is —H or —$C_{1-8}$alkyl unsubstituted or substituted with 1 to 17 of F;
$R^3$ is halo or —$C_{1-8}$alkyl unsubstituted or substituted with 1 to 17 of F;
$R^4$ is —H, halo, or —$C_{1-8}$alkyl;
$R^5$ is —H or halo;
$R^6$ is —H or halo; and
$R^7$ is a 6-membered ring selected from
(a) phenyl and
(b) heteroaryl comprised of carbon atoms and 1, 2 or 3 nitrogen (N) atoms wherein one of the nitrogen atoms may optionally be in the form of an N-oxide, wherein the heteroaryl ring is attached by a carbon atom in the ring to the adjacent carbon atom in —C($R^6$)—, and wherein the ring is unsubstituted or substituted with one or more substituents up to the maximum number allowed by valence, independently selected at each occurrence from:
(i) halo, (ii) —CN, (iii) —$NR^{8a}R^{9a}$, (iv) —S(O)$_2$$NR^{8b}R^{9b}$, (v) —C(O)$NR^{8c}R^{9c}$,
(vi) —S(O)$_2$$C_{1-8}$alkyl, (vii) oxo (═O),
(viii) —$C_{1-8}$alkyl unsubstituted or substituted with 1 to 8 substituents independently selected at each occurrence from —OH and halo (e.g., F, Cl or Br),
(ix) —O—($C_{1-8}$alkyl) unsubstituted or substituted with 1 to 8 substituents independently selected at each occurrence from —OH and halo (e.g., F, Cl or Br), and
(x) —$C_{3-6}$cycloalkyl unsubstituted or substituted with 2 to 5 substituents independently selected at each occurrence from —OH and halo; and $R^{8a}$, $R^{8b}$, $R^{8c}$, $R^{9a}$, $R^{9b}$ and $R^{9c}$ are each independently selected at each occurrence from —H and $C_{1-8}$alkyl unsubstituted or substituted with 1 to 8 substituents independently selected at each occurrence from —OH and halo.

In Embodiment 1 of this disclosure are compounds of Formula I, or pharmaceutically acceptable salts thereof, wherein $R^2$ is —H or an alkyl group selected from —$C_{1-6}$alkyl, —$C_{1-5}$alkyl, —$C_{1-4}$alkyl, or —$C_{1-3}$alkyl wherein the alkyl group is unsubstituted or substituted with one or more of —F up to the maximum number allowed by valence (for example but not limited to, —$C_{1-6}$alkyl unsubstituted or substituted with 1 to 13 of F). In a class thereof, $R^2$ is —H, or —$C_{1-6}$alkyl, —$C_{1-5}$alkyl, —$C_{1-4}$alkyl, or —$C_{1-3}$alkyl unsubstituted or substituted with 1, 2, 3, 4, 5, 6 or 7 of —F.

In Embodiment 2 of this disclosure are compounds of Formula I or Embodiment 1, and each class thereof, or pharmaceutically acceptable salts thereof, wherein $R^3$ is halo or an alkyl group selected from —$C_{1-6}$alkyl, —$C_{1-5}$alkyl, —$C_{1-4}$alkyl, or —$C_{1-3}$alkyl wherein the alkyl group is unsubstituted or substituted with one or more of halo up to the maximum number allowed by valence (for example but not limited to, —$C_{1-6}$alkyl unsubstituted or substituted with 1 to 13 of F). In a $1^{st}$ class thereof, $R^3$ is —F, —Cl, —Br or —$C_{1-3}$alkyl; in a $2^{nd}$ class thereof $R^3$ is —F, —Cl or —$C_{1-3}$alkyl; and in a $3^{rd}$ class thereof $R^3$ is F or —$CH_3$.

In Embodiment 3 of this disclosure are compounds of Formula I, Embodiment 1 or Embodiment 2, and each class thereof, or pharmaceutically acceptable salts thereof, wherein $R^4$ is —H, halo (e.g. F, Cl or Br) or —$C_{1-6}$alkyl. In a $1^{st}$ class thereof $R^4$ is —H, F, Cl, Br, —CN, or —$C_{1-3}$alkyl; and in a $2^{nd}$ class thereof $R^4$ is H, F, Cl, or —$CH_3$.

In Embodiment 4 of this disclosure are compounds of Formula I, Embodiment 1, Embodiment 2, or Embodiment 3, and each class thereof, or pharmaceutically acceptable salts thereof, wherein $R^5$ is —H, F, Cl or Br; or in a class thereof $R^5$ is —H or F.

In Embodiment 5 of this disclosure are compounds of Formula I, Embodiment 1, Embodiment 2, Embodiment 3, or Embodiment 4, and each class thereof, or pharmaceutically acceptable salts thereof, wherein $R^6$ is —H, F, Cl or Br; or in a class thereof $R^6$ is —H or F.

In Embodiment 6 of this disclosure are compounds of Formula I, Embodiment 1, Embodiment 2, Embodiment 3, Embodiment 4 or Embodiment 5, and each class thereof, or pharmaceutically acceptable salts thereof, wherein $R^1$ is O.

In Embodiment 7 of this disclosure are compounds of Formula I, Embodiment 1, Embodiment 2, Embodiment 3, Embodiment 4 or Embodiment 5, and each class thereof, or pharmaceutically acceptable salts thereof, wherein $R^1$ is S.

In Embodiment 8 of this disclosure are compounds of Formula I, Embodiment 1, Embodiment 2, Embodiment 3, Embodiment 4, Embodiment 5, Embodiment 6 or Embodiment 7, and each class thereof, or pharmaceutically acceptable salts thereof, wherein $R^7$ is selected from phenyl, pyridine, pyridinone, pyridine n-oxide, pyrimidine, pyrimidinone, pyrazine and triazine, and wherein each 6-membered ring is unsubstituted or substituted as defined in Formula I.

In Embodiment 9 of this disclosure are compounds of Formula I, Embodiment 1, Embodiment 2, Embodiment 3, Embodiment 4, Embodiment 5, Embodiment 6, Embodiment 7 or Embodiment 8, and each class thereof, or pharmaceutically acceptable salts thereof, wherein $R^7$ is selected from:

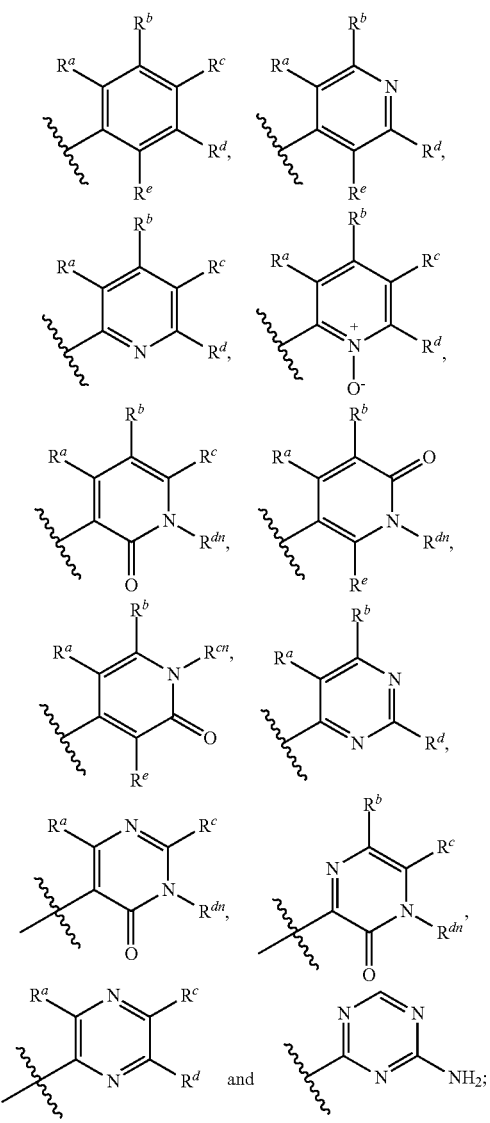

$R^a$ is (i) —H or (ii) —$C_{1-6}$alkyl (e.g., —$C_{1-3}$alkyl or —$CH_3$), or (iii) halo (e.g., F or Cl);

$R^b$ is (i) —H, (ii) halo, (e.g., —F or —Cl), (iii) —CN, or (iv) —$C_{1-6}$alkyl (e.g., —$C_{1-3}$alkyl or —$CH_3$);

$R^c$ is (i) —H, (ii) —$C_{1-6}$alkyl (e.g., —$C_{1-3}$alkyl or —$CH_3$) unsubstituted or substituted with —OH (e.g., —$C_{1-6}$alkyl-OH, —$C_{1-3}$alkyl-OH, —$CH_2OH$ or —$(CH_2)_2$—OH), (iii) —$OC_{1-6}$alkyl (e.g., $OC_{1-3}$alkyl or —$OCH_3$) unsubstituted or substituted with —OH (e.g., —$OC_{1-6}$alkyl-OH, —$OC_{1-3}$alkyl-OH, —$O(CH_2)_2$—OH or —$OCH_2OH$); (iv) —$SO_2NR^8R^9$ (e.g. —$SO_2NH_2$), (v) $SO_2$—$C_{1-3}$alkyl (e.g., —$SO_2CH_3$) or (vi) —C(O)$NR^8R^9$ (e.g., —C(O)$NH_2$);

$R^{cn}$ is —H or —$C_{1-3}$alkyl (e.g., —$CH_3$);

$R^d$ is (i) —H, (ii) —$NR^8R^9$, (e.g., —$NH_2$) or (iii) —$C_{1-6}$alkyl, (e.g., —$C_{1-3}$alkyl or —$CH_3$);

$R^{dn}$ is —H or —$C_{1-3}$alkyl (e.g., —$CH_3$); and $R^e$ is (i) —H, (ii) halo (e.g., —F or —Cl), (iii) —CN or (iv) —C(O)$NR^8R^9$ (e.g., —C(O)$NH_2$).

In Embodiment 10 of this disclosure are compounds of Formula I, Embodiment 1, Embodiment 2, Embodiment 3, Embodiment 4, Embodiment 5, Embodiment 6, Embodiment 7, Embodiment 8 or Embodiment 9, and each class thereof, or pharmaceutically acceptable salts thereof, wherein $R^{8a}$, $R^{8b}$, $R^{8c}$, $R^{9a}$, $R^{9b}$ and $R^{9c}$ are each independently selected from —H or —$C_{1-6}$alkyl unsubstituted or substituted with 1 to 6 substituents independently selected at each occurrence from —OH and halo. In a 1$^{st}$ class thereof, each of $R^{8a}$, $R^{8b}$, $R^{8c}$, $R^{9a}$, $R^{9b}$ and $R^{9c}$ is independently selected at each occurrence from —H and —$C_{1-3}$alkyl unsubstituted or substituted with 1 to 3 substituents independently selected at each occurrence from —OH and halo; and in a 2$^{nd}$ class thereof, each is selected from —H and $CH_3$. In a 3$^{rd}$ class of this Embodiment, halo is F or Cl.

In Embodiment 11 of this disclosure are compounds as defined in Formula I and/or Embodiment 1, and/or Embodiment 2, and/or Embodiment 3, and/or Embodiment 4, and/or Embodiment 5, and/or Embodiment 6, and/or Embodiment 7, and/or Embodiment 8, and/or Embodiment 9, and/or Embodiment 10, and/or each class thereof, or the pharmaceutically acceptable salts of the foregoing compounds.

In Embodiment 12 of this disclosure are compounds of Formula I, or pharmaceutically acceptable salts therof, wherein:

$R^1$ is O or S;

$R^2$ is —H or —$C_{1-3}$alkyl unsubstituted or substituted with 1 to 3 of F;

$R^3$ is halo (e.g. —F) or —$C_{1-3}$alkyl (e.g., —$CH_3$);

$R^4$ is —H, —$C_{1-3}$alkyl (e.g., —$CH_3$) or halo (e.g. —F or —Cl);

$R^5$ is —H or halo (e.g. —F);

$R^6$ is —H or halo (e.g. —F); and $R^7$ is selected from

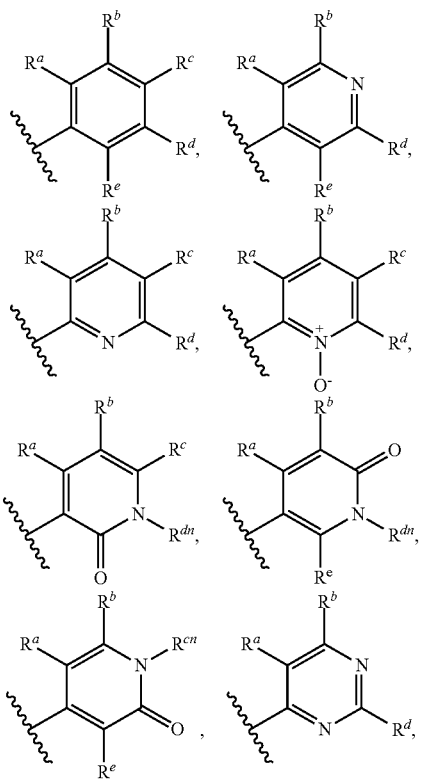

-continued

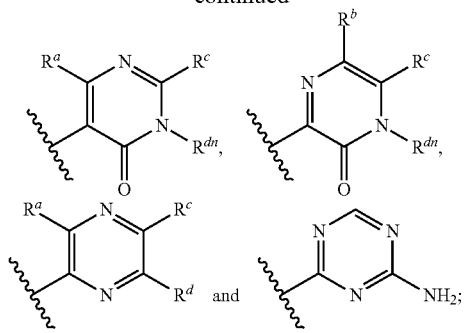

and

Rᵃ is —H, —$C_{1-3}$alkyl (e.g., —$CH_3$), or halo (e.g., F or Cl);
Rᵇ is —H, halo, (e.g., —F or —Cl), —CN, or —$C_{1-3}$alkyl (e.g., —$CH_3$);
Rᶜ is (i) —H, (ii) —$C_{1-3}$alkyl (e.g. —$CH_3$) unsubstituted or substituted with —OH, (iii) —$OC_{1-3}$alkyl (e.g., —$O(CH_2)_2$alkyl or —$OCH_3$) unsubstituted or substituted with —OH (e.g., —$OC_{1-3}$alkyl-OH, —$O(CH_2)_2$—OH or —$OCH_2OH$); (iv) —$SO_2NR^8R^9$ (e.g., —$SO_2NH_2$), (v) $SO_2$—$C_{1-3}$alkyl (e.g., —$SO_2CH_3$) or (vi) —$C(O)NR^8R^9$ (e.g., —$C(O)NH_2$);
Rᶜⁿ is —H or —$C_{1-3}$alkyl (e.g., —$CH_3$);
Rᵈ is (i) —H, (ii) —$NR^8R^9$, (e.g., —$NH_2$) or (iii) —$C_{1-3}$alkyl, (e.g., —$CH_3$),
Rᵈⁿ is —H or —$C_{1-3}$alkyl (e.g., —$CH_3$);
Rᵉ is (i) —H, (ii) halo (e.g., —F or —Cl), (iii) —CN or (iv) —$C(O)NR^8R^9$ (e.g., —$C(O)NH_2$); and
$R^{8a}$, $R^{8b}$, $R^{8c}$, $R^{9a}$, $R^{9b}$ and $R^{9c}$ are as defined in Formula I; or $R^{8a}$, $R^{8b}$, $R^{8c}$, $R^{9a}$, $R^{9b}$ and $R^{9c}$ are as defined in Embodiment 10 and in the classes thereof.

In Embodiment 13 of this disclosure is a compound of Formula I having the following Formula II,

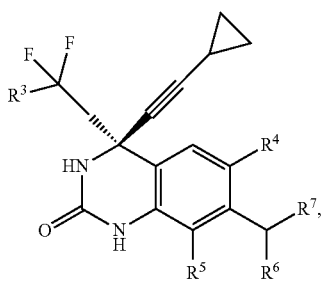

II or a pharmaceutically acceptable salt thereof, wherein:
$R^3$ is defined as in Formula I; or in a 1ˢᵗ class thereof $R^3$ is halo or an alkyl group selected from —$C_{1-6}$alkyl, —$C_{1-5}$alkyl, —$C_{1-4}$alkyl, or —$C_{1-3}$alkyl wherein the alkyl group is unsubstituted or substituted with one or more of halo up to the maximum number allowed by valence; or in a 2ⁿᵈ class thereof $R^3$ is —F, —Cl, —Br or —$C_{1-3}$alkyl; or in a 3ʳᵈ class thereof $R^3$ is —F or —$C_{1-3}$alkyl; or in a 4ᵗʰ class thereof $R^3$ is F or —$CH_3$; and/or
$R^4$ is defined as in Formula I; or in a 1ˢᵗ class thereof $R^4$ is —H, halo (e.g. F, Cl or Br), or —$C_{1-6}$alkyl or in a 2ⁿᵈ class thereof $R^4$ is —H, F, Cl, Br, —CN, or —$C_{1-3}$alkyl; or in a 3ʳᵈ class thereof $R^4$ is H, F, Cl, or —$CH_3$; and/or $R^5$ is defined as in Formula I; or in a 1ˢᵗ class thereof $R^5$ is —H, F, Cl or Br; or in a 2ⁿᵈ class thereof $R^5$ is —H or F; and/or
$R^6$ is defined as in Formula I; or in a 1ˢᵗ class thereof $R^6$ is —H, F, Cl or Br; or in a 2ⁿᵈ class thereof $R^6$ is —H or F; and/or
$R^7$ is defined as in Formula I; or in a 1ˢᵗ class thereof $R^7$ is selected from phenyl, pyridine, pyridinone, pyridine n-oxide, pyrimidine, pyrimidinone, pyrazine and triazine, wherein each 6-membered ring is unsubstituted or substituted with the substituents as defined in Formula I; or in a 2ⁿᵈ class thereof $R^7$ is selected from:

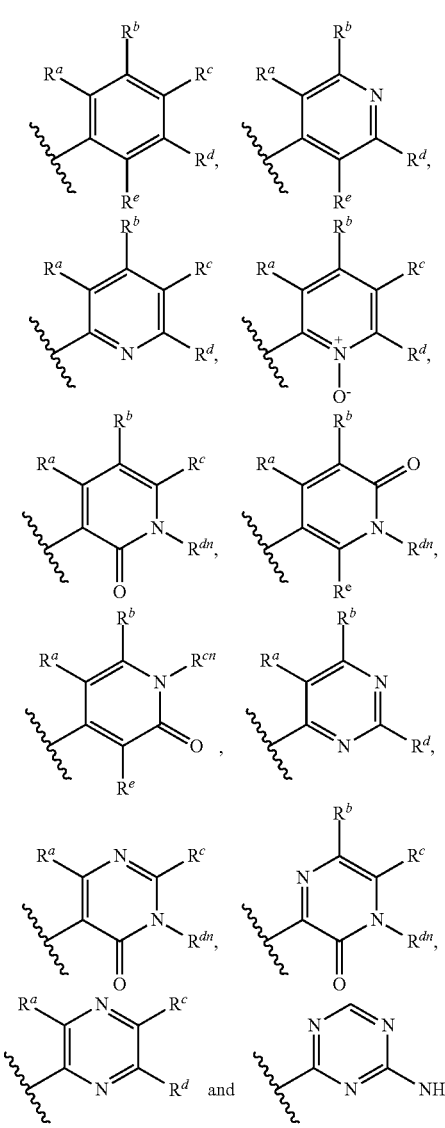

and
Rᵃ is (i) —H, (ii) halo (e.g., F or Cl), or (iii) —$C_{1-6}$alkyl (e.g., —$C_{1-3}$alkyl or —$CH_3$);
Rᵇ is (i) —H, (ii) halo, (e.g., —F or —Cl), (iii) —CN, or (iv) —$C_{1-6}$alkyl (e.g., —$C_{1-3}$alkyl or —$CH_3$);
Rᶜ is (i) —H, (ii) —$C_{1-6}$alkyl (e.g., —$C_{1-3}$alkyl or —$CH_3$) unsubstituted or substituted with —OH (e.g., —$C_{1-6}$alkyl-OH, —$C_{1-3}$alkyl-OH, —$CH_2OH$ or —$(CH_2)_2$—OH), (iii) —OC$_{1-6}$alkyl (e.g., —OC$_{1-3}$alkyl or —OCH$_3$) unsubstituted or substituted with —OH (e.g., —OC$_{1-6}$alkyl-OH, —OC$_{1-3}$alkyl-OH, —O(CH$_2$)$_2$—OH or —OCH$_2$OH), (iv) —SO$_2$NR$^8$R$^9$ (e.g. —SO$_2$NH$_2$), (v) SO$_2$—C$_{1-3}$alkyl (e.g., —SO$_2$CH$_3$) or (vi) —C(O)NR$^8$R$^9$ (e.g., —C(O)NH$_2$);

R$^{cn}$ is —H or —C$_{1-3}$alkyl (e.g., —CH$_3$);

R$^d$ is (i) —H, (ii) —NR$^8$R$^9$, (e.g., —N(CH$_3$)$_2$, —NH(CH$_3$), —NH$_2$) or (iii) —C$_{1-6}$alkyl, (e.g., —C$_{1-3}$alkyl or —CH$_3$), R$^{dn}$ is —H or —C$_{1-3}$alkyl (e.g., —CH$_3$); and R$^e$ is (i) —H, (ii) halo (e.g., —F or —Cl), (iii) CN or (iv) —C(O)NR$^8$R$^9$ (e.g., —C(O)N(CH$_3$)$_2$, —C(O)NH(CH$_3$), or —C(O)NH$_2$); and R$^{8a}$, R$^{8b}$, R$^{8c}$, R$^{9a}$, R$^{9b}$ and R$^{9c}$ are as defined in Formula I; or R$^{8a}$, R$^{8b}$, R$^{8c}$, R$^{9a}$, R$^{9b}$ and R$^{9c}$ are as defined in Embodiment 10 and classes thereof.

In Embodiment 14 of this disclosure are compounds of Formula II, or the pharmaceutically acceptable salts therof, wherein:

R$^3$ is —C$_{1-3}$alkyl (e.g., —CH$_3$) or halo (e.g. —F);

R$^4$ is —H, —C$_{1-3}$alkyl (e.g., —CH$_3$) or halo (e.g. —F or —Cl);

R$^5$ is —H or halo (e.g. —F);

R$^6$ is —H or halo (e.g. —F); and

R$^7$ is selected from

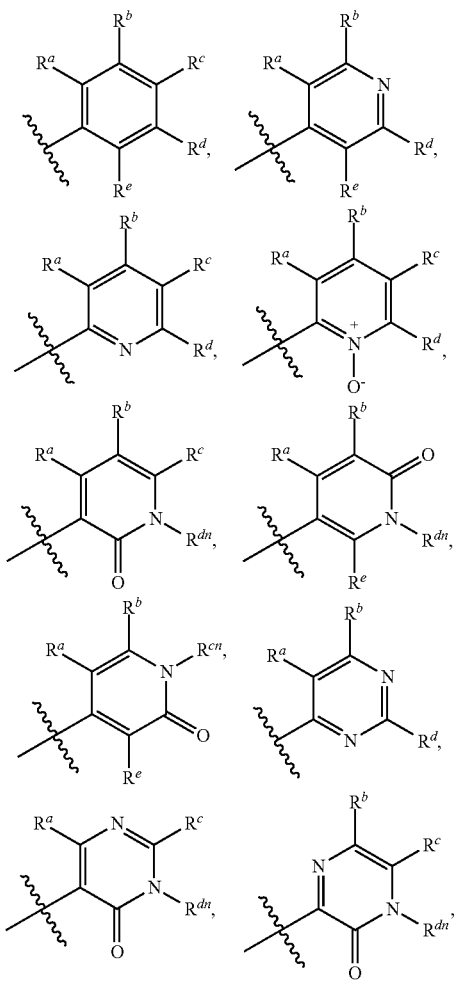

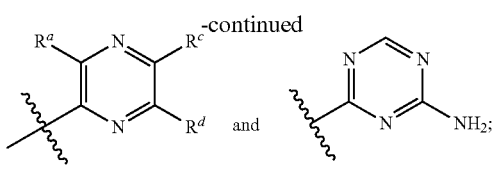

and

R$^a$ is —H, halo (e.g., F or Cl), or —C$_{1-3}$alkyl (e.g., —CH$_3$);

R$^b$ is —H, halo, (e.g., —F or —Cl), —CN, or —C$_{1-3}$alkyl (e.g., —CH$_3$);

R$^c$ is (i) —H, (ii) —C$_{1-3}$alkyl (e.g., —CH$_3$) unsubstituted or substituted with —OH, (iii) —OC$_{1-3}$alkyl (e.g., —O(CH$_2$)$_2$alkyl or —OCH$_3$) unsubstituted or substituted with —OH (e.g., —OC$_{1-3}$alkyl-OH, —O(CH$_2$)$_2$—OH or —OCH$_2$OH); (iv) —SO$_2$NR$^8$R$^9$ (e.g. —SO$_2$NH$_2$), (v) SO$_2$—C$_{1-3}$alkyl (e.g., —SO$_2$CH$_3$) or (vi) —C(O)NR$^8$R$^9$ (e.g., —C(O)NH$_2$);

R$^{cn}$ is —H or —C$_{1-3}$alkyl (e.g., —CH$_3$);

R$^d$ is —H, —NR$^8$R$^9$, (e.g., —NH$_2$) or —C$_{1-3}$alkyl, (e.g., —CH$_3$),

R$^{dn}$ is —H or —C$_{1-3}$alkyl (e.g., —CH$_3$);

R$^e$ is —H, halo (e.g., —F or —Cl), CN or (iv) —C(O)NR$^8$R$^9$ (e.g., —C(O)NH$_2$) and R$^{8a}$, R$^{8b}$, R$^{8c}$, R$^{9a}$, R$^{9b}$ and R$^{9c}$ are each independently selected at each occurrence from —H and —C$_{1-3}$alkyl (e.g., —CH$_3$) unsubstituted or substituted with 1 to 3 substituents independently selected at each occurrence from —OH and halo (e.g., F and Cl).

This disclosure is directed to the compounds of Formula I herein and encompasses the compounds of Formula I and II, and all embodiments, examples, classes and sub-classes thereof and includes the compounds of the Examples herein. The disclosure is further directed to compounds of Formula I which are neutral compounds or salts thereof when such salts are possible, including pharmaceutically acceptable salts.

The term "e.g." means "for example." When the terms "e.g.," or "for example" are used herein, the example(s) recited are intended to be illustrative and are not intended to be an exhaustive list of all relevant examples. The term "i.e." means "that is."

As used herein, "alkyl" refers to both branched- and straight-chain saturated aliphatic hydrocarbon groups having the specified number of carbon atoms in a specified range. For example the term "C$_{1-6}$alkyl" means linear or branched chain alkyl groups, including each of the possible isomers, having 1, 2, 3, 4, 5 or 6 carbon atoms (and each of —C$_{1-6}$alkyl, —C$_{1-5}$alkyl, —C$_{1-4}$alkyl, —C$_{1-3}$alkyl), and includes each of the n-hexyl, n-pentyl and the pentyl and hexyl isomers, as well as n-, iso-, sec- and tert-butyl (butyl, i-butyl, s-butyl, t-butyl, collectively "C$_4$alkyl"; Bu=butyl), each of n- and iso-propyl (propyl, i-propyl, collectively "C$_3$alkyl"; Pr=propyl), ethyl (Et) and methyl (Me). "C$_{1-3}$alkyl" has 1, 2 or 3 carbon atoms and includes each of n-propyl, i-propyl, ethyl and methyl. "C$_{1-4}$alkyl" has 1, 2, 3 or 4 carbon atoms and includes each of n-, i-, s- and t-butyl, n- and i-propyl, ethyl and methyl. "C$_{1-5}$alkyl" includes the "C$_{1-4}$alkyl" groups plus the linear and branched chain alkyls having 5 carbons in the chain. "C$_{1-8}$alkyl" includes the "C$_{1-6}$alkyl" groups plus the linear and branched chain alkyls having 7 or 8 carbons in the chain.

"Cycloalkyl" refers to a cyclized alkyl ring having the indicated number of carbon atoms in a specified range. Thus, for example, "C$_{3-6}$cycloalkyl" includes each of cyclopropyl, cyclobutyl, cyclopentyl and cyclohexyl, and "$C_{3-4}$cycloalkyl" includes each of cyclopropyl and cyclobutyl.

"Halo" or "halogen" refers to chloro, fluoro, bromo or iodo. Chloro, fluoro and bromo are a class of halogens of interest, and more particularly fluoro and chloro.

"HIV naïve cell(s)" are cells that are not infected with HIV.

"Compatible anti-HIV agent(s)" are anti-HIV agents excluding HIV protease inhibitors.

A "latency reversing agent" (LRA) is a pharmaceutical agent capable of re-activating latent HIV (e.g., HIV-1) in an HIV (e.g., HIV-1) infected cell, particularly in a human.

A "stable" compound is a compound which can be prepared and isolated and whose structure and properties remain or can be caused to remain essentially unchanged for a period of time sufficient to allow use of the compound for the purposes described herein (e.g., therapeutic or prophylactic administration to a subject). The compounds of the present disclosure are limited to stable compounds embraced by Formula I and its embodiments. For example, certain moieties as defined in Formula I may be unsubstituted or substituted, and the latter is intended to encompass substitution patterns (i.e., number and kind of substituents) that are chemically possible for the moiety and that result in a stable compound.

This disclosure includes individual diastereomers, particularly epimers, i.e., compounds having the same chemical formula but which differ in the spatial arrangement around a single atom. This disclosure also includes mixtures of diastereomers, particularly mixtures of epimers, in all ratios. This disclosure encompasses compounds of Formula I having either the (R) or (S) stereo-configuration at an asymmetric center and at any additional asymmetric centers that may be present in a compound of Formula I, as well as stereo-isomeric mixtures thereof. Embodiments of this disclosure also include a mixture of enantiomers enriched with 51% or more of one of the enantiomers, including for example 60% or more, 70% or more, 80% or more, or 90% or more of one enantiomer. A single epimer is preferred. An individual or single enantiomer refers to an enantiomer obtained by chiral synthesis and/or using generally known separation and purification techniques, and which may be 100% of one enantiomer or may contain small amounts (e.g., 10% or less) of the opposite enantiomer. Thus, individual enantiomers are a subject of this disclosure in pure form, both as levorotatory and as dextrorotatory antipodes, in the form of racemates and in the form of mixtures of the two enantiomers in all ratios. In the case of a cis/trans isomerism this disclosure includes both the cis form and the trans form as well as mixtures of these forms in all ratios.

The preparation of individual stereoisomers can be carried out, if desired, by separation of a mixture by customary methods, for example by chromatography or crystallization, by the use of stereochemically uniform starting materials for the synthesis or by stereoselective synthesis. Optionally a derivatization can be carried out before a separation of stereoisomers. The separation of a mixture of stereoisomers can be carried out at an intermediate step during the synthesis of a compound of Formula I or it can be done on a final racemic product. Absolute stereochemistry may be determined by X-ray crystallography of crystalline products or crystalline intermediates which are derivatized, if necessary, with a reagent containing a stereogenic center of known configuration. Alternatively, absolute stereochemistry may be determined by Vibrational Circular Dichroism (VCD) spectroscopy analysis. The present disclosure includes all such isomers, as well as salts, solvates (which includes hydrates). and solvated salts of such racemates, enantiomers, diastereomers and tautomers and mixtures thereof.

As would be recognized by one of ordinary skill in the art, certain compounds of the present disclosure may be able to exist as tautomers. All tautomeric forms of such compounds, whether isolated individually or in mixtures, are within the scope of the present disclosure. For example, in instances where an oxo (=O) substituent is permitted on a heteroaryl ring and keto-enol tautomerism is possible, it is understood that the substituent might in fact be present, in whole or in part, in the —OH form. Examples of some tautomers of compounds herein include but are not limited to:

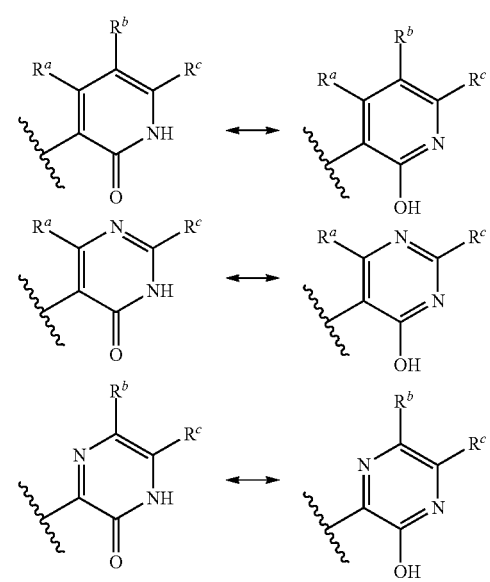

The atoms in a compound of Formula I may exhibit their natural isotopic abundances, or one or more of the atoms may be artificially enriched in a particular isotope having the same atomic number, but an atomic mass or mass number different from the atomic mass or mass number predominantly found in nature. The present disclosure is meant to include all suitable isotopic variations of the compounds of Formula I; for example, different isotopic forms of hydrogen (H) include protium ($^1$H) and deuterium ($^2$H). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds of Formula I can be prepared without undue experimentation by conventional techniques well known to those skilled in the art or by processes analogous to those described in the Schemes and Examples herein using appropriate isotopically-enriched reagents and/or intermediates.

The compounds can be administered in the form of pharmaceutically acceptable salts. The term "pharmaceutically acceptable salt" refers to a salt which possesses the effectiveness of the parent compound and which is not biologically or otherwise undesirable (e.g., is neither toxic nor otherwise deleterious to the recipient thereof). When the compounds of Formula I contain one or more acidic groups or basic groups, the compounds may also be in the form of the corresponding pharmaceutically acceptable salts.

Thus, the compounds of Formula I that contain acidic groups (e.g., —COOH) can be used according to this disclosure as, for example but not limited to, alkali metal salts, alkaline earth metal salts or as ammonium salts. Examples of such salts include but are not limited to sodium salts, potassium salts, calcium salts, magnesium salts or salts with ammonia or organic amines such as, for example, ethylamine, ethanolamine, triethanolamine or amino acids.

Compounds of Formula I, which contain one or more basic groups, i.e. groups which can be protonated (e.g., —NH$_2$), can be used according to the invention in the form of their acid addition salts with inorganic or organic acids as, for example but not limited to, salts with hydrogen chloride, hydrogen bromide, phosphoric acid, sulfuric acid, nitric acid, benzenesulfonic acid, methanesulfonic acid, p-toluenesulfonic acid, naphthalenedisulfonic acids, oxalic acid, acetic acid, trifluoroacetic acid, tartaric acid, lactic acid, salicylic acid, benzoic acid, formic acid, propionic acid, pivalic acid, diethylacetic acid, malonic acid, succinic acid, pimelic acid, fumaric acid, maleic acid, malic acid, sulfaminic acid, phenylpropionic acid, gluconic acid, ascorbic acid, isonicotinic acid, citric acid, adipic acid, etc. If the compounds of Formula I simultaneously contain acidic and basic groups in the molecule, the compounds may be in the form of inner salts or betaines (zwitterions) in addition to the salt forms mentioned above. Salts can be obtained from the compounds of Formula I by customary methods which are known to the person skilled in the art, for example by combination with an organic or inorganic acid or base in a solvent or dispersant, or by anion exchange or cation exchange from other salts. The present invention also includes all salts of the compounds of Formula I which, owing to low physiological compatibility, are not directly suitable for use in pharmaceuticals but which can be used, for example, as intermediates for chemical reactions or for the preparation of pharmaceutically acceptable salts.

The instant disclosure encompasses any composition comprised of a compound of Formula I or a compound that is a salt thereof, including for example but not limited to, a composition comprised of said compound associated together with one or more additional molecular and/or ionic component(s) which may be referred to as a "co-crystal." The term "co-crystal" as used herein refers to a solid phase (which may or may not be crystalline) wherein two or more different molecular and/or ionic components (generally in a stoichiometric ratio) are held together by non-ionic interactions including but not limited to hydrogen-bonding, dipole-dipole interactions, dipole-quadrupole interactions or dispersion forces (van der Waals). There is no proton transfer between the dissimilar components and the solid phase is neither a simple salt nor a solvate. A discussion of co-crystals can be found, e.g., in S. Aitipamula et al., *Crystal Growth and Design,* 2012, 12 (5), pp. 2147-2152.

Furthermore, compounds of the present disclosure may exist in amorphous form and/or one or more crystalline forms, and as such all amorphous and crystalline forms and mixtures thereof of the compounds of Formula I and salts thereof are intended to be included within the scope of the present disclosure. In addition, some of the compounds of the instant disclosure may form solvates with water (i.e., a hydrate) or common organic solvents. Such solvates and hydrates, particularly the pharmaceutically acceptable solvates and hydrates, of the compounds are likewise encompassed within the scope of the of the present disclosure and the pharmaceutically acceptable salts thereof, along with un-solvated and anhydrous forms of such compounds.

Accordingly, this disclosure is directed to compounds of Formula I or salts thereof including pharmaceutically acceptable salts thereof, embodiments thereof and specific compounds described and claimed herein, and encompasses all possible stereoisomers, tautomers, physical forms (e.g., amorphous and crystalline forms), co-crystal forms, solvate and hydrate forms, and any combination of the foregoing forms where such forms are possible.

Another embodiment of the present disclosure is a compound of Formula I wherein the compound or its salt is in a substantially pure form. As used herein "substantially pure" means suitably at least about 60 wt. %, typically at least about 70 wt. %, preferably at least about 80 wt. %, more preferably at least about 90 wt. % (e.g., from about 90 wt. % to about 99 wt. %), even more preferably at least about 95 wt. % (e.g., from about 95 wt. % to about 99 wt. %, or from about 98 wt. % to 100 wt. %), and most preferably at least about 99 wt. % (e.g., 100 wt. %) of a product containing a compound of Formula I or its salt (e.g., the product isolated from a reaction mixture affording the compound or salt) consists of the compound or salt. The level of purity of the compounds and salts can be determined using a standard method of analysis such as, high performance liquid chromatography, and/or mass spectrometry or NMR techniques. If more than one method of analysis is employed and the methods provide experimentally significant differences in the level of purity determined, then the method providing the highest purity level governs. A compound or salt of 100% purity is one which is free of detectable impurities as determined by a standard method of analysis. With respect to a compound herein which has one or more asymmetric centers and can occur as mixtures of stereoisomers, a substantially pure compound can be either a substantially pure mixture of the stereoisomers or a substantially pure individual stereoisomer.

The compounds of Formula I herein, and pharmaceutically acceptable salts thereof, are useful for eliciting GAG-POL dimerization in HIV-infected cells and thereby selectively killing HIV infected GAG-POL expressing cells without concomitant cytotoxicity to HIV naïve cells, referred to herein as TACK (Targeted Activator of Cell Kill) activity, or more specifically HIV TACK activity. HIV TACK or TACK have also been previously referred to as Small Molecule Activated Cell Kill (SMACK). Thus, the compounds of Formula I and pharmaceutically acceptable salts thereof can be useful for:

(i) A method for the treatment or prophylaxis of infection by HIV, or for the treatment, prophylaxis, or delay in the onset or progression of AIDS or ARC in a human subject in need thereof which comprises administering to the human subject an effective amount of the compound according to Formula I, or a pharmaceutically acceptable salt thereof; and/or (ii) A method for eliciting GAG-POL dimerization in HIV-infected cells in a human subject in need thereof which comprises administering to the human subject an effective amount of the compound according to Formula I, or a pharmaceutically acceptable salt thereof; and/or (iii) A method for selectively killing HIV infected GAG-POL expressing cells without concomitant cytotoxicity to HIV naïve cells in a human subject which comprises administering to the human subject an effective amount of the compound according to Formula I, or a pharmaceutically acceptable salt thereof, and/or (iv) A method for augmenting the suppression of HIV viremia in a human subject whose viremia is being suppressed by administration of one or more compatible HIV antiviral agents, which comprises additionally administering to the human subject an effective amount of the compound according to Formula I, or a pharmaceutically acceptable salt thereof.

Additionally, the compounds of Formula I or pharmaceutically acceptable salts thereof are useful for any of the methods (i), (ii), (iii) or (iv) above, further comprising administering to the human subject an effective amount of one or more compatible HIV antiviral agents selected from nucleoside or nucleotide HIV reverse transcriptase inhibitors, nucleoside reverse transcriptase translocation inhibitors, non-nucleoside HIV reverse transcriptase inhibitors, HIV integrase inhibitors, HIV fusion inhibitors, HIV entry inhibitors, HIV maturation inhibitors, post-attachment inhibitors and latency reversing agents. In the methods of (i), (ii), (iii) or (iv) immediately above, the human subject can be treated with a compound of Formula I, or a pharmaceutically acceptable salt thereof, in addition to treatment with one or more compatible HIV antiviral agents and/or latency reversing agents.

Other embodiments of the present disclosure include the following:

(a) A pharmaceutical composition comprising an effective amount of a compound of Formula I or a pharmaceutically acceptable salt thereof, and a pharmaceutically acceptable carrier.

(b) A pharmaceutical composition which comprises the product prepared by combining (e.g., mixing) an effective amount of a compound of Formula I or a pharmaceutically acceptable salt thereof, and a pharmaceutically acceptable carrier.

(c) The pharmaceutical composition of (a) or (b), further comprising an effective amount of one or more compatible anti-HIV agent selected from the group consisting of HIV antiviral agents, immunomodulators, anti-infective agents and latency reversing agents.

(d) The pharmaceutical composition of (c), wherein the compatible anti-HIV agent is selected from one or more of an antiviral selected from the group consisting of nucleoside or nucleotide HIV reverse transcriptase inhibitors, nucleoside HIV reverse transcriptase translocation inhibitors, non-nucleoside HIV reverse transcriptase inhibitors, HIV integrase inhibitors, HIV fusion inhibitors, HIV entry inhibitors, HIV maturation inhibitors, post-attachment inhibitors and latency reversing agents.

(e) A combination which is (i) a compound of Formula I or a pharmaceutically acceptable salt thereof and (ii) one or more compatible anti-HIV agent selected from the group consisting of HIV antiviral agents, immunomodulators, and anti-infective agents and latency reversing agents; wherein the compound and the compatible anti-HIV agent are each employed in an amount that renders the combination effective for the treatment or prophylaxis of infection by HIV, or for the treatment, prophylaxis or delay in the onset or progression of AIDS or ARC.

(f) The combination of (e), wherein the compatible anti-HIV agent is an antiviral selected from the group consisting of nucleoside or nucleotide HIV reverse transcriptase inhibitors, nucleoside reverse transcriptase translocation inhibitors, non-nucleoside HIV reverse transcriptase inhibitors, HIV integrase inhibitors, HIV fusion inhibitors, HIV entry inhibitors, HIV maturation inhibitors, post-attachment inhibitors and latency reversing agents.

(g) A method for eliciting GAG-POL dimerization in HIV-infected cells, a method for selectively killing HIV infected GAG-POL expressing cells without concomitant cytotoxicity to HIV naïve cells, a method for the treatment or prophylaxis of infection by HIV, and/or a method for the treatment, prophylaxis, or delay in the onset or progression of AIDS or ARC, comprising administering an effective amount of a compound of Formula I or a pharmaceutically acceptable salt thereof to a subject in need of such treatment.

(h) The method of (g), wherein the compound of Formula I or a pharmaceutically acceptable salt thereof is administered in combination with an effective amount of at least one other compatible HIV antiviral selected from nucleoside or nucleotide HIV reverse transcriptase inhibitors, nucleoside reverse transcriptase translocation inhibitors, non-nucleoside HIV reverse transcriptase inhibitors, HIV integrase inhibitors, HIV fusion inhibitors, HIV entry inhibitors, HIV maturation inhibitors, post-attachment inhibitors and latency reversing agents.

(i) The method of (g) or (h) comprising administering to the subject the pharmaceutical composition of (a), (b), (c) or (d) or the combination of (e) or (f).

(j) Use of a compound of Formula I or a pharmaceutically acceptable salt thereof in the manufacture of a medicament for (1) eliciting GAG-POL dimerization in HIV-infected cells in a subject; (2) selectively killing HIV infected GAG-POL expressing cells without concomitant cytotoxicity to HIV naïve cells in a subject; (3) treatment or prophylaxis of infection by HIV in a subject; (4) treatment, prophylaxis or delay in the onset or progression of AIDS or ARC in a subject; (5) augmenting the suppression of HIV viremia in a subject undergoing treatment with a compatible anti-HIV agent, and/or (6) augmenting the suppression of HIV viremia in a subject whose viremia is being suppressed by administration of one or more compatible HIV antiviral agents.

(k) A compound of Formula I, or a pharmaceutically acceptable salt thereof, for use in (1) eliciting GAG-POL dimerization in HIV-infected cells; (2) selectively killing HIV infected GAG-POL expressing cells without concomitant cytotoxicity to HIV naïve cells; (3) treatment or prophylaxis of infection by HIV; (4) the treatment, prophylaxis or delay in the onset or progression of AIDS or ARC; and/or (5) augmenting the suppression of HIV viremia in a subject undergoing treatment with a compatible anti-HIV agent and/or (6) augmenting the suppression of HIV viremia in a subject whose viremia is being suppressed by administration of one or more compatible HIV antiviral agents.

Additional embodiments of the present disclosure include each of the pharmaceutical compositions, methods and uses set forth in the preceding paragraphs, wherein the compound of Formula I or its salt employed therein is substantially pure. With respect to a pharmaceutical composition comprising a compound of Formula I or its salt and a pharmaceutically acceptable carrier and optionally one or more excipients, it is understood that the term "substantially pure" is in reference to a compound of Formula I or its salt per se.

In another embodiment of the present disclosure are the pharmaceutical compositions, methods, medicaments, uses and combinations set forth herein, wherein the HIV of interest is HIV-1. Thus, for example, in any of the pharmaceutical compositions, methods, medicaments, uses and combinations using the compounds of Formula I or pharmaceutically acceptable salts thereof, the compound or salt thereof is employed in an amount effective against HIV-1; and when used in combination with one or more compatible anti-HIV agent(s), each such additional agent is a compatible HIV-1 antiviral selected from, for example but not limited to, one or more of nucleoside or nucleotide HIV reverse transcriptase inhibitors, nucleoside reverse transcriptase translocation inhibitors, non-nucleoside HIV reverse transcriptase inhibitors, HIV integrase inhibitors, HIV fusion inhibitors, HIV entry inhibitors, HIV maturation inhibitors, post-attachment inhibitors and latency reversing agents.

The term "administration" and variants thereof (e.g., "administering" a compound) in reference to a compound of Formula I means providing the compound to the individual in need of treatment or prophylaxis and includes both self-administration and administration to the patient by another person or any other means. When a compound is provided in combination with one or more other active agents (e.g., antiviral agents useful for treating or prophylaxis of HIV infection or AIDS), "administration" and its variants are each understood to include provision of the compound and other agents at the same time or at different times. When the agents of a combination are administered at the same time, they can be administered together in a single composition or they can be administered separately.

As used herein, the term "composition" is intended to encompass a product comprising the specified ingredients, as well as any product which results from combining the specified ingredients. Ingredients suitable for inclusion in a pharmaceutical composition are pharmaceutically acceptable ingredients, which means the ingredients must be compatible with each other and not deleterious to the recipient thereof.

The term "subject" or "patient" as used herein refers to a human (or "person") who has been the object of treatment, observation or experiment. Examples of patients to be treated with an HIV TACK agent include but are not limited to, patients who have been infected with HIV, and/or HIV infected patients whose HIV viral load has been suppressed and/or is considered to be undetectable at time of HIV TACK treatment. Patients to be treated with an HIV TACK agent also include, but are not limited to, those using an HIV TACK agent for prophylaxis of HIV infection or for post-exposure prophylaxis after being potentially exposed to HIV to prevent becoming infected.

"Prophylaxis" includes each of pre-exposure prophylaxis (PrEP), i.e., using a compound of Formula I or a pharmaceutically acceptable salt thereof to prevent HIV infection in a person who does not have HIV, and post-exposure prophylaxis (PEP), i.e., using a compound of Formula I or a pharmaceutically acceptable salt thereof after being potentially exposed to HIV to prevent becoming infected with HIV.

The term "effective amount" as used herein means an amount of a compound sufficient to elicit GAG-POL dimerization in HIV-infected cells and selectively kill HIV infected GAG-POL expressing cells without concomitant cytotoxicity to HIV naïve cells; and/or exert a therapeutic effect, and/or exert a prophylactic effect after administration. One embodiment of "effective amount" is a "therapeutically effective amount" which is an amount of a compound that is effective for selectively killing HIV infected GAG-POL expressing cells, effective for treating HIV infection, or effective for the treatment, prophylaxis or delay in the onset or progression of AIDS or ARC in a patient infected with HIV. Another embodiment of "effective amount" is a "prophylactically effective amount" which is an amount of the compound that is effective for prophylaxis of HIV infection, or prophylaxis of AIDS or ARC in an HIV-infected patient. It is understood that an effective amount can simultaneously be both a therapeutically effective amount, e.g., for treatment of HIV infection, and a prophylactically effective amount, e.g., for prevention or reduction of risk for developing AIDS or ARC in a subject infected with HIV.

In the combination therapies of the present disclosure, an effective amount can refer to each individual agent or to the combination as a whole, wherein the amounts of all agents administered in the combination are together effective, but wherein a component agent of the combination may or may not be present individually in an effective amount with reference to what is considered effective for that component agent if it were administered alone.

In the methods of the present disclosure, (i.e., selectively killing HIV infected GAG-POL expressing cells, the treatment of infection by HIV, prophylaxis of HIV infection or the treatment, prophylaxis or delay in the onset or progression of AIDS or ARC and/or other methods described herein), the compounds of this disclosure, or salts thereof, can be administered by means that produce contact of the active agent with the agent's site of action. They can be administered by conventional means available for use in conjunction with pharmaceuticals, either as individual therapeutic agents or in a combination of therapeutic agents. The compound can be administered itself, but typically is administered with a pharmaceutical carrier selected on the basis of the chosen route of administration and standard pharmaceutical practice. The compounds of the disclosure can, for example, be administered orally (e.g., via tablet or capsule), parenterally (including subcutaneous injections, intravenous, intramuscular or intrasternal injection, or infusion techniques), by inhalation spray, or rectally, in the form of a unit dosage of a pharmaceutical composition containing an effective amount of the compound and conventional non-toxic pharmaceutically acceptable carriers, adjuvants and vehicles. The compound could also be administered parenterally via an implantable drug delivery device adapted to provide an effective amount of the compound or a pharmaceutical composition of the compound over an extended period of time.

Formulations

Solid preparations suitable for oral administration (e.g., powders, pills, capsules and tablets) can be prepared according to techniques known in the art and can employ such solid excipients as starches, sugars, kaolin, lubricants, binders, disintegrating agents and the like. Liquid preparations suitable for oral administration (e.g., suspensions, syrups, elixirs and the like) can be prepared according to techniques known in the art and can employ any of the usual media such as water, glycols, oils, alcohols and the like. Parenteral compositions can be prepared according to techniques known in the art and typically employ sterile water as a carrier and optionally other ingredients, such as a solubility aid. Injectable solutions can be prepared according to methods known in the art wherein the carrier comprises a saline solution, a glucose solution or a solution containing a mixture of saline and glucose. Implantable compositions can be prepared according to methods known in the art wherein the carrier comprises the active chemical ingredient with polymers and suitable excipients, or utilizing an implantable device for drug delivery. Further description of methods suitable for use in preparing pharmaceutical compositions and of ingredients suitable for use in said compositions is provided in Remington—The Science and Practice of Pharmacy, 22nd Edition, published by Pharmaceutical Press and Philadelphia College of Pharmacy at University of the Sciences, 2012, ISBN 978 0 85711-062-6 and prior editions.

Formulations of compounds of Formula I that result in drug supersaturation and/or rapid dissolution may be utilized to facilitate oral drug absorption. Formulation approaches to cause drug supersaturation and/or rapid dissolution include, but are not limited to, nanoparticulate systems, amorphous systems, solid solutions, solid dispersions, and lipid systems. Such formulation approaches and techniques for preparing them are known in the art. For example, solid dispersions can be prepared using excipients and processes as described in reviews (e.g., A. T. M. Serajuddin, J Pharm Sci, 88:10, pp. 1058-1066 (1999)). Nanoparticulate systems based on both attrition and direct synthesis have also been described in reviews such as Wu et al (F. Kesisoglou, S. Panmai, Y. Wu, Advanced Drug Delivery Reviews, 59:7 pp. 631-644 (2007)).

The compounds of Formula I may be administered in a dosage range of, e.g., 1 to 20 mg/kg, or 1 to 10 mg/kg, or about 5 mg/kg of mammal (e.g., human) body weight per day, or at other time intervals as appropriate, in a single dose or in divided doses. The compounds of Formula I may be administered in a dosage range of 0.001 to 2000 mg. per day in a single dose or in divided doses. Examples of dosage ranges are 0.01 to 1500 mg per day, or 0.1 to 1000 mg per day, administered orally or via other routes of administration in a single dose or in divided doses.

For oral (e.g., tablets or capsules) or other routes of administration, the dosage units may contain 100 mg to 1500 mg of the active ingredient, for example but not limited to, 100, 150, 200, 250, 300, 350, 400, 450, 500, 600, 700, 800, 900, 1000, 1100, 1200, 1300, 1400 or 1500 milligrams of the active ingredient for the symptomatic adjustment of the dosage to the patient to be treated. Furthermore, the compound may be formulated in oral formulations for immediate or modified release such as extended or controlled release. When the compound of Formula I is administered as a salt, reference to an amount of the compound in milligrams or grams is based on the free form (i.e., the non-salt form) of the compound.

Daily administration can be via any suitable route of administration but is preferably via oral administration and can be a single dose or more than one dose at staggered times (divided daily doses) within each 24-hour period. Each dose may be administered using one or multiple dosage units as appropriate.

The specific dose level and frequency of dosage for any particular patient may be varied and will depend upon a variety of factors including the activity of the specific compound employed, the metabolic stability and length of action of that compound, the age, body weight, general health, sex, diet, mode and time of administration, rate of excretion, drug combination, the severity of the particular condition, and the host undergoing therapy. In some cases, depending on the potency of the compound or the individual response, it may be necessary to deviate upwards or downwards from the given dose. The amount and frequency of administration will be regulated according to the judgment of the attending clinician considering such factors.

An "anti-HIV agent" is any agent which is directly or indirectly effective in the inhibition of HIV, the treatment or prophylaxis of HIV infection, and/or the treatment, prophylaxis or delay in the onset or progression of AIDS or ARC. It is understood that an anti-HIV agent is effective in treating, preventing, or delaying the onset or progression of HIV infection or AIDS and/or diseases or conditions arising therefrom or associated therewith. The present disclosure is additionally directed to use of a compound of Formula I or pharmaceutically acceptable salts thereof, with one or more compatible anti-HIV agents, also referred to as "compatible HIV antivirals", i.e., anti-HIV agents excluding HIV protease inhibitors. For example, the compounds of Formula I may be administered in combination with effective amounts of one or more compatible anti-HIV agents selected from HIV antiviral agents, immunomodulators, anti-infectives, or vaccines useful for treating HIV infection or AIDS. Suitable compatible HIV antivirals for use in combination with the compounds of the present disclosure include, but are not limited to, those listed in Table A as follows:

TABLE A

Antiviral Agents for Treating HIV infection or AIDS

| Name | Type |
|---|---|
| abacavir, ABC, ZIAGEN ® | NRTI |
| abacavir + lamivudine, EPZICOM ® | NRTI |
| abacavir + lamivudine + zidovudine, TRIZIVIR ® | NRTI |
| AZT, zidovudine, azidothymidine, RETROVIR ® | NRTI |
| bictegravir | InSTI |
| bictegravir + tenofovir alafenamide fumarate + emtricitabine, BIKTARVY ® | InSTI/NRTI/NRTI |
| capravirine | NNRTI |
| cabotegravir | InSTI |
| Cabotegravir + rilpivirine, CABENUVA | InSTI/NNRTI |
| ddC, zalcitabine, dideoxycytidine, HIVID ® | NRTI |
| ddI, didanosine, dideoxyinosine, Videx ® | NRTI |
| ddI (enteric coated), VIDEX EC ® | NRTI |
| delavirdine, DLV, RESCRIPTOR ® | NNRTI |
| Dolutegravir + lamivudine, DOVATO ® | InSTI/NRTI |
| Dolutegravir + rilpivirine, JULUCAR ® | InSTI/NNRTI |
| dolutegravir, TIVICAY ® | InSTI |
| dolutegravir + abacavir + lamivudine, TRIUMEQ ® | InSTI/NRTI /NRTI |
| doravirine, PIFELTRO ™ | NNRTI |
| doravirine/lamivudine/tenofovir disoproxil fumarate, DELSTRIGO ™ | NNRTI/NRTI/NRTI |
| efavirenz, EFV, SUSTIVA ®, STOCRIN ® | NNRTI |
| efavirenz/emtricitabine/tenofovir disoproxil fumarate, ATRIPLA ® | NNRTI/ NRTI/NRTI |

TABLE A-continued

Antiviral Agents for Treating HIV infection or AIDS

| Name | Type |
| --- | --- |
| islatravir, (4'-ethynyl-2-fluoro-2'-deoxyadenosine; EFdA) | NRTTI |
| elvitegravir, VITEKTA ® | InSTI |
| emtricitabine, FTC, EMTRIVA ® | NRTI |
| emtricitabine + tenofovir alafenamide fumarate, DESCOVY ® | NRTI/NRTI |
| emtricitabine + tenofovir disoproxil fumarate, TRUVADA ® | NRTI/NRTI |
| emivirine, COACTINON ® | NNRTI |
| enfuvirtide, FUZEON ® | FI |
| enteric coated didanosine, VIDEX EC ® | NRTI |
| etravirine, TMC-125 | NNRTI |
| Fostemsavir, RUKOBIA ® | AI |
| Ibalizumab-uiyk (TROGARZO ®) | Post-Attachment Inhibitor or Monoclonal Antibody |
| lamivudine, 3TC, EPIVIR ® | NRTI |
| lamivudine + zidovudine, COMBIVIR ® | NRTI/NRTI |
| lenacapavir | Capsid inhibitor |
| maraviroc, SELZENTRY ® | EI |
| nevirapine, NVP, VIRAMUNE ® | NNRTI |
| raltegravir, ISENTRESS ™ | InSTI |
| rilpivirine, EDURANT ® | NNRTI |
| stavudine, d4T,didehydrodeoxythymidine, ZERIT ® | NRTI |
| tenofovir disoproxil fumarate (TDF), VIREAD ® | NRTI |
| tenofovir alafenamide fumarate (TAF) | NRTI |
| vicriviroc | EI |

AI = attachment inhibitor; EI = entry inhibitor; FI = fusion inhibitor; InSTI = integrase inhibitor; NRTI = nucleoside or nucleotide reverse transcriptase inhibitor; NNRTI = non-nucleoside reverse transcriptase inhibitor; NRTTI = nucleoside reverse transcriptase translocation inhibitor. Some of the drugs listed in the table are used in a salt form; e.g., abacavir sulfate, delavirdine mesylate.

The TACK effect elicited by an HIV-TACK agent depends on expression of viral Gag-Pol. Therefore additional active agents, such as latency reversing agents ("LRA" or "LRAs"), that enhance Gag-Pol production in infected cells and/or activate viral expression in cells that comprise the latent HIV reservoir, when used together with HIV-TACK therapy, are likely to enhance the TACK effect. The present disclosure is additionally directed to use of a compound of Formula I, or a pharmaceutically acceptable salt thereof, with one or more LRA(s). For example, the compounds of Formula I may be administered in combination with effective amounts of one or more LRA(s) for treatment of HIV infection or AIDS. Examples of LRAs for use in combination with the compounds of the present disclosure include, but are not limited to, epigenetic modifiers such as histone deacetylase (HDAC) inhibitors, DNA methyltransferase (DNMT) inhibitors, and histone methyltransferase (HMT) inhibitors; Protein Kinase C (PKC) agonists such as prostratins, bryostatins, or ingenols; inducers of P-TEFb release such as BET inhibitors (e.g., JQ1 or a class of drugs that reversibly bind the bromodomains of Bromodomain and Extra-Terminal motif (BET) proteins BRD2, BRD3, BRD4, and/or BRDT), antagonists of C—C chemokine receptor type 5 (CCR5), inducers of non-canonical NF-xB pathway (e.g., second mitochondria-derived activator of caspases (SMAC) mimetics or inhibitor of apoptosis proteins (IAP) antagonists, proteasome inhibitors, toll-like receptor (TLR) agonists, mitogen-activated protein kinase (MAPK) agonists, Ak strain transforming/protein kinase B (AKT/PKB) pathway activators, cytokines and immunomodulatory agents such as immune checkpoint inhibitors and those described elsewhere (such as Bullen et al, Nature Medicine, 20:425-429 (2014); Ait-Ammar et al, Frontiers in Microbiology, 10:3060 (2019); and Fujinaga et al, Viruses. 12:11 (2020).

Examples of HDAC inhibitors that can be used as latency reversing agents include, but are not limited to, vorinostat, panabinostat, romidepsin, and valproic acid. Examples of DNMT inhibitors that can be used as latency reversing agents include, but are not limited to, 5-aza-2'-cytidine and 5-aza-2'-deoxycytidine. Examples of HMT inhibitors that can be used as latency reversing agents include, but are not limited to, chaetocin, 3-deazaneplanocin A, tazemetostat (EPZ-6438), N-[(1,2-dihydro-6-methyl-2-oxo-4-propyl-3-pyridinyl)methyl]-1-(1-methylethyl)-6-[2-(4-methyl-1-piperazinyl)-4-pyridinyl]-1H-indazole-4-carboxamide (GSK-343) and 2-cyclohexyl-6-methoxy-N-[1-(1-methylethyl)-4-piperidinyl]-7-[3-(1-pyrrolidinyl)propoxy]-4-quinazolinamine (UNC-0638). Examples of PKC agonists that can be used as latency reversing agents include, but are not limited to, phorbolesters such as prostratin and phorbol myristate acetate (PMA), bryostatin-1, and ingenol. Examples of BET inhibitors that can be used as a latency reversing agents include, but are not limited to, JQ1 ((S)-tert-butyl 2-(4-(4-chlorophenyl)-2,3,9-trimethyl-6H-thieno [3,2-f][1,2,4]triazolo[4,3-a][1,4]diazepin-6-yl)acetate), iBET, and N-cyclohexyl-2-(4-(3,5-dimethylisoxazol-4-yl)-2-methoxyphenyl)imidazo[1,2-a]pyrazin-3-amine (UMB-136). An example of a CCR5 antagonist that can be used as latency reversing agent includes, but is not limited to, maraviroc. Examples of inducers of the non-canonical NF-κB pathway and SMAC mimetics/IAP inhibitors that can be used as latency reversing agents include, but are not limited to, 3,3'-[2,4-hexadiyne-1,6-diylbis[oxy[(1S,2R)-2,3-dihydro-1H-indene-2,1-diyl]]]bis[N-methyl-L-alanyl-(2S)-2-cyclohexylglycyl-L-prolinamide (AZD5582), Ciapavir, Birinapant, LCL161, and DEBIO1143/AT-406. Examples of proteasome inhibitors that can be used as latency reversing agents include, but are not limited to, bortezomib and ixazomib. Examples of TLR agonists that can be used as latency reversing agents include, but are not limited to, the TLR2 agonist Pam3CSK4, the TLR7 agonist vesatolimod, and the TLR9 agonists Lefitolimod (MGN 1703) and CPG 7909.

An example of an MAPK agonist that can be used as a latency reversing agent includes, but is not limited to, procyanidin trimer C1. An example of an AKT pathway activator that can be used as latency reversing agent includes, but is not limited to, disulfiram. Examples of immunomodulatory cytokines that can be used as latency reversing agents include, but are not limited to, IL-2, IL-7, and IL-15, including the IL-15 superagonist N-803. Examples of immune checkpoint inhibitors include, but are not limited to, inhibitors of Programmed cell death protein 1 (PD1), Programmed death-ligand 1 (PD-L1) inhibitors, cytotoxic T-lymphocyte-associated protein 4 (CTLA-4), Lymphocyte-activation gene 3 (LAG3), T cell immunoreceptor with Ig and ITIM domains) (TIGIT) and CD24Fc, a recombinant fusion protein composed of the extracellular domain of the mature human glycoprotein cluster of differentiation 24 (CD24) linked to a human immunoglobulin G1 (IgG1) Fc domain.

Compounds of this invention can be used in combination with any one or more of antiviral agents, e.g. but not limited to those listed in Table A, and/or any one or more of LRAs, e.g. but not limited to, the LRAs described herein.

Thus, the compounds of Formula I, or pharmaceutically acceptable salts thereof, used together with a latency reversing agent can be useful for:
(i) A method for re-activating latent HIV and eliciting GAG-POL dimerization in HIV-infected cells (e.g., CD4 T cells) in a human subject which comprises administering to the subject an effective amount of a compound according to Formula I, or a pharmaceutically acceptable salt thereof, and a latency reversing agent; or
(ii) A method for re-activating latent HIV and selectively killing HIV-infected GAG-POL expressing cells (e.g., latently HIV-infected CD4 T cells or central memory CD4 T cells), without concomitant cytotoxicity to HIV naïve cells, in a human subject which comprises administering to the subject an effective amount of a compound according to Formula I, or a pharmaceutically acceptable salt thereof, and a latency reversing agent.

It is understood that the scope of combinations of the compounds of this disclosure with one or more compatible anti-HIV agent and/or one or more LRA is not limited to to the anti-HIV agents and LRAs listed herein, but includes in principle any combination with any active pharmaceutical ingredient(s) useful for the treatment or prophylaxis of HIV, AIDS or ARC, or for HIV latency reversal, with the exception of HIV protease inhibitors. The compatible HIV antiviral agents and other active agents will typically be employed in these combinations in their conventional dosage ranges and regimens as reported in the art, including, for example, the dosages described in the current Physicians' Desk Reference, Thomson PDR, 70th edition (2016), Montvale, NJ: PDR Network, or in prior editions thereof, or online on PDR.net. The dosage amounts and ranges for a compound of this disclosure in these drug combinations can be the same or similar to those set forth above.

The compounds of this disclosure are also useful in the preparation and execution of screening assays for antiviral compounds. For example, the compounds of this disclosure are useful for isolating enzyme mutants, which are excellent screening tools for more powerful antiviral compounds. Furthermore, the compounds of this disclosure are useful in establishing or determining the binding site of other antivirals to the reverse transcriptase region within GAG-POL, e.g., by competitive inhibition.

The following acronyms and abbreviations used herein have the indicated meanings: AcOH=Acetic acid; aq=aqueous; BisPin=bis(pinacolato)diboron; Boc=tert-butyloxycarbonyl; BPO=benzoyl peroxide; Brettphos Pd G3=[(2-di-cyclohexylphosphino-3,6-dimethoxy-2',4',6'-triisopropyl-1,1'-biphenyl)-2-(2'-amino-1,1'-biphenyl)]palladium(II) methanesulfonate; CAN=ceric ammonium nitrate; d=doublet; DAST=(diethylamino)sulfur trifluoride; DCE=1,2-dichloroethane; DCM=dichloromethane; DIPEA=diisopropylethylamine; dppf=1,1'-bis(diphenylphosphino)ferrocene; DMA=dimethylacetamide; DMF=N,N-dimethylformamide; DMAP=4-dimethylaminopyridine; DMP=Dess-Martin periodinane; DMSO=dimethyl sulfoxide; Et=ethyl; EtOAc=ethyl acetate; EtOH=ethanol; HIV=human immunodeficiency virus; HPLC=high performance liquid chromatography; hr or h=hour; iPrOH=isopropanol; L=liter; LDA=lithium diisopropylamide; LiHMDS=lithium bis(trimethylsilyl)amide; m=multiplet; m-CPBA=3-chloroperbenzoic acid; Me=methyl; MeCN=acetonitrile; MeOH=methanol; MHz=megahertz; min=minute; mL or ml=milliliters; mmol=millimoles; MPLC=medium pressure liquid chromatography; MS (ESI)=mass spectroscopy (electrospray ionization); MsCl=methanesulfonyl chloride; NBS=N-bromosuccinimide; NCS=N-chlorosuccinimde; NHS=normal human serum; NIS=N-iodosuccinimde; nBu=n-butyl; nM=nanomolar; NMR=nuclear magnetic resonance; PE=petroleum ether; Pin=pinacolato boronate ester; PMB=4-methyoxybenzyl; PMBCl=4-methoxybenzyl chloride; prep=preparative; pTsOH=p-toluenesulfonic acid; RNA=ribonucleic acid; s=singlet; sat aq=saturated aqueous; SEMCl=2-(Trimethylsilyl)ethoxymethyl chloride; sol=solution; t=triplet; TBAF=tetra-N-butylammonium fluoride; TBSCl=tert-butyldimethylsilyl chloride; t-Bu=tert-butyl; THF=tetrahydrofuran; TFA=trifluoroacetic; TFAA=trifluoroacetic anhydride; TLC=thin layer chromatography; TMS=trimethylsilyl; TMSCl=trimethylsilyl chloride; Xantphos=4,5-bis(diphenylphosphino)-9,9-dimethylxanthene; Xphos=2-Dicyclohexylphosphino-2',4',6'-triisopropylbiphenyl; XPhos Pd G2=Chloro(2-dicyclohexylphosphino-2',4',6'-triisopropyl-1,1'-biphenyl)[2-(2'-amino-1,1'-biphenyl)]palladium(II); XPhos Pd G3=(2-Dicyclohexylphosphino-2',4',6'-triisopropyl-1,1'-biphenyl)[2-(2'-amino-1,1'-biphenyl)]palladium(II) methanesulfonate.

Several methods for preparing the compounds of this disclosure are described in the following Schemes and Examples. Starting materials and intermediates were purchased or made using known procedures, or as otherwise illustrated in the Intermediate synthesis sections A, B, and C.

SCHEME 1

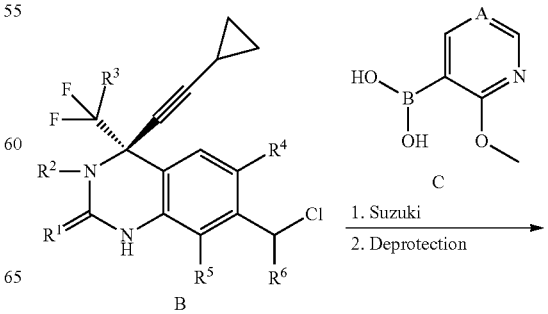

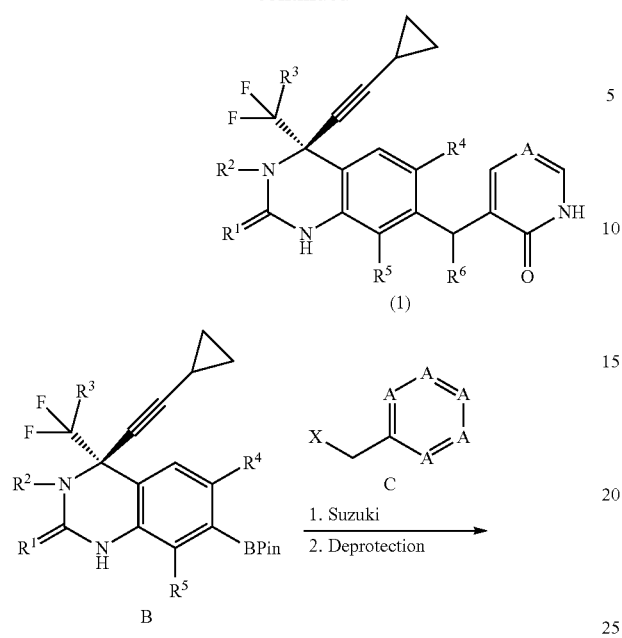

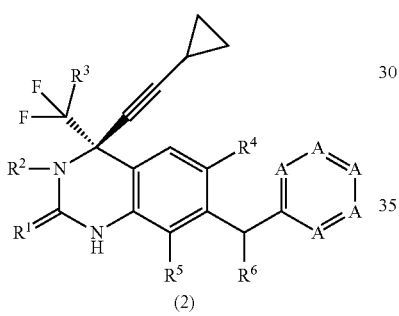

Schemes 1 and 3 depict a method for preparing compounds of Formula I wherein X is —Cl or —Br, and each A is CR; or 1 or 2 of A is NR and the remaining As are —CR (R═H or a substituent on the carbon or nitrogen in the ring). Intermediate B is prepared with procedures illustrated in the Intermediate B section. Cross coupling Suzuki-Miyaura reaction using an appropriate 6-membered heterocyclic ring (Intermediate C) followed by deprotection provides compounds of Formula I. Synthesis of compound C is illustrated in the Intermediate C section.

Scheme 2 depicts a method for preparing compounds of Formula I. Intermediate A is prepared with procedures illustrated in the Intermediate A section. Protection of the NH group followed by borylation provided the Bpin intermediate. Then, cross coupling Suzuki-Miyaura reaction using an appropriate 6-membered heterocyclic ring (Intermediate C) afforded the introduction of the C-ring. Alkylation with alkyl halides groups and deprotection provides compounds of Formula I. Synthesis of C is illustrated in the Intermediate C section.

SCHEME 2

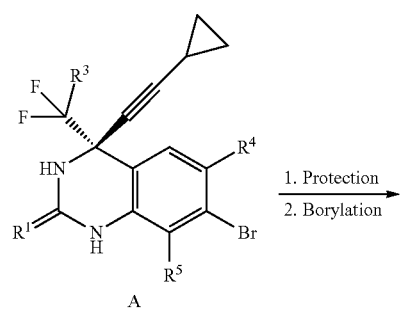

SCHEME 3

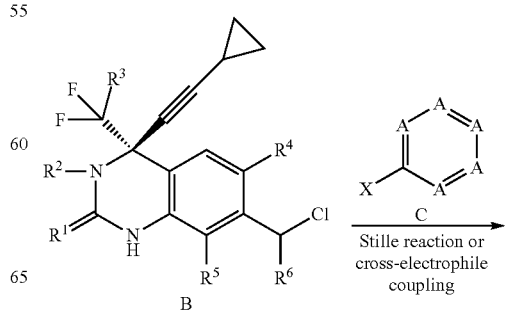

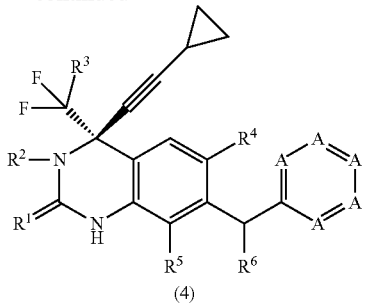

(4)

Scheme 3 depicts a method for preparing compounds of Formula I. Intermediate B is prepared with procedures illustrated in the Intermediate B section. An in situ Stille coupling or cross-electrophile mediated by Nickel using an appropriate 6-membered heterocyclic ring (Intermediate C) provides compounds of formula (4). Synthesis of C is illustrated in the Intermediate C section.

Reactions sensitive to moisture or air were performed under nitrogen or argon using anhydrous solvents and reagents. Reactions performed using microwave irradiation were normally carried out using an Emrys Optimizer manufactured by Personal Chemistry, or an Initiator manufactured by Biotage. Concentration of solutions was carried out on a rotary evaporator under reduced pressure.

The progress of reactions was determined by either analytical thin layer chromatography (TLC) usually performed with E. Merck pre-coated TLC plates, silica gel 60F-254, layer thickness 0.25 mm or analytical liquid chromatography-mass spectrometry (LC-MS). Typically, the analytical LC-MS system used consisted of a Waters ZQ™ platform with electrospray ionization in positive ion detection mode with an Agilent 1100 series HPLC with autosampler. The column was commonly a Waters Xterra MS C18, 3.0×50 mm, 5 m or a Waters Acquity UPLC® BEH C18 1.0×50 mm, 1.7 μm. The flow rate was 1 mL/min, and the injection volume was 10 μL. UV detection was in the range 210-400 nm. The mobile phase consisted of solvent A (water plus 0.05% TFA) and solvent B (acetonitrile plus 0.05% TFA) with a gradient of 100% solvent A for 0.7 min changing to 100% solvent B over 3.75 min, maintained for 1.1 min, then reverting to 100% solvent A over 0.2 min. LC/MS determinations were carried out on a Waters Classing Aquity system equipped with TUV and MS detectors and a Waters SQD mass spectrometer, a Shimadzu 20 UV 254 and 220 nM with Shimadzu 2010 or 2020 mass spectrometer, or an Agilent 1200 HPLC quipped with DAD/ELSD and G6110 MSD using one of the following conditions: 1) Ascentis Express C18 (3×50 mm) 2.7 μm column using mobile phase containing A: 0.05% Trifluoroacetic acid in water and B: 0.05% Trifluoroacetic acid in acetonitrile with a gradient from 90:10 (A:B) to 5:95 (A:B) over 6 min at a flow rate of 1.8 mL/min, UV detection at 210 nm; 2) Aquity BEH C18, (1.0×50 mm) 1.7 μm column using mobile phase containing A: 0.05% Trifluoroacetic acid in water and B: 0.05% Trifluoroacetic acid in acetonitrile with a gradient from 90:10 (A:B) to 5:95 (A:B) over 2 min at a flow rate of 0.3 mL/min, UV detection at 215 nm; 3) Agilent YMC J'Sphere H-80 (3×50 mm) 5 μm column using mobile phase containing A: 0.1% Trifluoroacetic acid in water and B: acetonitrile with a gradient from 95:5 (A:B) to 0:100 (A:B) over 3.6 min and 0:100 (A:B) for 0.4 min at a flow rate of 1.4 mL/min, UV detection at 254 and 220 nm and Agilent 1100 quadrupole mass spectrometer; 4) an Agilent TC-C18 (2.1×50 mm) 5 μm column using mobile phase containing A: 0.0375% Trifluoroacetic acid in water and B: 0.01875% Trifluoroacetic acid in acetonitrile with a gradient from 90:10 (A:B) for 0.4 min to 90:10 to 0:100 (A:B) over 3 min and 10:90 (A:B) for 0.6 min at a flow rate of 0.8 mL/min, UV detection at 254 and 220 nm and Agilent 6110 quadrupole mass spectrometer.

Preparative HPLC purifications were usually performed using either a mass spectrometry directed system or a non-mass guided system. Usually they were performed on a Waters Chromatography Workstation configured with LC-MS System consisting of: Waters ZQ™ single quad MS system with Electrospray Ionization, Waters 2525 Gradient Pump, Waters 2767 Injecto/Collector, Waters 996 PDA Detector, the MS Conditions of: 150-750 amu, Positive Electrospray, Collection Triggered by MS, and a Waters SUNFIRE® C-18 5 micron, 30 mm (id)×100 mm column. The mobile phases consisted of mixtures of acetonitrile (10-100%) in water containing 0.1% TFA. Flow rates were maintained at 50 mL/min, the injection volume was 1800 μL, and the UV detection range was 210-400 nm. An alternate preparative HPLC system used was a Gilson Workstation consisting of: Gilson GX-281 Injector/Collector, Gilson UV/VIS-155 Detector, Gilson 333 and 334 Pumps, and equipped with a column selected from the following: Phenomenexd Synergi C18 (150 mm×30 mm×4 micron), YMC-Actus Pro C18 (150 mm×30 mm×5 micron), Xtimate C18 (150 mm×25 mm×5 micron), Boston Green ODS (150 mm×30 mm×5 micron), XSELECT C18 (150 mm×30 mm×5 micron), and Waters XSELECT C18 (150 mm×30 mm×5 micron). Conditions included either high pH (0-100% acetonitrile/water eluent comprising 0.1% v/v 10 mM NH₄HCO₃ or 0.05% NH₄OH) or low pH (0-95% acetonitrile/water eluent comprising 0.1% v/v TFA). The injection volume ranged from 1000-8000 μL, and the UV detection range was 210-400 nm. Mobile phase gradients were optimized for the individual compounds.

Flash chromatography was usually performed using either a Biotage® Flash Chromatography apparatus (Dyax Corp.), an ISCO CombiFlash® Rf apparatus, or an ISCO CombiFlash® Companion XL on silica gel (32-63 μm, 60 Å pore size) in pre-packed cartridges of the size noted.

SFC chiral resolution was carried out on a Sepiate Prep SFC 100, Multigram II (MG II), THAR80 prep SFC, or a Waters SFC (80, 200, or 350).

Chiral preparative chromatography was conducted on one of of CHIRALPAK AS, of CHIRALPAK AD, CHIRALCEL® OD, CHIRALCEL®IA, CHIRALCEL® OJ columns (20×250 mm) (Daicel Chemical Industries, Ltd.) or WHELK-O®1 (Regis Technologies, Inc.) with desired isocratic solvent systems identified on chiral analytical chromatography or by supercritical fluid (SFC) conditions.

Proton or ¹H NMR was acquired using a Varian Unity-Inova 400 MHz NMR spectrometer equipped with a Varian 400 ATB PFG 5 mm, Nalorac DBG 400-5 or a Nalorac IDG 400-5 probe, a Varian-400 MHz MR spectrometer equipped with an Auto X ID PFG Probe 5 mm, a Varian 400 MHz VNMRS spectrometer equipped with a PFG 4Nuc Probe 5 mm, or a Bruker Avance III 500 MHz spectrometer equipped with a PABBO Probe 5 mm in accordance with standard analytical techniques, unless specified otherwise, and results of spectral analysis are reported. ¹H NMR spectra were acquired in CDCl₃ solutions unless otherwise noted. Chemical shifts were reported in parts per million (ppm). Tetramethylsilane (TMS) was used as internal reference in CD₃Cl solutions, residual CH₃OH peak or TMS was used as internal reference in CD₃OD solutions, and TMS was used as internal reference in DMSO-d6 solutions. Coupling constants (J) were reported in hertz (Hz).

It is understood that a chiral center in a compound may exist in the "S" or "R" stereo-configuration, or as a mixture of both. Within a molecule, each bond drawn as a straight line from a chiral center encompasses each of the (R) and (S) stereoisomers as well as mixtures thereof unless otherwise noted. Final products in the Examples herein have the "S" stereoconfiguration at the chiral center noted with an asterisk* as shown below, except that in Examples 30 and 62, a last step stereoisomer separation afforded each of the S and R stereoisomers at the *chiral center.

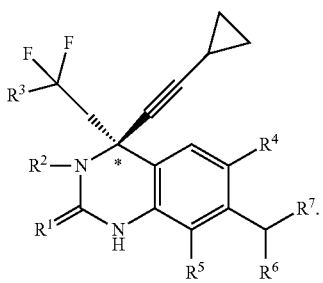

The isomer mixture made in each of Examples 30 and 62 was separated in the last step, providing both an Isomer A (faster eluting isomer) and an Isomer B (slower eluting isomer), based on their observed elution order resulting from the separation as performed in the Example. Elution time and/or order of separated isomers may differ if performed under conditions different than those employed herein. "A" and "B" only refer to elution order resulting from the purification conditions as performed. An asterisk (*) may be used in the associated chemical structure drawings of the Example compounds to indicate a chiral center.

A Intermediates

Intermediate A01, Isomer A01-A and Isomer A01-B: (S)-7-bromo-4-(cyclopropylethynyl)-1-(4-methoxybenzyl)-4-(trifluoromethyl)-3,4-dihydroquinazolin-2(1H)-one AND (R)-7-bromo-4-(cyclopropylethynyl)-1-(4-methoxybenzyl)-4-(trifluoromethyl)-3,4-dihydroquinazolin-2(1H)-one

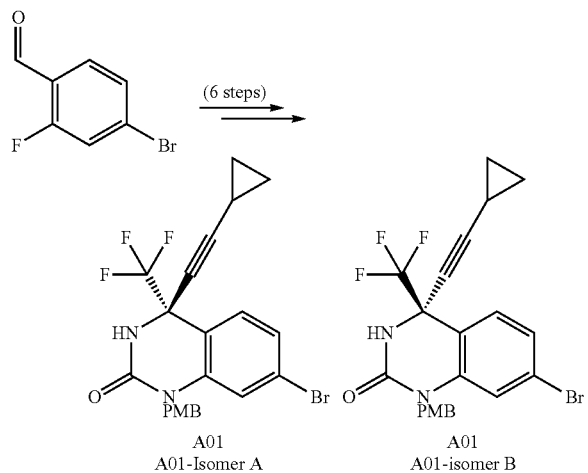

Step 1: 1-(4-bromo-2-fluorophenyl)-2,2,2-trifluoroethanol: A solution of 4-bromo-2-fluorobenzaldehyde (40 g, 197 mmol) and trimethyl(trifluoromethyl)silane (30.8 g, 217 mmol) in THF (240 mL) was added TBAF (3.94 ml, 3.94 mmol) at 0° C. The mixture was stirred for 3 h at 20° C. Additional TBAF (39.4 ml, 39.4 mmol) was added. The mixture was stirred for 10 min. HCl (1M, 180 mL) was added and the mixture was stirred for 0.5 h. The mixture was diluted with $H_2O$ (600 mL) and extracted with EtOAc (400 mL×2) and washed with brine and dried over $Na_2SO_4$, filtered and concentrated to give the title compound, which was used without further purification.

Step 2: 1-(4-bromo-2-fluorophenyl)-2,2,2-trifluoroethanone: A mixture of 1-(4-bromo-2-fluorophenyl)-2,2,2-trifluoroethanol (51.7 g, 189 mmol) and DMP (161 g, 379 mmol) and $NaHCO_3$ (47.7 g, 568 mmol) in DCM (510 mL) was stirred for 3 h at 20° C. The mixture was washed with sat aq $NaHCO_3$ sol (500 mL×2), $H_2O$ (500 mL×2) and brine (500 mL), and dried over $Na_2SO_4$, filtered and concentrated. The crude product was purified by flash chromatography ($SiO_2$, 0-30% EtOAc/PE) to provide the title compound.

Step 3: 1-(4-bromo-2-((4-methoxybenzyl)amino)phenyl)-2,2,2-trifluoroethanone: A mixture of 1-(4-bromo-2-fluorophenyl)-2,2,2-trifluoroethanone (33 g, 122 mmol) and (4-methoxyphenyl)methanamine (33.4 g, 244 mmol) in toluene (330 ml) was stirred at 120° C. for 2 h. The mixture was washed with 10% citric acid aq sol (330 mL×2) and brine (330 mL) and dried over $Na_2SO_4$ and filtered and concentrated. The crude product was purified by flash chromatography ($SiO_2$, 0-30% EtOAc/PE) to the title compound.

Step 4: 7-bromo-4-hydroxy-1-(4-methoxybenzyl)-4-(trifluoromethyl)-3,4-dihydroquinazolin-2(1H)-one: To a solution of 1-(4-bromo-2-((4-methoxybenzyl)amino)phenyl)-2,2,2-trifluoroethanone (100 g, 258 mmol) in AcOH (500 mL) and $H_2O$ (50 mL) was added sodium cyanate (100 g, 1546 mmol). The mixture was stirred at 60° C. for 4 h. The mixture was diluted with $H_2O$ (500 mL) and filtered to give the crude product. The crude product was diluted with sat aq $NaHCO_3$ sol (500 mL) and extracted with EtOAc (300 mL×3), and the combined organic phase was washed with brine (900 mL), dried over $Na_2SO_4$, filtered and concentrated to give the title compound, which was used directly without further purification.

Step 5: 7-bromo-1-(4-methoxybenzyl)-4-(trifluoromethyl)quinazolin-2(1H)-one: To a solution of 7-bromo-4-hydroxy-1-(4-methoxybenzyl)-4-(trifluoromethyl)-3,4-dihydroquinazolin-2(1H)-one (98 g, 227 mmol) in toluene (700 mL). The mixture was stirred at 130° C. for 16 h, and was then concentrated to give the title product, which was used directly without further purification.

Step 6: (S)-7-bromo-4-(cyclopropylethynyl)-1-(4-methoxybenzyl)-4-(trifluoromethyl)-3,4-dihydroquinazolin-2(1H)-one AND (R)-7-bromo-4-(cyclopropylethynyl)-1-(4-methoxybenzyl)-4-(trifluoromethyl)-3,4-dihydroquinazolin-2(1H)-one: To a solution of ethynylcyclopropane (5.32 g, 80.46 mmol) in toluene (260 mL), LiHMDS (66.9 ml, 66.9 mmol) was added at −5° C. The mixture was heated to 85° C. for 15 min and then cooled to −15° C. A solution of 7-bromo-1-(4-methoxybenzyl)-4-(trifluoromethyl)quinazolin-2(1H)-one (6 g, 13.4 mmol) in THF (520 ml) was added, and the mixture was stirred for 12 h at 20° C. The reaction mixture was poured into an aq $NH_4Cl$ sol (1200 mL), extracted with EtOAc (3×600 mL). The combined organic phase was washed with brine (1800 mL), filtered and concentrated. The crude was purified by flash chromatography ($SiO_2$, 0-30% EtOAc/PE) to give the title compound. The racemic mixture was resolved by prep SFC (IC—H column, 40% MeOH (0.1% NH$_3$H$_2$O)/CO$_2$, 66 mL/min, 100 bar, 40° C.) to provide Isomer A01-A (faster eluting) and Isomer A01-B (slower eluting). MS (ESI) m/z 479, 481 [M+1] for both.

Intermediate A02: 7-bromo-6-chloro-4-(cyclopropylethynyl)-1-(4-methoxybenzyl)-4-(trifluoromethyl)-3,4-dihydroquinazolin-2(1H)-one

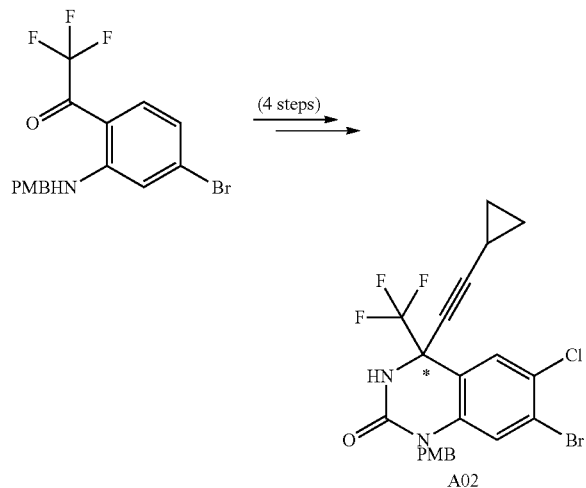

Step 1: 1-(4-bromo-5-chloro-2-((4-methoxybenzyl)amino)phenyl)-2,2,2-trifluoroethanone: To a mixture of 1-(4-bromo-2-((4-methoxybenzyl)amino)phenyl)-2,2,2-trifluoroethanone (44 g, 113 mmol) in DMF (440 mL) was added NCS (15.9 g, 119 mmol) and the mixture was stirred at 50° C. for 1.5 h. The reaction was quenched with H$_2$O (1 L), and the mixture was extracted with EtOAc (3×400 mL). The combined organic layer was washed with brine (1.2 L), dried over anhydrous Na$_2$SO$_4$, filtered and concentrated to give the title product, which was used directly without further purification.

Step 2: 7-bromo-6-chloro-4-hydroxy-1-(4-methoxybenzyl)-4-(trifluoromethyl)-3,4-dihydroquinazolin-2(1H)-one: To a solution of 1-(4-bromo-5-chloro-2-((4-methoxybenzyl)amino)phenyl)-2,2,2-trifluoroethanone (47 g, 111 mmol) in AcOH (400 mL) and H$_2$O (40 mL) was added sodium cyanate (50.6 g, 778 mmol). The mixture was stirred at 60° C. for 3 h. The reaction was quenched into sat aq NaHCO$_3$ sol (500 mL), and the mixture was extracted with EtOAc (3×300 mL). The organic layers were washed with brine (900 mL), dried over anhydrous Na$_2$SO$_4$, filtered and concentrated. The mixture was purified by flash chromatography (SiO$_2$, 0-30% EtOAc/PE) to afford the title compound.

Step 3: 7-bromo-6-chloro-1-(4-methoxybenzyl)-4-(trifluoromethyl)quinazolin-2(1H)-one To a solution of 7-bromo-6-chloro-4-hydroxy-1-(4-methoxybenzyl)-4-(trifluoromethyl)-3,4-dihydroquinazolin-2(1H)-one (7 g, 15.03 mmol) in toluene (4 mL). The mixture was stirred at 120° C. for 16 h. The reaction was concentrated to give the title compound, which was used directly without further purification.

Step 4: 7-bromo-6-chloro-4-(cyclopropylethynyl)-1-(4-methoxybenzyl)-4-(trifluoromethyl)-3,4-dihydroquinazolin-2(1H)-one: To a solution of ethynylcyclopropane (6.20 g, 94 mmol) in toluene (350 ml), LiHAMDS (78 mL, 78 mmol) was added at -5° C. The mixture was heated at 85° C. for 15 min and then cooled to -15° C. A solution of 7-bromo-6-chloro-1-(4-methoxybenzyl)-4-(trifluoromethyl)quinazolin-2(1H)-one (7 g, 15.64 mmol) in THF (700 mL) was added, and the mixture was stirred for 16 h at 20° C. The reaction mixture was poured into a sat aq NH$_4$Cl sol (1200 mL), extracted with EtOAc (3×600 mL). The combined organic phase was washed with brine (1800 mL), filtered and concentrated. The crude product was purified by HPLC (SiO$_2$, 10-50% EtOAc:PE) to give the title compound.

Intermediate A03: 7-bromo-4-(cyclopropylethynyl)-4-(trifluoromethyl)-3,4-dihydroquinazolin-2(1H)-one

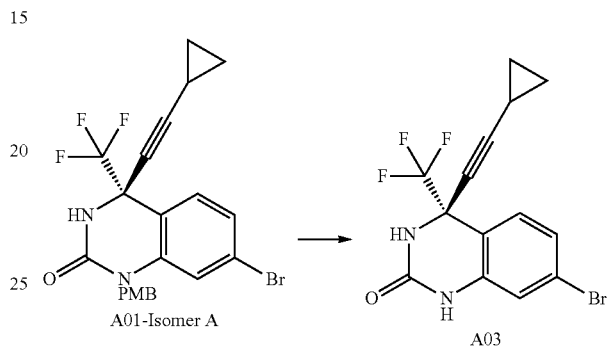

To a solution of intermediate A01-Isomer A (20 g, 41.7 mmol) in MeCN (60 mL) and H$_2$O (20 mL) was added CAN (114 g, 209 mmol). The reaction was stirred at 40° C. for 1 h. The reaction was dissolved in H$_2$O (30 mL) and extracted with EtOAc (30 mL×3). The combined organic layer was washed with water, dried over Na$_2$SO$_4$, filtered and concentrated to give the title compound, which was used in the next step without further purification. MS (ESI) m/z 359, 361 [M+1].

Intermediate A04: Isomer A04-A and Isomer A04-B: (S)-7-bromo-6-fluoro-4-(cyclopropylethynyl)-4-(trifluoromethyl)-3,4-dihydroquinazolin-2(1H)-one AND (R)-7-bromo-6-fluoro-4-(cyclopropylethynyl)-4-(trifluoromethyl)-3,4-dihydroquinazolin-2(1H)-one

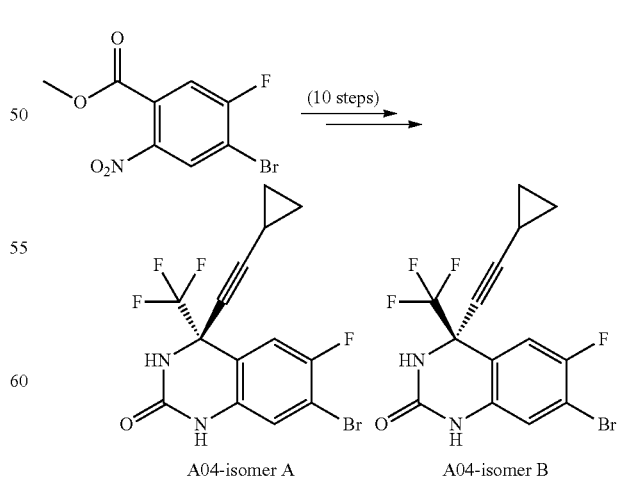

Step 1: methyl 2-amino-4-bromo-5-fluorobenzoate: To a solution of methyl 4-bromo-5-fluoro-2-nitrobenzoate (25 g, 90 mmol) in EtOH (375 ml) was added iron (40.2 g, 719 mmol) and NH₄Cl (4.81 g, 90 mmol) in H₂O (125 ml). The reaction mixture stirred at 70° C. for 16 h. The reaction mixture was quenched with H₂O (200 mL) and extracted with EtOAc (300 mL×2). The combined organics were washed with brine (100 mL), dried over Na₂SO₄, filtered and concentrated to afford the title compound, which was used directly without further purification.

Step 2: methyl 4-bromo-2-((tert-butoxycarbonyl)amino)-5-fluorobenzoate: To a solution of methyl 2-amino-4-bromo-5-fluorobenzoate (20 g, 81 mmol) was added di-tert-butyl dicarbonate (88 g, 403 mmol) and stirred at 120° C. for 16 h. The reaction mixture was concentrated and the resulting residue was diluted with PE and cooled to 0° C. The resulting precipitate was filtered and the solid was washed with 20 mL of cold PE and then, dried under vacuum to afford the title compound.

Step 3: tert-butyl (5-bromo-4-fluoro-2-(hydroxymethyl)phenyl)carbamate: To a stirred solution of methyl 4-bromo-2-((tert-butoxycarbonyl)amino)-5-fluorobenzoate (13 g, 37.3 mmol) in THF (130 mL) was added LiAlH₄ (1.417 g, 37.3 mmol) at 0° C. and the resulting mixture was stirred at 0° C. for 1 h. The mixture was quenched by adding water (2 mL) and then sat aq Na₂SO₄ sol and the resulting mixture was stirred for 10 min. The mixture was filtered and extracted with EtOAc (100 mL×3). The combined organic phase was washed with brine (100 mL), dried over anhydrous Na₂SO₄, filtered and concentrated. The residue was purified by prep MPLC (SiO₂, 1-20% EtOAc/PE) to give the title product. MS (ESI) m/z 320, 322 [M+1].

Step 4: tert-butyl (5-bromo-4-fluoro-2-formylphenyl)carbamate: To a solution of tert-butyl (5-bromo-4-fluoro-2-(hydroxymethyl)phenyl)carbamate (10 g, 31.2 mmol) in DCM (200 ml) was added DMP (26.5 g, 62.5 mmol) at 15° C. for 1 h. The mixture was diluted with DCM (100 mL), filtered and the organic phase was concentrated. The crude product was diluted with EtOAc (10 mL) and PE (200 mL), filtered and the organic phase was concentrated to give the title product.

Step 5: tert-butyl (5-bromo-4-fluoro-2-(2,2,2-trifluoro-1-hydroxyethyl)phenyl)carbamate: A solution of tert-butyl (5-bromo-4-fluoro-2-formylphenyl)carbamate (10 g, 31.4 mmol) and trimethyl(trifluoromethyl)silane (13.41 g, 94 mmol) in THF (200 ml) was added TBAF (1.644 g, 6.29 mmol) at 0° C. The mixture was stirred for 0.5 h at 20° C. TBAF (8.22 g, 31.4 mmol) was added. The mixture was stirred at 20° C. for 0.5 h. HCl (1M, 20 mL) was added and the mixture was diluted with H₂O (50 mL) and extracted with EtOAc (150 mL×2) and washed with brine (50 mL×2) and dried over Na₂SO₄ and filtered and concentrated. The residue was purified on flash chromatography (SiO₂, 5% EtOAc/PE) to give the title compound.

Step 6: tert-butyl (5-bromo-4-fluoro-2-(2,2,2-trifluoroacetyl)phenyl)carbamate: To a solution of tert-butyl (5-bromo-4-fluoro-2-(2,2,2-trifluoro-1-hydroxyethyl)phenyl)carbamate (6 g, 15.46 mmol) in DCM (60 ml) was added DMP (13.11 g, 30.9 mmol) at 20° C. for 1 h. The mixture was diluted with DCM, filtered and concentrated. The crude product was treated with EtOAc (5 mL) and PE (50 mL), filtered and concentrated to give the title product.

Step 7: 1-(2-amino-4-bromo-5-fluorophenyl)-2,2,2-trifluoroethanone: To a vial containing tert-butyl (5-bromo-4-fluoro-2-(2,2,2-trifluoroacetyl)phenyl)carbamate (5 g, 12.95 mmol) was added a 4 M HCl solution in EtOAc (3 ml) and stirred for 1 h at 20° C. The solvent was removed under reduced pressure to give the crude product, which was purified by flash chromatography (SiO₂, 2% EtOAc/PE) to afford the title product.

Step 8: 7-bromo-6-fluoro-4-hydroxy-4-(trifluoromethyl)-3,4-dihydroquinazolin-2(1H)-one: To a solution of 1-(2-amino-4-bromo-5-fluorophenyl)-2,2,2-trifluoroethanone (3 g, 10.49 mmol) in THF (30 ml) was added 4-dimethylaminopyridine (1.281 g, 10.49 mmol) and (trimethylsilyl)isocyanate (3.14 g, 27.3 mmol). The mixture was stirred at 20° C. for 2 h. The reaction mixture was quenched with water (20 mL) and extracted with EtOAc (3×25 mL). The organic layer was separated, dried over anhydrous Na₂SO₄, filtered and concentrated. The crude was purified by flash chromatography (SiO₂, 3-100% EtOAc:PE) to afford the title product.

Step 9: 7-bromo-6-fluoro-4-(trifluoromethyl)quinazolin-2(1H)-one: To a stirred solution of 7-bromo-6-fluoro-4-hydroxy-4-(trifluoromethyl)-3,4-dihydroquinazolin-2(1H)-one (1.8 g, 5.47 mmol) in toluene (20 mL) under N₂ and the resulting mixture was stirred at 120° C. for 23 h. The organic layer was concentrated to give the title product, which was used for the next step without further purification.

Step 10: (S)-7-bromo-4-(cyclopropylethynyl)-6-fluoro-4-(trifluoromethyl)-3,4-dihydroquinazolin-2(1H)-one AND (R)-7-bromo-4-(cyclopropylethynyl)-6-fluoro-4-(trifluoromethyl)-3,4-dihydroquinazolin-2(1H)-one: To a solution of ethynylcyclopropane (2.168 g, 32.8 mmol) in toluene (6 mL), LiHMDS (27.3 ml, 27.3 mmol) was added at −5° C. The mixture was heated at 85° C. for 35 min and then cooled to −5° C. A solution of 7-bromo-6-fluoro-4-(trifluoromethyl)quinazolin-2(1H)-one (1.7 g, 5.47 mmol) in THF (12 ml) was added, and the mixture was stirred for 2 h at 20° C. The reaction was quenched with a 1 M aq citric acid sol (5 ml) and diluted with EtOAc (35 mL). The organic layer was separated and dried over Na₂SO₄, filtered, and concentrated. The residue was purified by flash chromatography (SiO₂, 50% EtOAc/PE) to give the title product, which was resolved by prep SFC (Chiralpak AS-H, 40% MeOH (0.1% NH₃H₂O)/CO₂; 70 g/min; 40° C.; 100 bar) to provide: Isomer A04-A (faster eluting) and Isomer A04-B (slower eluting) MS (ESI) m/z 377, 379 [M+1] for both.

Intermediate A05, Isomer A05-A and Isomer A05-B: (S)-7-bromo-4-(cyclopropylethynyl)-4-(1,1-difluoroethyl)-3,4-dihydroquinazolin-2(1H)-one AND (R)-7-bromo-4-(cyclopropylethynyl)-4-(1,1-difluoroethyl)-3,4-dihydroquinazolin-2(1H)-one

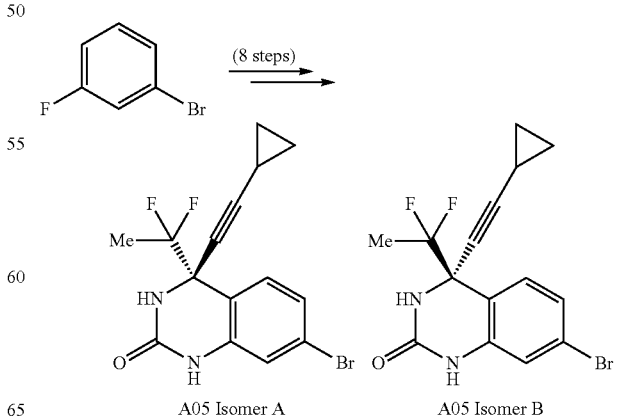

Step 1: (2-bromo-6-fluorophenyl)trimethylsilane: To a solution of 1-bromo-3-fluorobenzene (50 g, 286 mmol) and TMSCl (73.0 ml, 571 mmol) in THF (450 mL) was added LDA (286 mL, 571 mmol) at −70° C. The reaction was stirred at −70° C. for 2 h. The reaction was hydrolyzed with aq 1M $H_2SO_4$ sol. The yellow organic phase was separated, and the water phase was extracted with EtOAc. The combined organic phase was concentrated to give the title compound, which was used without further purification.

Step 2: 1-(4-bromo-2-fluoro-3-(trimethylsilyl)phenyl)-2,2-difluoropropan-1-one: To a solution of 2,2,6,6-tetramethylpiperidine (18.86 g, 134 mmol) in THF (125 mL) was added nBuLi (53.4 ml, 134 mmol) at −20° C. After 30 min of stirring at −20° C., the mixture was cooled to −70° C., and a solution of (2-bromo-6-fluorophenyl)trimethylsilane (30 g, 121 mmol) in THF (35 mL) was added. After 1 h of stirring at −70° C., ethyl 2,2-difluoropropanoate (18.44 g, 134 mmol) was added dropwise. The mixture was then allowed to warm to 20° C. and stirred at 20° C. for another 1 h. Then, sat aq $NH_4Cl$ sol (300 mL) was added, and the mixture was extracted with EtOAc (3×300 mL). The combined organic layer was washed with brine (300 mL), dried over $Na_2SO_4$, filtered and concentrated to give the title compound, which was used without further purification.

Step 3: 1-(4-bromo-2-fluorophenyl)-2,2-difluoropropan-1-one: To a solution of 1-(4-bromo-2-fluoro-3-(trimethylsilyl)phenyl)-2,2-difluoropropan-1-one (45 g, 133 mmol) in THF (200 mL) was added TBAF (34.7 g, 133 mmol) at 20° C. The reaction was stirred at 20° C. for 0.5 h. The reaction mixture was concentrated and the resulting residue was purified by flash chromatography ($SiO_2$, 0-5% EtOAc/PE) to afford the title compound.

Step 4: 1-(4-bromo-2-((4-methoxybenzyl)amino)phenyl)-2,2-difluoropropan-1-one: To a solution of 1-(4-bromo-2-fluorophenyl)-2,2-difluoropropan-1-one (20 g, 74.9 mmol) in toluene (200 mL) were added (4-methoxyphenyl)methanamine (20.55 g, 150 mmol) and $K_2CO_3$ (12.42 g, 90 mmol). The reaction was stirred at 115° C. for 2 h. The reaction was concentrated and the residue was purified by flash chromatography ($SiO_2$, 0-5% EtOAc/PE) to give the title product.

Step 5: 7-bromo-4-(1,1-difluoroethyl)-4-hydroxy-1-(4-methoxybenzyl)-3,4-dihydroquinazolin-2(1H)-one: To a solution of 1-(4-bromo-2-((4-methoxybenzyl)amino)phenyl)-2,2-difluoropropan-1-one (20 g, 52.1 mmol) in AcOH (400 mL) was added sodium cyanate (33.8 g, 521 mmol). The reaction was stirred at 110° C. for 16 h. The reaction was adjusted to pH=8 with sat aq $NaHCO_3$ sol and extracted with EtOAc (3×500 mL). The organic layer was washed with brine (500 mL), dried over $Na_2SO_4$, filtered and concentrated. The crude product was purified by flash chromatography ($SiO_2$, 0-25% EtOAc/PE) to give the title compound.

Step 6: 7-bromo-4-(1,1-difluoroethyl)-1-(4-methoxybenzyl)quinazolin-2(1H)-one: To a solution of 7-bromo-4-(1,1-difluoroethyl)-4-hydroxy-1-(4-methoxybenzyl)-3,4-dihydroquinazolin-2(1H)-one (10 g, 23.41 mmol) in MeCN (200 mL) was added phosphorus pentoxide (3.99 g, 28.1 mmol). The reaction was stirred at 90° C. under $N_2$ for 3 h. The reaction was adjusted with sat aq $NaHCO_3$ sol to pH=8 and extracted with EtOAc (3×500 mL). The organic layer was washed with brine (500 mL), dried over $Na_2SO_4$, filtered and concentrated to give the title product, which was used in the next step without further purification.

Step 7: 7-bromo-4-(cyclopropylethynyl)-4-(1,1-difluoroethyl)-1-(4-methoxybenzyl)-3,4-dihydroquinazolin-2(1H)-one: To a solution of ethynylcyclopropane (4.36 g, 66.0 mmol) in toluene (50 mL) was added LiHMDS (55.0 mL, 55.0 mmol) at 0° C. The reaction was stirred at 85° C. for 15 min. Then, a solution of 7-bromo-4-(1,1-difluoroethyl)-1-(4-methoxybenzyl) quinazolin-2(1H)-one (9 g, 11.00 mmol) in THF (50.0 mL) was added to the reaction at 0° C. The reaction was stirred at 15° C. for 0.5 h. The reaction was quenched with sat aq $NH_4Cl$ sol (100 mL). The residue was extracted with EtOAc (3×100 mL). The organic layer was washed with brine (100 mL), dried over $Na_2SO_4$, filtered and concentrated. The crude product was purified by flash chromatography ($SiO_2$, 0-25% EtOAc/PE) to afford the title compound.

Step 8: (S)-7-bromo-4-(cyclopropylethynyl)-4-(1,1-difluoroethyl)-3,4-dihydroquinazolin-2(1H)-one AND (R)-7-bromo-4-(cyclopropylethynyl)-4-(1,1-difluoroethyl)-3,4-dihydroquinazolin-2(1H)-one: To a mixture of 7-bromo-4-(cyclopropylethynyl)-4-(1,1-difluoroethyl)-1-(4-methoxybenzyl)-3,4-dihydroquinazolin-2(1H)-one (3 g, 6.31 mmol) in MeCN (40 mL) and water (15 mL) was added CAN (17.30 g, 31.6 mmol). The reaction was stirred at 15° C. for 2 h. The reaction was extracted with EtOAc (3×50 mL). The organic layer was washed with brine (50 mL), dried over $Na_2SO_4$, filtered and concentrated. The crude product was purified by flash chromatography ($SiO_2$, 0-25% EtOAc/PE) to give the title product. The racemic mixture was resolved by prep SFC (DAICEL CHIRALPAK AD, 45% MeOH (0.1% $NH_3H_2O$)/$CO_2$, 65 mL/min, 40° C., 100 bar) to afford: Isomer A05-A (faster eluting) and Isomer A05-B (slower eluting) MS (ESI) m/z 355, 357 [M+1] for both.

Intermediate A06: 7-bromo-4-(cyclopropylethynyl)-4-(1,1-difluoroethyl)-6-fluoro-3,4-dihydroquinazolin-2(1H)-one

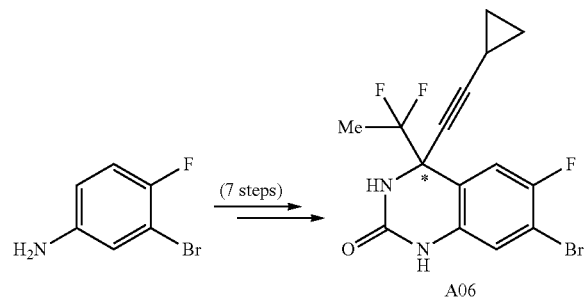

Step 1: 5-bromo-4-fluoro-2-iodoaniline: To a solution of 3-bromo-4-fluoroaniline (100 g, 526 mmol) in AcOH (1 L) was added NIS (101 g, 447 mmol) at 25° C. The mixture was stirred for 16 h at 25° C. The reaction mixture was concentrated and the resulting crude was then dissolved in water (100 mL) and extracted with EtOAc (350 mL×2). The combined organic layer was washed with $H_2O$ (150 mL×2), sat aq $NaHCO_3$ sol (250 mL) and brine (50 mL), dried over $Na_2SO_4$, filtered and concentrated. The resulting crude was purified by flash chromatography ($SiO_2$, 0-2% EtOAc/PE) to give the title compound.

Step 2: tert-butyl (5-bromo-4-fluoro-2-iodophenyl)carbamate: To a stirred solution of 5-bromo-4-fluoro-2-iodoaniline (60 g, 190 mmol) in DCM (80 mL) was added DMAP (1.160 g, 9.50 mmol). Then, $Et_3N$ (2.65 ml, 18.99 mmol) and di-tert-butyl dicarbonate (62.2 g, 285 mmol) were added. The mixture was stirred at 25° C. for 4 h. The reaction mixture was diluted with DCM (500 mL), washed with water (100 mL×2), brine (50 mL), dried over Na₂SO₄, filtered and concentrated to give the title compound, which was used without further purification.

Step 3: tert-butyl (5-bromo-2-(2,2-difluoropropanoyl)-4-fluorophenyl)carbamate: To a mixture of tert-butyl (5-bromo-4-fluoro-2-iodophenyl)carbamate (20 g, 33.7 mmol) and ethyl 2,2-difluoropropanoate (12.65 mL, 101 mmol) in THF (250 mL) was added dropwise isopropylmagnesium chloride-lithium chloride complex (64.7 mL, 84 mmol) at −70° C. over 30 min. The reaction mixture was stirred at −70° C. for 1 h. The mixture was quenched with sat aq NH₄Cl sol (45 mL) and water (45 mL), and then extracted with EtOAc (80 mL×2). The combined organic layers were washed with brine (30 mL), dried over Na₂SO₄, filtered and concentrated to give the title compound, which was used without further purification.

Step 4: 1-(2-amino-4-bromo-5-fluorophenyl)-2,2-difluoropropan-1-one: A mixture of tert-butyl (5-bromo-2-(2,2-difluoropropanoyl)-4-fluorophenyl)carbamate (45 g, 118 mmol) in a solution of HCl in EtOAc (4 M, 200 mL) at 25° C. was stirred for 1 h. The formed precipitate was treated with EtOAc (400 mL) and concentrated to give the title compound.

Step 5: 7-bromo-4-(1,1-difluoroethyl)-6-fluoro-4-hydroxy-3,4-dihydroquinazolin-2(1H)-one: To a solution of 1-(2-amino-4-bromo-5-fluorophenyl)-2,2-difluoropropan-1-one (6.7 g, 23.75 mmol) in THF (67 mL) was added DMAP (2.90 g, 23.75 mmol) and (trimethylsilyl)isocyanate (8.36 mL, 61.8 mmol). The resulting mixture was stirred at 25° C. for 2 h. The reaction mixture was quenched with H₂O (30 mL) and extracted into EtOAc (3×55 mL). The combined organic layer was dried over Na₂SO₄, filtered and concentrated. The crude was dissolved in THF (25 mL) and aq HCl (1M, 25 mL) and stirred at 25° C. for 2 h. The reaction mixture was concentrated and then purified by flash chromatography (SiO₂; 30~80% EtOAc/PE) to give the title compound.

Step 6: 7-bromo-4-(1,1-difluoroethyl)-6-fluoroquinazolin-2(1H)-one: A mixture of 7-bromo-4-(1,1-difluoroethyl)-6-fluoro-4-hydroxy-3,4-dihydroquinazolin-2(1H)-one (2 g, 6.15 mmol) in toluene (50 mL) was stirred under nitrogen at 140° C. for 16 h. The reaction mixture was concentrated to give the title product, which was used without further purification.

Step 7: 7-bromo-4-(cyclopropylethynyl)-4-(1,1-difluoroethyl)-6-fluoro-3,4-dihydroquinazolin-2(1H)-one: To a solution of ethynylcyclopropane (3.31 mL, 39.1 mmol) in toluene (10 mL), LiHMDS (25.05 mL, 32.6 mmol) was added at −5° C. The mixture was heated at 85° C. for 35 min and then cooled to −5° C. A solution of 7-bromo-4-(1,1-difluoroethyl)-6-fluoroquinazolin-2(1H)-one (2 g, 6.51 mmol) in THF (20 mL) was added, and the mixture was stirred for 100 min at 25° C. The reaction was quenched by the addition of sat aq NH₄Cl sol (45 mL) and extracted with EtOAc (55 mL×2). The organic layers were combined and dried over Na₂SO₄, filtered, and concentrated to give the title compound, which was used without further purification. MS (ESI) m/z 373.0, 375.0 [M+1].

Intermediate A07: 7-bromo-6-chloro-4-(cyclopropylethynyl)-1-(4-methoxybenzyl)-3-methyl-4-(trifluoromethyl)-3,4-dihydroquinazolin-2(1H)-one

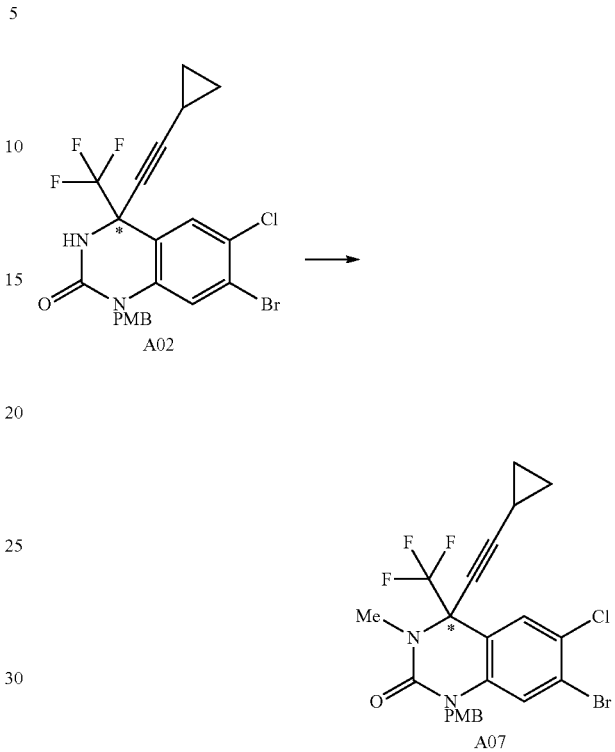

To a solution of intermediate A02 (500 mg, 0.973 mmol) in DMF (5 ml), NaH (97 mg, 2.433 mmol) and MeI (0.183 ml, 2.92 mmol) were sequentially added to the reaction solution at 15° C. The resulting mixture was stirred at 50° C. for 2 h. The mixture was then diluted with H₂O (50 mL), and then extracted with EtOAc (3×50 mL), washed with brine (3×50 mL), dried over Na₂SO₄, filtered, concentrated. The resulting residue was purified by flash chromatography (SiO₂, 0-20% EtOAc/PE) to afford the title compound. MS (ESI) m/z 527, 529 [M+1].

B Intermediates

Intermediate B01: (S)-4-(cyclopropylethynyl)-7-(4,4,5,5-tetramethyl-1,3,2-dioxaborolan-2-yl)-4-(trifluoromethyl)-3,4-dihydroquinazolin-2(1H)-one

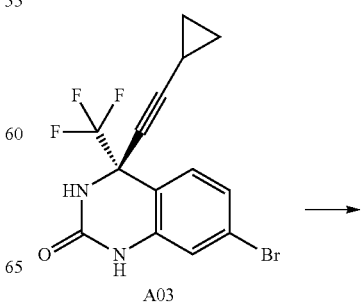

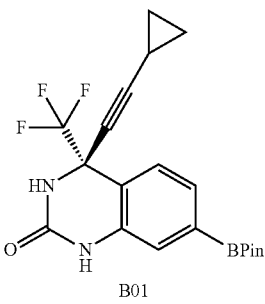

B01

A solution of intermediate A03, BisPin (255 mg, 1.002 mmol) and KOAc (246 mg, 2.506 mmol) in 1,4-dioxane (7 mL) was added Pd(PPh$_3$)$_2$Cl$_2$ (29.3 mg, 0.042 mmol) under nitrogen, the mixture was stirred at 80° C. for 16 h under nitrogen. The mixture was diluted with water (30 mL) and EtOAc (30 mL), filtered and extracted with EtOAc (3×30 mL). The combined organic layers were dried over Na$_2$SO$_4$, filtered and concentrated. The residue was purified by flash chromatography (SiO$_2$, 30% EtOAc/PE) to afford the title compound. MS (ESI) m/z 407 [M+1].

Intermediate B02 was prepared using a procedure analogous to that used for making Intermediate B01 except that Intermediate A03 was replaced by Intermediate A04-Isomer A.

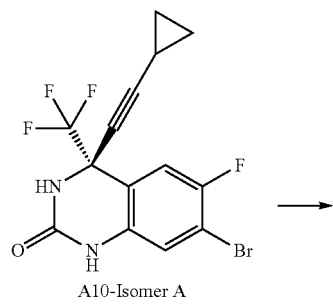

A10-Isomer A

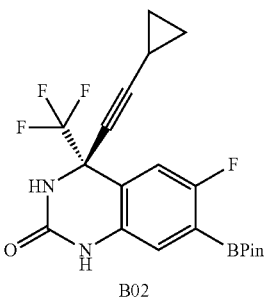

B02

Intermediate B03: (S)-7-(chloromethyl)-4-(cyclopropylethynyl)-4-(trifluoromethyl)-3,4-dihydroquinazolin-2(1H)-one

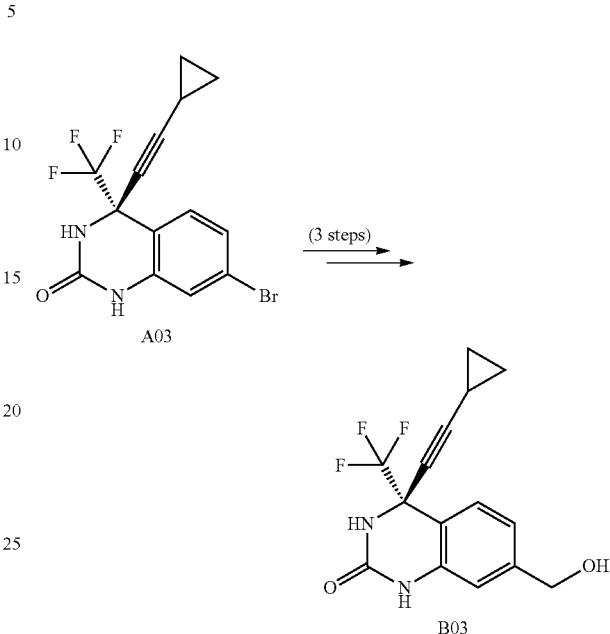

Step 1: (S)-4-(cyclopropylethynyl)-4-(trifluoromethyl)-7-vinyl-3,4-dihydroquinazolin-2(1H)-one: A solution of intermediate A03 (6 g, 16.71 mmol) in 1,4-dioxane (120 mL) and water (12 mL) was added potassium trifluoro(vinyl)borate (3.36 g, 25.06 mmol), K$_2$CO$_3$ (6.93 g, 50.1 mmol), PdCl$_2$ (dppf) (1.222 g, 1.671 mmol) under N$_2$ and the resulting mixture was stirred for 1 h at 100° C. under N$_2$. The reaction was cooled and then poured into H$_2$O (500 mL), extracted with EtOAc (3×200 mL). The combined organic layer was filtered, concentrated, and purified by flash chromatography (SiO$_2$, 0-30% EtOAc/PE) to afford the title compound.

Step 2: (S)-4-(cyclopropylethynyl)-2-oxo-4-(trifluoromethyl)-1,2,3,4-tetrahydroquinazoline-7-carbaldehyde: To a stirred solution of (S)-4-(cyclopropylethynyl)-4-(trifluoromethyl)-7-vinyl-3,4-dihydroquinazolin-2(1H)-one (5.49 g, 17.92 mmol) in 1,4-dioxane (100 mL) and H$_2$O (50 mL) was added 2,6-lutidine (3.84 g, 35.8 mmol), potassium osmate (VI) dihydrate (1.321 g, 3.58 mmol). The resulting mixture was stirred for 10 min, then sodium periodate (11.50 g, 53.8 mmol) was added and the resulting mixture was stirred at 25° C. for 1 h. The reaction mixture was quenched with H$_2$O (500 mL) and extracted with EtOAc (3×300 mL). The combined organics were washed with brine (90 mL), dried over Na$_2$SO$_4$, filtered and concentrated, and then, purified by flash chromatography (SiO$_2$, 0-30% EtOAc/PE) to afford the title compound.

Step 3: (S)-4-(cyclopropylethynyl)-7-(hydroxymethyl)-4-(trifluoromethyl)-3,4-dihydroquinazolin-2(1H)-one: To a solution of (S)-4-(cyclopropylethynyl)-2-oxo-4-(trifluoromethyl)-1,2,3,4-tetrahydroquinazoline-7-carbaldehyde (4.6 g, 14.92 mmol) in MeOH (50 mL) was added NaBH$_4$ (0.226 g, 5.97 mmol) at 25° C. under N$_2$ and the mixture was stirred at this temperature for 10 min. Water (250 mL) was added to the mixture and then extracted with EtOAc (3×150 mL). The combined organic phase was washed with brine (450 mL) and dried over Na$_2$SO$_4$, filtered and concentrated. The crude product was purified prep-HPLC (water: MeCN with 0.1% TFA) to give the title compound.

Intermediate B04, B04-Isomer A and B04-Isomer B (S)-6-chloro-4-(cyclopropylethynyl)-7-(hydroxymethyl)-1-(4-methoxybenzyl)-4-(trifluoromethyl)-3,4-dihydroquinazolin-2(1H)-one AND (R)-6-chloro-4-(cyclopropylethynyl)-7-(hydroxymethyl)-1-(4-methoxybenzyl)-4-(trifluoromethyl)-3,4-dihydroquinazolin-2(1H)-one

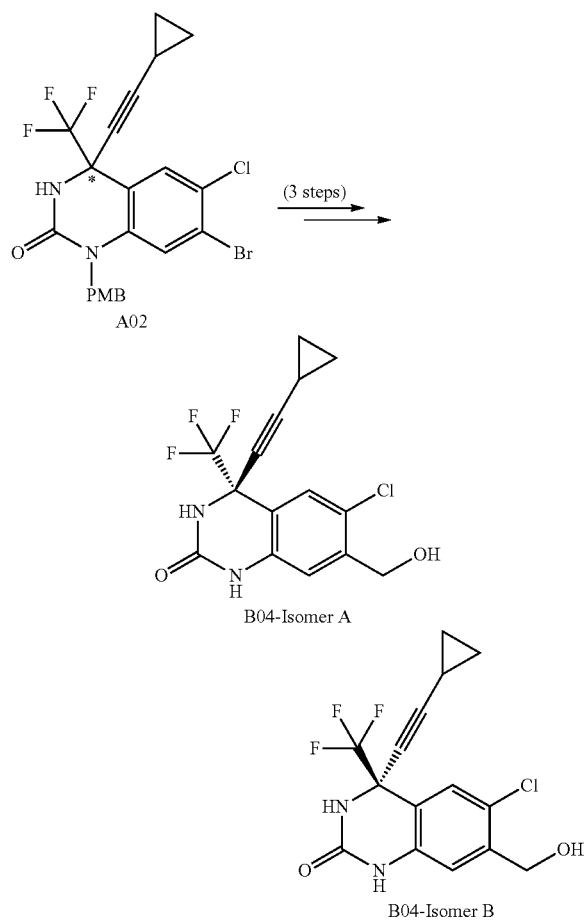

Step 1: 6-chloro-4-(cyclopropylethynyl)-1-(4-methoxybenzyl)-4-(trifluoromethyl)-7-vinyl-3,4-dihydroquinazolin-2(1H)-one: To a solution of Intermediate A02 (14 g, 27.3 mmol) and potassium trifluoro(vinyl)borate (5.48 g, 40.9 mmol) in 1,4-dioxane (140 ml) and water (14 mL) was added $K_2CO_3$ (11.30 g, 82 mmol) and $PdCl_2(dppf)$ (1.994 g, 2.73 mmol), then the reaction mixture was stirred at 100° C. for 3 h under $N_2$. The reaction was concentrated and purified by flash chromatography ($SiO_2$; 0-20% EtOAc/PE) to give the title compound.

Step 2: 6-chloro-4-(cyclopropylethynyl)-7-(hydroxymethyl)-1-(4-methoxybenzyl)-4-(trifluoromethyl)-3,4-dihydroquinazolin-2(1H)-one: A solution of 6-chloro-4-(cyclopropylethynyl)-1-(4-methoxybenzyl)-4-(trifluoromethyl)-7-vinyl-3,4-dihydroquinazolin-2(1H)-one (8.2 g, 17.79 mmol) in MeOH (30 mL) and DCM (150 ml) was bubbled with ozone (0.854 g, 17.79 mmol) for 0.5 h at −60° C. NaBH(OAc)$_3$ (22.63 g, 107 mmol) was added and the reaction mixture was stirred for 0.5 h at 20° C. The reaction was dissolved in water (100 mL) and extracted with DCM (100 mL×3). The combined organic layer was washed with brine (100 mL), dried over $Na_2SO_4$, filtered and concentrated to give the title product, which was used directly for the next step without purification.

Step 3: (S)-6-chloro-4-(cyclopropylethynyl)-7-(hydroxymethyl)-4-(trifluoromethyl)-3,4-dihydroquinazolin-2(1H)-one AND (R)-6-chloro-4-(cyclopropylethynyl)-7-(hydroxymethyl)-4-(trifluoromethyl)-3,4-dihydroquinazolin-2(1H)-one: To a solution of 6-chloro-4-(cyclopropylethynyl)-7-(hydroxymethyl)-1-(4-methoxybenzyl)-4-(trifluoromethyl)-3,4-dihydroquinazolin-2(1H)-one (8.5 g, 18.28 mmol) in MeCN (200 ml) and $H_2O$ (70 ml) was added CAN (50.1 g, 91 mmol). The mixture was stirred for 16 h at 20° C. The reaction was dissolved in $H_2O$ (100 mL) and extracted with EtOAc (150 mL×3). The combined organic layer was washed with brine (200 mL), dried over $Na_2SO_4$, filtered and concentrated. The crude product was purified by prep-HPLC (water/MeCN with 0.1% TFA) to give the title compound, which was resolved by SFC (Chiralpak AD, 30% EtOH/CO$_2$, 200 g/min, 40° C., 100 bar) to give: Isomer B04-A (faster eluting): $^1$H-NMR (400 MHz, MeOH-d$_4$) δ ppm 7.44 (s, 1H), 7.14 (s, 1H), 4.71-4.60 (m, 2H), 1.53-1.38 (m, 1H), 1.00-0.85 (m, 2H), 0.83-0.70 (m, 2H); and Isomer B04-B (slower eluting): $^1$H-NMR (400 MHz, MeOH-d$_4$) δ ppm 7.44 (s, 1H), 7.14 (s, 1H), 4.71-4.62 (m, 2H), 1.45 (tt, J=8.3, 4.9 Hz, 1H), 0.99-0.85 (m, 2H), 0.82-0.69 (m, 2H).

The following intermediates were prepared using a procedure analogous to that used for making B04 using the noted starting intermediate in place of A02.

| Intermediate | |
|---|---|
| B05 | 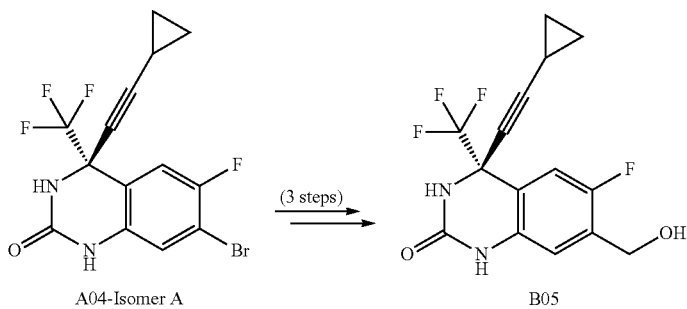 |

| Intermediate | |
|---|---|
| B06 | 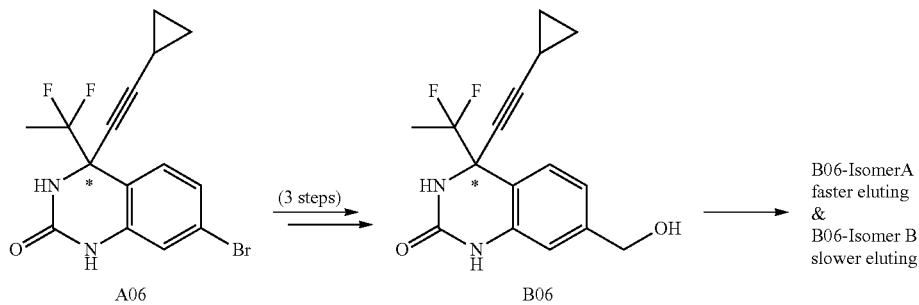 B06-IsomerA faster eluting & B06-Isomer B slower eluting<br>SFC (Chiralpak AD<br>40% IPA (0.1%NH₂H₂O):CO₂, 70 g/min, 40° C., 100 bar |

Intermediate B07: 6-chloro-4-(cyclopropylethynyl)-7-(hydroxymethyl)-3-methyl-4-(trifluoromethyl)-3,4-dihydroquinazolin-2(1H)-one

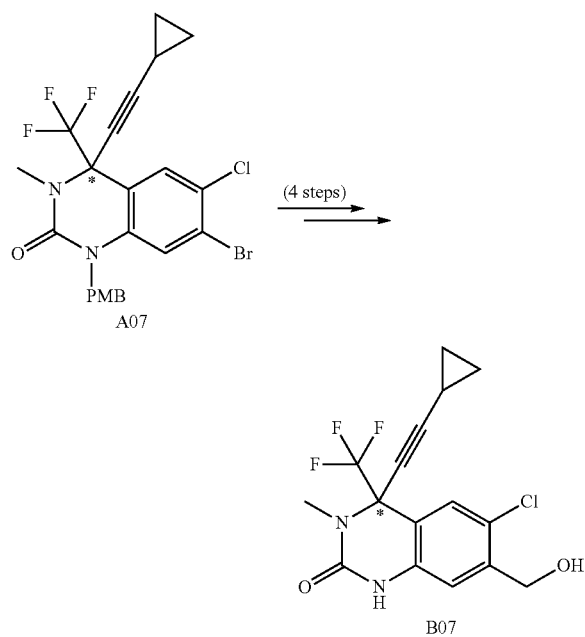

Step 1: 6-chloro-4-(cyclopropylethynyl)-1-(4-methoxybenzyl)-3-methyl-4-(trifluoromethyl)-7-vinyl-3,4-dihydroquinazolin-2(1H)-one: To a solution of intermediate A07 (0.5 g, 1.23 mmol) in 1,4-dioxane (6 mL) and water (1.25 mL) were added $CH_2CHBF_3K$ (0.25 g, 1.84 mmol), $PdCl_2$(dppf) (90 mg, 0.123 mmol) and $K_2CO_3$ (0.51 g, 3.68 mmol). The reaction was stirred at 100° C. for 3 h under $N_2$. Then, the reaction mixture was cooled and poured into water (15 mL), extracted with EtOAc (50 mL×2). The combined organic phase was washed with brine (15 mL) and concentrated. The resulting residue was purified on flash chromatography ($SiO_2$, 5-20% EtOAc/PE) to give the title compound.

Step 2: 6-chloro-4-(cyclopropylethynyl)-1-(4-methoxybenzyl)-3-methyl-2-oxo-4-(trifluoromethyl)-1,2,3,4-tetrahydroquinazoline-7-carbaldehyde: To a stirred solution of 6-chloro-4-(cyclopropylethynyl)-1-(4-methoxybenzyl)-3-methyl-4-(trifluoromethyl)-7-vinyl-3,4-dihydroquinazolin-2(1H)-one (350 mg, 0.737 mmol) in 1,4-dioxane (6 ml) and water (2 mL) was added 2,6-lutidine (158 mg, 1.47 mmol), potassium osmate (VI) dihydrate (54.3 mg, 0.15 mmol) and, then, sodium periodate (473 mg, 2.21 mmol). The resulting mixture was stirred for 10 min at 0° C. and the resulting mixture was stirred at 25° C. for 1 hr. The reaction mixture was concentrated and diluted with EtOAc (20 mL), washed with water (10 mL), brine (20 mL), dried over $Na_2SO_4$, filtered and concentrated to give the title compound, which was used directly.

Step 3: 6-chloro-4-(cyclopropylethynyl)-7-(hydroxymethyl)-1-(4-methoxybenzyl)-3-methyl-4-(trifluoromethyl)-3,4-dihydroquinazolin-2(1H)-one: To a solution of 6-chloro-4-(cyclopropylethynyl)-1-(4-methoxybenzyl)-3-methyl-2-oxo-4-(trifluoromethyl)-1,2,3,4-tetrahydroquinazoline-7-carbaldehyde (350 mg, 0.37 mmol) in MeOH (2 mL), $NaBH_4$ (13.9 mg, 0.38 mmol) was added at 15° C. and stirred for 20 min. The reaction mixture was diluted with water (25 mL), and then extracted with EtOAc (35 mL×2), washed with brine (15 mL), dried over $Na_2SO_4$, filtered and concentrated to give the title compound, which was used directly.

Step 4: 6-chloro-4-(cyclopropylethynyl)-7-(hydroxymethyl)-3-methyl-4-(trifluoromethyl)-3,4-dihydroquinazolin-2(1H)-one: To a solution of 6-chloro-4-(cyclopropylethynyl)-7-(hydroxymethyl)-1-(4-methoxybenzyl)-3-methyl-4-

(trifluoromethyl)-3,4-dihydroquinazolin-2(1H)-one (100 mg, 0.21 mmol) in MeCN (1.5 mL) and water (0.5 mL) was added CAN (572 mg, 1.04 mmol). The reaction was stirred at 20° C. for 20 h. The reaction mixture was diluted with water (5 mL), and then extracted with EtOAc (5 mL×2), washed with brine (5 mL), dried over $Na_2SO_4$, filtered and concentrated. The resulting residue was purified by prep-TLC ($SiO_2$, 50% EtOAc:PE) to afford the title compound. MS (ESI) m/z 359.1 [M+H].

Intermediate B08: (S)-7-(chloromethyl)-4-(cyclopropylethynyl)-4-(trifluoromethyl)-3,4-dihydroquinazolin-2(1H)-one

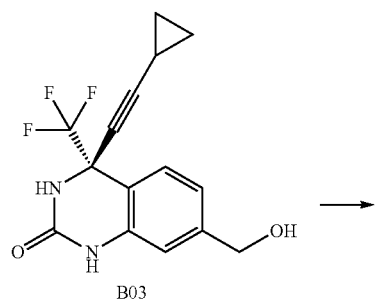

B03

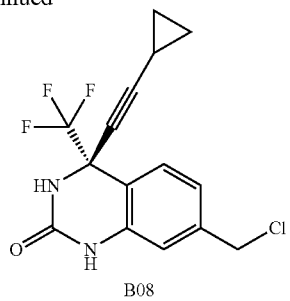

B08

To a solution of intermediate B03 (300 mg, 0.967 mmol) in anhydrous DCM (3 ml) was added DIPEA (1.013 ml, 5.80 mmol) and MsCl (0.151 ml, 1.934 mmol). The reaction was stirred at 20° C. for 16 h. The reaction was diluted with water (20 ml) and extracted with DCM (3×20 ml). The combined organic extracts were dried over $Na_2SO_4$, filtered and concentrated. The crude product was purified by prep-TLC ($SiO_2$, 5000 EtOAc/PE) to afford the title compound.

The following intermediates were prepared using a procedure analogous to that used for making B08 using the noted starting intermediate in place of B03.

| Intermediate | | |
|---|---|---|
| B09 | 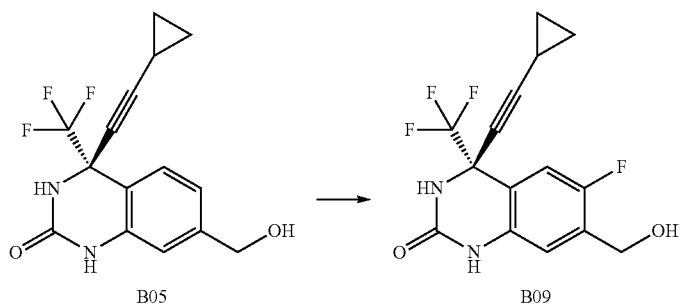 | |
| | B05 → B09 | |
| B10 | 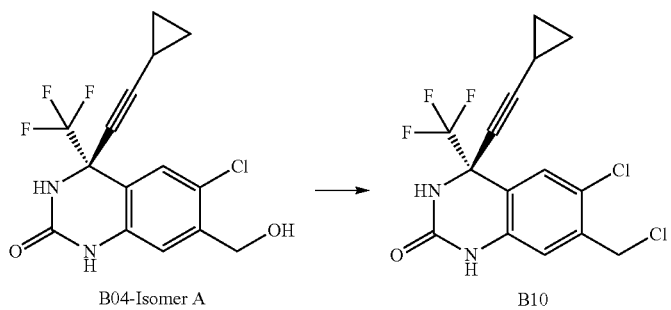 | |
| | B04-Isomer A → B10 | |
| B11 | 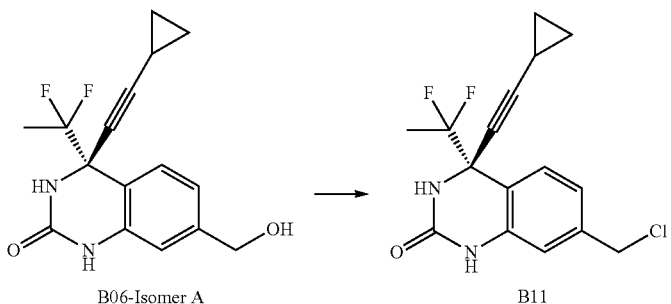 | |
| | B06-Isomer A → B11 | |

| Intermediate | |
|---|---|
| B12 | 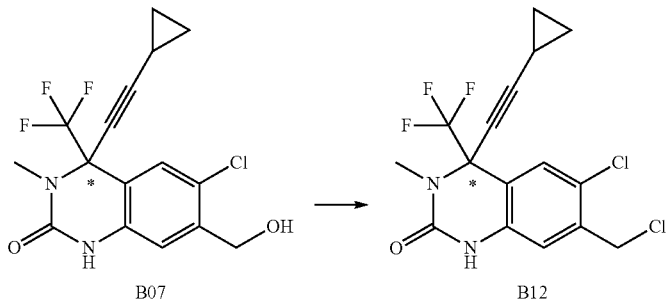 |

Intermediate B13: (S)-7-(chloromethyl)-4-(cyclopropylethynyl)-6,8-difluoro-4-(trifluoromethyl)-3,4-dihydroquinazolin-2(1H)-one

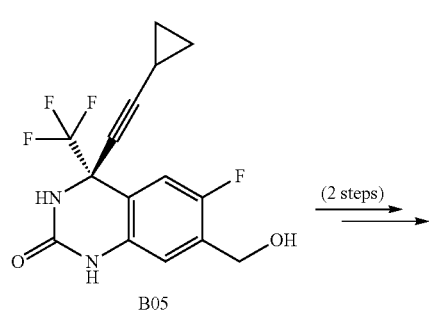

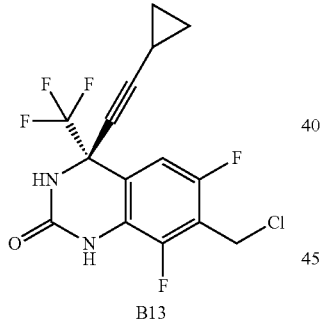

Step 1: (S)-4-(cyclopropylethynyl)-6,8-difluoro-7-(hydroxymethyl)-4-(trifluoromethyl)-3,4-dihydroquinazolin-2(1H)-one: To a solution of intermediate B05 (20 mg, 0.061 mmol) in anhydrous MeCN (0.6 ml) was added 1-fluoro-4-methyl-1,4-diazabicyclo[2.2.2]octane-1,4-diium tetrafluoroborate (19.49 mg, 0.061 mmol). The resulting mixture was stirred at 50° C. for 16 h. The reaction was then purified by HPLC (water/MeCN with 0.1% TFA) to give the title product.

Step 2: (S)-7-(chloromethyl)-4-(cyclopropylethynyl)-6,8-difluoro-4-(trifluoromethyl)-3,4-dihydroquinazolin-2(1H)-one: To a solution of (S)-4-(cyclopropylethynyl)-6,8-difluoro-7-(hydroxymethyl)-4-(trifluoromethyl)-3,4-dihydroquinazolin-2(1H)-one (10 mg, 0.061 mmol) in anhydrous DCM (0.5 ml) was added thionyl chloride (500 µL, 6.85 mmol). The resulting mixture was stirred at 40° C. for 16 h. The reaction was concentrated to give the title compound, which was used without further purification. MS (ESI) m/z 364 [M+1].

Intermediate B14 was prepared using a procedure analogous to that used for making B03 except that Intermediate A03 was replaced by Intermediate A06.

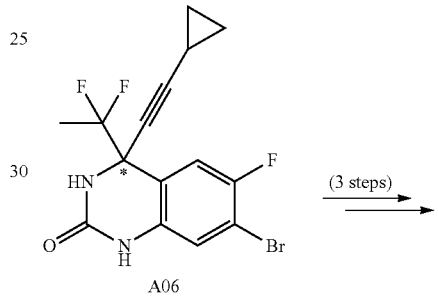

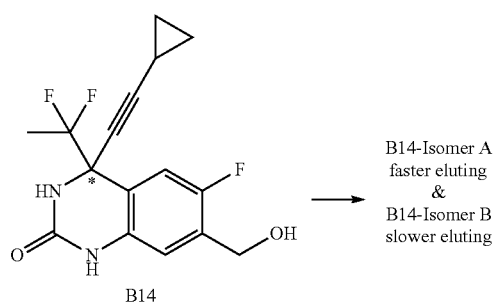

The racemic B14 product was separated by SFC (Chiralpak AD; 42% iPrOH (0.1% NH$_3$H$_2$O)/CO; 72 mL/min; 40° C.; 100 bar) to give: Isomer A (faster eluting) and Isomer B (slower eluting): MS (ESI) m/z 325.1 [M+1] for both.

Intermediate B15: (S)-7-(chloromethyl)-4-(cyclopropylethynyl)-4-(1,1-difluoroethyl)-6-fluoro-3,4-dihydroquinazolin-2(1H)-one

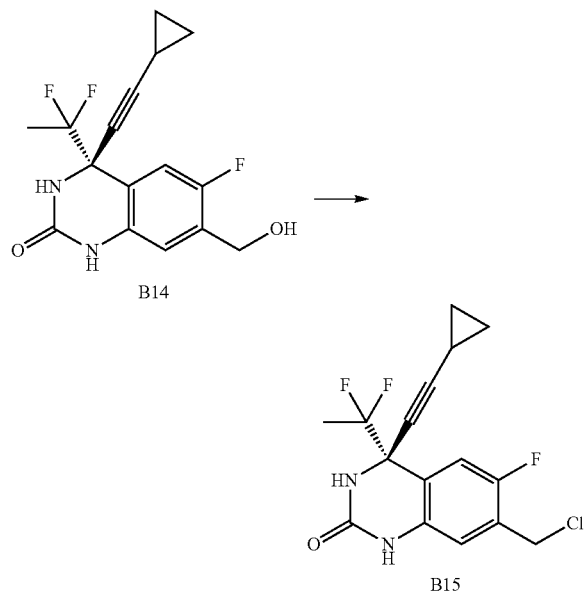

Intermediate B15 was prepared using a procedure analogous to Intermediate B08 except that Intermediate B03 was replaced by Intermediate B14. MS (ESI) m/z 343 [M+1].

Intermediate B16: (S)-7-(chloromethyl)-4-(cyclopropylethynyl)-6-methyl-4-(trifluoromethyl)-3,4-dihydroquinazolin-2(1H)-one

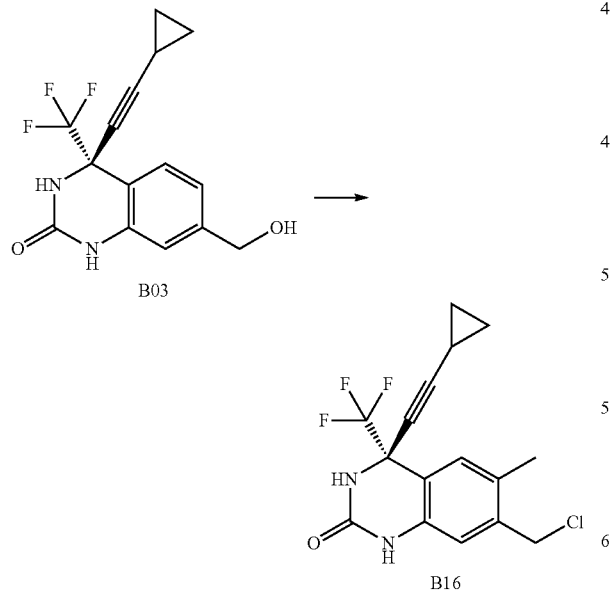

Step 1: (S)-6-bromo-4-(cyclopropylethynyl)-7-(hydroxymethyl)-4-(trifluoromethyl)-3,4-dihydroquinazolin-2(1H)-one: Intermediate B03 (2056 mg, 6.63 mmol) was dissolved in DMF (64 mL) and NBS (1179 mg, 6.63 mmol) was added and stirred at 25° C. for 16 h. The reaction mixture was diluted with sat aq NaHCO₃ sol (200 mL) and extracted with EtOAc (60 mL×3). The combined organic layers were washed with brine (200 mL), dried over Na₂SO₄, filtered and concentrated, and then, purified by MPLC (SiO₂, 40-50% EtOAc/PE) to give the title compound.

Step 2: (S)-4-(cyclopropylethynyl)-7-(hydroxymethyl)-6-methyl-4-(trifluoromethyl)-3,4-dihydroquinazolin-2(1H)-one: To a mixture of (S)-6-bromo-4-(cyclopropylethynyl)-7-(hydroxymethyl)-4-(trifluoromethyl)-3,4-dihydroquinazolin-2(1H)-one (500 mg, 1.285 mmol), trimethylboroxine (0.539 ml, 3.85 mmol) and Cs₂CO₃ (837 mg, 2.57 mmol) in 1,4-dioxane (25 mL) and water (2.5 mL) was added PdCl₂(dppf) (94 mg, 0.128 mmol) under N₂. The mixture was stirred at 80° C. for 3 h. The reaction mixture was quenched with water (100 mL) and extracted with EtOAc (30 mL×2). The combined organic layer was washed with brine (50 mL), dried over Na₂SO₄, filtered and concentrated. The resulting residue was purified by prep-HPLC (MeCN:water with 0.1% TFA) to give the title compound.

Step 3: (S)-7-(chloromethyl)-4-(cyclopropylethynyl)-6-methyl-4-(trifluoromethyl)-3,4-dihydroquinazolin-2(1H)-one: To a mixture of (S)-4-(cyclopropylethynyl)-7-(hydroxymethyl)-6-methyl-4-(trifluoromethyl)-3,4-dihydroquinazolin-2(1H)-one (80 mg, 0.247 mmol), DIPEA (0.172 ml, 0.987 mmol) in DCM (10 mL) was added MsCl (0.029 mL, 0.371 mmol) under N₂. The mixture was stirred at 25° C. for 16 h. The reaction was diluted with water (20 mL) and extracted with DCM (10 mL×2). The combined organic layers were washed with brine (20 mL), dried over Na₂SO₄, filtered and concentrated. The resulting crude was purified by prep-TLC (SiO₂, 50% EtOAc/PE) to give the title compound.

Intermediate B17: (S)-7-(chloromethyl)-4-(cyclopropylethynyl)-3-methyl-4-(trifluoromethyl)-3,4-dihydroquinazolin-2(1H)-one

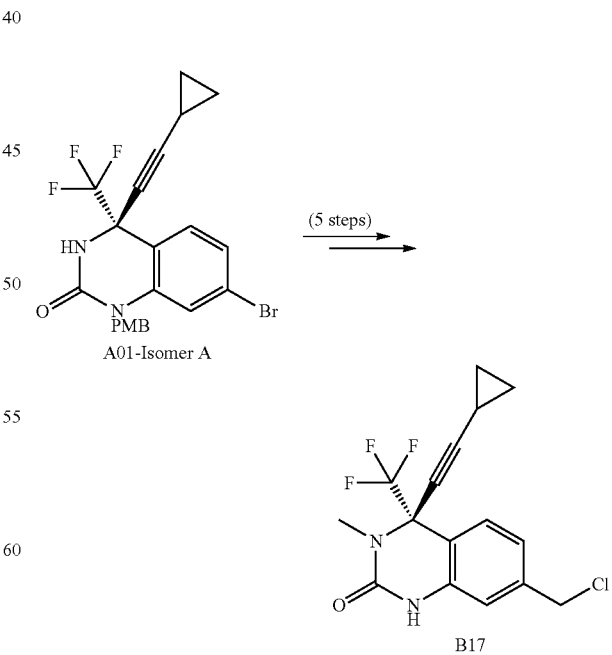

Step 1: (S)-7-bromo-4-(cyclopropylethynyl)-1-(4-methoxybenzyl)-3-methyl-4-(trifluoromethyl)-3,4-dihydroquinazolin-2(1H)-one: A solution of intermediate A01-Isomer A (1.05 g, 2.191 mmol) in anhydrous 1,4-dioxane (21.91 ml), was treated with NaH (0.175 g, 4.38 mmol). Then, CH₃I (0.411 ml, 6.57 mmol) was added and stirred at 25° C. The mixture was quenched with sat aq NH₄Cl sol, extracted with EtOAc (3×). The combined organic layers were dried over Na₂SO₄, filtered and concentrated. The resulting residue was purified by flash chromatography (SiO₂, 0-100% EtOAc: hexanes) to provide the title compound.

Step 2: (S)-4-(cyclopropylethynyl)-1-(4-methoxybenzyl)-7-(((4-methoxybenzyl)oxy)methyl)-3-methyl-4-(trifluoromethyl)-3,4-dihydroquinazolin-2(1H)-one: A mixture of (S)-7-bromo-4-(cyclopropylethynyl)-1-(4-methoxybenzyl)-3-methyl-4-(trifluoromethyl)-3,4-dihydroquinazolin-2(1H)-one (500 mg, 1.014 mmol), potassium (4-methoxy)benzyloxymethyltrifluoroborate (575 mg, 2.230 mmol) and PdCl₂(dppf) (83 mg, 0.101 mmol) in anhydrous 1,4-dioxane (10 mL), was treated with a 3 M Cs₂CO₃ aq sol (2027 μl, 6.08 mmol). The resulting mixture was irradiated at 150° C. in microwave oven for 30 min. The mixture was quenched with sat aq NH₄Cl sol, extracted with EtOAc (3×). The combined organic layers were dried over Na₂SO₄, filtered and concentrated. The residue was purified with flash chromatography (SiO₂, 0-100% EtOAc/hexanes) to give the title compound.

Step 3: (S)-4-(cyclopropylethynyl)-7-(hydroxymethyl)-1-(4-methoxybenzyl)-3-methyl-4-(trifluoromethyl)-3,4-dihydroquinazolin-2(1H)-one: A solution of (S)-4-(cyclopropylethynyl)-1-(4-methoxybenzyl)-7-(((4-methoxybenzyl)oxy)methyl)-3-methyl-4-(trifluoromethyl)-3,4-dihydroquinazolin-2(1H)-one (250 mg, 0.443 mmol) in DCM (8.8 mL) was treated with TFA (341 μl, 4.43 mmol), and stirred at 25° C. for 30 min. The mixture was carefully quenched with sat aq NaHCO₃ sol, extracted with DCM. The organic layer was concentrated and the residue was purified with flash chromatography (SiO₂, 0-100%, EtOAc/hexanes) to give the title compound. MS (ESI) m/z 445 [M+1].

Step 4: (S)-4-(cyclopropylethynyl)-7-(hydroxymethyl)-3-methyl-4-(trifluoromethyl)-3,4-dihydroquinazolin-2(1H)-one: To a solution of (S)-4-(cyclopropylethynyl)-7-(hydroxymethyl)-1-(4-methoxybenzyl)-3-methyl-4-(trifluoromethyl)-3,4-dihydroquinazolin-2(1H)-one (208 mg, 0.468 mmol) in MeCN (4 ml)/water (1 ml) was added CAN (1.03 g, 1.87 mmol). The reaction mixture was stirred at 25° C. for 3 h. The mixture was diluted with EtOAc and washed with water. The organic layer was dried, concentrated, and purified by flash column (SiO₂, 0-10% DCM/MeOH) to give the title compound.

Step 5: (S)-7-(chloromethyl)-4-(cyclopropylethynyl)-3-methyl-4-(trifluoromethyl)-3,4-dihydroquinazolin-2(1H)-one: A mixture of (S)-4-(cyclopropylethynyl)-7-(hydroxymethyl)-3-methyl-4-(trifluoromethyl)-3,4-dihydroquinazolin-2(1H)-one (83 mg, 0.256 mmol) and thionyl chloride (0.187 ml, 2.56 mmol) in DCM (1 ml) was stirred at 50° C. for 2 h. The reaction mixture was concentrated to provide the title compound.

C Intermediates

Intermediate C01:
4-(Chloromethyl)benzenesulfonamide

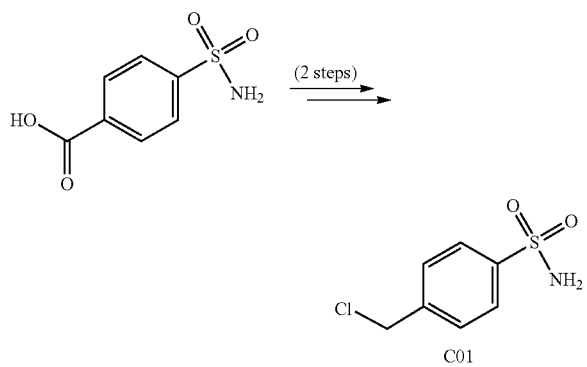

Step 1: 4-(hydroxymethyl)benzenesulfonamide: To a solution of 4-sulfamoylbenzoic acid (1 g, 4.9 mmol) in THF (20 mL) was added BH₃·Me₂S (1.5 g, 19.9 mmol) at 0° C. and stirred at 20° C. for 12 h. The reaction was quenched with MeOH and concentrated to afford the title product.

Step 2: 4-(chloromethyl)benzenesulfonamide: To a solution of 4-(hydroxymethyl)benzene sulfonamide (200 mg, 1.07 mmol) in SOCl₂ (1 ml, 13.70 mmol) was stirred at 50° C. for 30 h. The reaction was concentrated and the resulting residue was purified by prep-HPLC (water:MeCN with 0.1% TFA) to afford the title compound. MS (ESI) m/z 206 [M+1].

Intermediate C02:
4-(Chloromethyl)-3-fluorobenzenesulfonamide

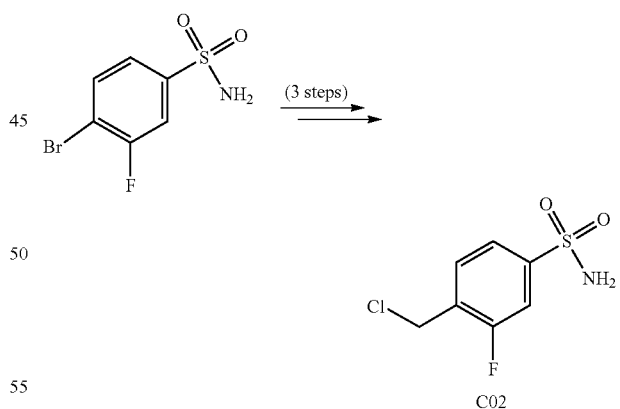

Step 1: 3-fluoro-4-vinylbenzenesulfonamide: To a solution of 4-bromo-3-fluorobenzene sulfonamide (1 g, 3.94 mmol) in 1,4-dioxane (16 mL) and water (4 mL) was added K₂CO₃ (1.63 g, 11.81 mmol), C₂H₃BF₃K (0.68 g, 5.12 mmol) and PdCl₂(dppf) (0.29 g, 0.394 mmol) under N₂. The reaction was stirred at 100° C. for 1 h under N₂. The mixture was filtered, concentrated and purified by flash column (SiO₂, 30% EtOAc/PE) to provide the title compound.

Step 2: 3-fluoro-4-(hydroxymethyl)benzenesulfonamide: To a solution of 3-fluoro-4-vinylbenzenesulfonamide (400 mg, 1.988 mmol) in DCM (5 mL) and MeOH (0.5 mL) was stirred at −70° C. under O3 for 15 min, then under O2 for 20 min. The reaction mixture was allowed to warm up to 25° C. and NaBH$_4$ (372 mg, 9.84 mmol) was added. The resulting solution was stirred at 25° C. for 1.5 h. The reaction was concentrated and the resulting residue was purified by prep-TLC (SiO$_2$, 50% EtOAc:PE) to afford the title compound.

Step 3: 4-(chloromethyl)-3-fluorobenzenesulfonamide: To a solution of 3-fluoro-4-(hydroxymethyl)benzenesulfonamide (100 mg, 0.49 mmol) in DCM (2 mL) was added SOCl$_2$ (0.711 ml, 9.75 mmol). The reaction was stirred at 50° C. for 16 h. The solution was concentrated and the crude was purified by prep-TLC (50% EtOAc:PE) to provide the title compound.

Intermediate C03: tert-Butyl
(4-(chloromethyl)-5-fluoropyrimidin-2-yl)carbamate

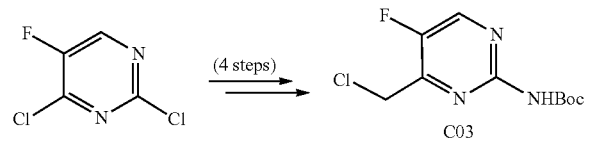

Step 1: 2-chloro-5-fluoro-4-vinylpyrimidine: To a solution of 2,4-dichloro-5-fluoropyrimidine (15 g, 90 mmol) and potassium trifluoro(vinyl)borate (13.24 g, 99 mmol) in 1,4-dioxane (150 ml) and water (30 ml) was added K$_2$CO$_3$ (37.2 g, 270 mmol) and PdCl$_2$(dppf) (6.57 g, 8.98 mmol), then the reaction mixture was stirred at 100° C. for 2 h. The reaction mixture was filtered through Celite® and extracted with EtOAc (3×150 mL). The combined organic layer was dried over Na$_2$SO$_4$, filtered and concentrated. The resulting residue was purified by flash chromatography (SiO$_2$, 20% EtOAc/PE) to afford the title compound. MS (ESI) m/z 159.1 [M+1]

Step 2: tert-butyl (5-fluoro-4-vinylpyrimidin-2-yl)carbamate: To a nitrogen purged suspension of 2-chloro-5-fluoro-4-vinylpyrimidine (3 g, 18.92 mmol) in 1,4-dioxane (10 ml) was added tert-butyl carbamate (4.43 g, 37.8 mmol), Cs$_2$CO$_3$ (12.33 g, 37.8 mmol), 4,5-bis(diphenylphosphino)-9,9-dimethylxanthene (1.09 g, 1.89 mmol) and tris(dibenzylideneacetone)dipalladium(0) (1.733 g, 1.892 mmol). The solution was stirred at 100° C. for 16 h under nitrogen atmosphere. The mixture was concentrated and purified by flash chromatography (SiO$_2$, 20% EtOAc/PE (0.1% Et$_3$N)) to afford the title compound.

Step 3: tert-butyl (5-fluoro-4-formylpyrimidin-2-yl)carbamate: Ozone was bubbled into a solution of tert-butyl (5-fluoro-4-vinylpyrimidin-2-yl)carbamate (500 mg, 2.090 mmol) in DCM (10 ml) at −78° C. for 15 minutes. After excess O3 was purged by O2 for 20 min. Sodium triacetoxyborohydride (439 mg, 2.073 mmol) was added and then, the reaction mixture was stirred at 0° C. for 0.5 h. The reaction mixture was quenched with water and sat aq NaHCO$_3$ sol (20 ml) and extracted with DCM (20 ml). The organic layer was washed with brine, dried over Na$_2$SO$_4$, filtered and concentrated. The resulting residue was purified by prep-TLC (SiO$_2$, 5% MeOH:DCM) to afford the title compound.

Step 4: tert-butyl (4-(chloromethyl)-5-fluoropyrimidin-2-yl)carbamate: To a solution of tert-butyl (5-fluoro-4-(hydroxymethyl)pyrimidin-2-yl)carbamate (70 mg, 0.288 mmol) in DCM (0.5 ml) was added DIPEA (0.151 ml, 0.863 mmol) and MsCl (0.045 ml, 0.576 mmol). The reaction was stirred at 20° C. for 16 h. The reaction mixture was concentrated and purified by prep-TLC (SiO$_2$, 30% EtOAc/PE) to provide the title compound.

Intermediate C04:
2-Amino-4-(chloromethyl)benzenesulfonamide

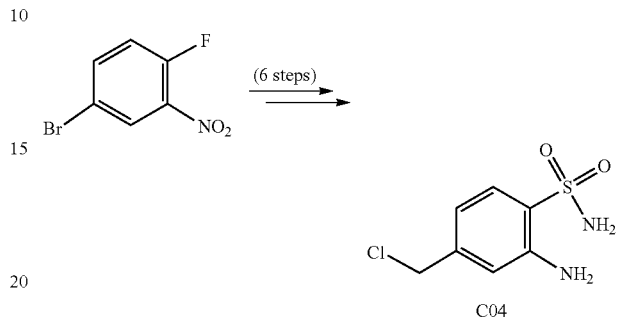

Step 1: 4-bromo-2-nitrobenzenesulfonic acid: To a solution of 4-bromo-1-fluoro-2-nitrobenzene (10 g, 45.5 mmol) in EtOH (120 ml) was added a mixture of sodium sulfite (14.32 g, 114 mmol) in EtOH (120 ml) and H$_2$O (250 ml). The reaction mixture was stirred at 70° C. for 15 h. The reaction pH was adjusted to 1 with aq 2 M HCl sol (100 mL) then concentrated. The resulting residue was dissolved in brine (200 mL) and water (50 ml) and the resulting mixture was heated at 110° C. until the solid was fully dissolved. The mixture was cooled to 20° C. and the solid was collected by filtration, washed with water and dried to provide the title compound.

Step 2: 4-bromo-2-nitrobenzenesulfonamide: To a solution of 4-bromo-2-nitrobenzenesulfonic acid (3 g, 10.64 mmol) and DMF (0.025 ml, 0.319 mmol) in toluene (50 ml) was dropwise added SOCl$_2$ (5.05 ml, 69.1 mmol). Then, the reaction was stirred at 115° C. for 4 h, cooled to 20° C. and concentrated. The residue was dissolved in toluene (4 ml) and cooled to −10° C. NH$_4$OH (1 ml, 10.64 mmol) in THF (10 ml) was added and the resulting mixture was stirred at −10° C. for 2 h. The reaction was adjusted to pH~4 with aq HCl sol (6 M, 2 mL). The reaction mixture was quenched with saturated NH$_4$Cl (10 mL). The reaction mixture was extracted with EtOAc (3×10 ml). The organic layer was separated, dried over Na$_2$SO$_4$, filtered and concentrated. The crude product was purified by flash chromatography (SiO$_2$, 0-30% EtOAc/PE) to afford the title compound. MS (ESI) m/z 303, 305 [M+1].

Step 3: 2-nitro-4-vinylbenzenesulfonamide: To a solution of 4-bromo-2-nitrobenzenesulfonamide (1.1 g, 3.91 mmol) in 1,4-dioxane (10 ml) and water (2 ml), was added K$_2$CO$_3$ (1.082 g, 7.83 mmol), C2H$_3$BF$_3$K (0.786 g, 5.87 mmol) and PdCl$_2$(dppf) (0.286 g, 0.391 mmol). The reaction was stirred at 100° C. for 3 h under N$_2$. The reaction mixture was quenched with water (20 mL) and extracted with EtOAc (3×25 ml). The organic layer was separated, dried over Na$_2$SO$_4$, filtered and concentrated in vacuo to dryness. The crude product was purified by flash silica gel chromatography (0-30% EtOAc/PE) to afford the title compound. MS (ESI) m/z 251 [M+1].

Step 4: 4-(hydroxymethyl)-2-nitrobenzenesulfonamide: To a solution of 2-nitro-4-vinylbenzenesulfonamide (800 mg, 3.51 mmol) in DCM (8 ml) and MeOH (0.8 ml) was stirred at −70° C. under O3 for 15 min, then under O2 for 20 min. Then, NaBH₄ (663 mg, 17.53 mmol) was added the reaction at −78° C. The reaction was stirred at 20° C. for 1 h. The reaction mixture was quenched with sat aq NH₄Cl sol (20 mL) and extracted with EtOAc (3×25 ml). The combined organic layer was dried over Na₂SO₄, filtered and concentrated. The residue was purified by MPLC (5% EtOAc/PE) to afford the title compound. MS (ESI) m/z 233 [M+1].

Step 5: 2-amino-4-(hydroxymethyl)benzenesulfonamide: A mixture of 4-(hydroxymethyl)-2-nitrobenzenesulfonamide (200 mg, 0.861 mmol) and NH₄Cl (230 mg, 4.31 mmol), iron (240 mg, 4.31 mmol) in ethanol (2 ml) and water (0.5 ml) was stirred at 80° C. for 3 h. The mixture was filtered through a pad of Celite® and washed with 1:1 mixture of THF/EtOH (3×5 mL). The filtrate was concentrated and the residue was separated in 1:1 mixture of THF/EtOAc (5 mL) and water (10 mL), extracted with a 1:1 mixture of THF/EtOAc (3×5 ml). The combined organic layer was dried over Na₂SO₄, filtered and concentrated to afford the title compound, which was used without further purification. MS (ESI) m/z 203 [M+1].

Step 6: 2-amino-4-(chloromethyl)benzenesulfonamide: To a solution of 2-amino-4-(hydroxymethyl)benzenesulfonamide (150 mg, 0.742 mmol) in DCM (1 ml) and 1,4-dioxane (0.5 ml) was added SOCl₂ (0.162 ml, 2.225 mmol) at 0° C. Then, the reaction mixture was stirred at 20° C. for 16 h. The reaction mixture was diluted with DCM (3 mL), then added to sat aq NaHCO₃ sol (5 mL) at 0° C., and then extracted with EtOAc (2×5 mL). The combined organic phase was dried over Na₂SO₄, filtered and concentrated. The residue was purified by prep HPLC (water: MeCN with 0.1% TFA) to afford the title compound. MS (ESI) m/z 221 [M+1].

Intermediate C05:
5-(chloromethyl)-4-methoxy-2,6-dimethylpyrimidine

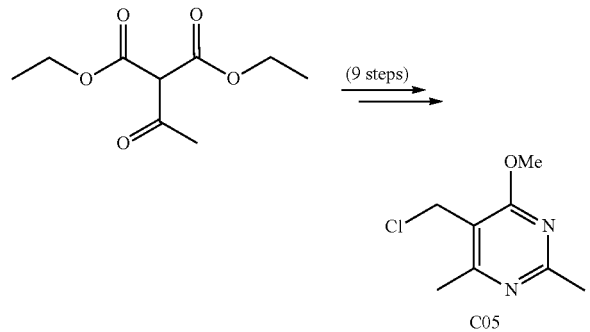

C05

Step 1: 1,3-diethyl 2-(1-hydroxyethyl)propanedioate: Into a 50-L 4-necked round-bottom flask purged and maintained with an inert atmosphere of nitrogen, was placed a solution of 1,3-diethyl 2-acetylpropanedioate (5000 g, 24.73 mol) in AcOH (25 L) and followed by the addition of NaBH₄ (1220 g, 32.25 mol) in several batches at 0° C. over 1 h. The resulting solution was stirred at 0° C. for 3 h, and then quenched with water (2 L), and extracted with DCM (3×5 L). The combined organic layer was concentrated and the residue was purified by column chromatography (SiO₂, 50% EtOAc/hexanes) to afford the title compound.

Step 2: 1,3-diethyl 2-[1-(acetyloxy)ethyl]propanedioate: Into a 50-L 4-necked round-bottom flask purged and maintained with an inert atmosphere of nitrogen, was placed a solution of 1,3-diethyl 2-(1-hydroxyethyl)propanedioate (3800 g, 18.61 mol) in DCM (38 L), acetic anhydride (2280 g, 22.35 mol), TEA (3762 g, 37.18 mol), 4-dimethylaminopyridine (454 g, 3.72 mol). The resulting solution was stirred at 60° C. for 16 h, then quenched by the addition of water (4 L), and extracted with DCM (3×5 L). The combined organic layer was concentrated. The residue was purified by column chromatography (SiO₂, 2% EtOAc/PE) to afford the title compound.

Step 3: 1,3-diethyl 2-ethylidenepropanedioate: Into a 10-L 4-necked round-bottom flask purged and maintained with an inert atmosphere of nitrogen, was placed 1,3-diethyl 2-[1-(acetyloxy) ethyl]propanedioate (3200 g, 12.99 mol) and followed by dropwise addition of acetaldehyde (1716 g, 38.95 mol) with stirring at 80° C. over 40 min. The resulting solution was stirred at 80° C. for 16 h, then cooled to 20° C. and quenched by the addition of water (5 L), and then extracted with EtOAc (3×2 L). The combined organic layer was concentrated and purified by column chromatography (SiO₂, 0.5% EtOAc/PE) to afford the title compound.

Step 4: Ethyl 2,4-dimethyl-6-oxo-1,4,5,6-tetrahydropyrimidine-5-carboxylate: Into a 50-L 4-necked round-bottom flask purged and maintained with an inert atmosphere of nitrogen, was placed a solution of ethanimidamide hydrochloride (1060 g, 11.21 mol) in ethanol (30 L), NaOEt (1380 g, 14.68 mol), and followed by dropwise addition of a solution of 1,3-diethyl 2-ethylidene propanedioate (1700 g, 9.13 mol) in ethanol (4 L) with stirring at 60° C. over 30 min. The resulting solution was stirred at 60° C. for 2 h, and then cooled to 20° C. The mixture was filtered and concentrated to afford the title compound, which was used as is in the next step.

Step 5: Ethyl 2,4-dimethyl-6-oxo-1,6-dihydropyrimidine-5-carboxylate: Into a 50-L 4-necked round-bottom flask purged and maintained with an inert atmosphere of nitrogen, was placed a solution of ethyl 2,4-dimethyl-6-oxo-1,4,5,6-tetrahydropyrimidine-5-carboxylate (2500 g, 12.61 mol) in 1,4-dioxane (25 L), potassium carbonate (7200 g, 52.09 mol), NBS (2300 g, 12.92 mol), BPO (78 g, 304.39 mmol). The resulting solution was stirred at 80° C. for 16 h. The reaction mixture was cooled down to 20° C., and then quenched by the addition of water (10 L). The pH value of the solution was adjusted to 7 with aq HCl (12N). The resulting solution was extracted with DCM (3×5 L). The combined organic layer was concentrated and the residue was purified by column chromatography (SiO₂, 5% MeOH/DCM) to afford the title compound.

Step 6: Ethyl 4-chloro-2,6-dimethylpyrimidine-5-carboxylate: Into a 50-L 4-necked round-bottom flask purged with N₂, was placed ethyl 2,4-dimethyl-6-oxo-1,6-dihydropyrimidine-5-carboxylate (1100 g, 5.61 mol) and POCl₃ (11 L). The resulting solution was stirred at 80° C. for 5 h, and then concentrated to afford the title compound, which was used in the next step as is.

Step 7: Ethyl 4-methoxy-2,6-dimethylpyrimidine-5-carboxylate: Into a 50-L 4-necked round-bottom flask purged with N₂, was placed a solution of ethyl 4-chloro-2,6-dimethylpyrimidine-5-carboxylate (2000 g, 9.32 mol) in MeOH (20 L). The resulting solution was stirred at 20° C. for 2 h, and concentrated. The residue was dissolved in water (5 L) and extracted with DCM (3×2 L). The combined organic layer was concentrated under reduced pressure. The residue was purified by flash chromatography (SiO₂, 10% EtOAc/PE) to afford the title compound.

Step 8: (4-methoxy-2,6-dimethylpyrimidin-5-yl)MeOH: Into a 10-L 4-necked round-bottom flask purged with N₂, was placed a solution of ethyl 4-methoxy-2,6-dimethylpyrimidine-5-carboxylate (270 g, 1.28 mol) in THF (2.7 L) and followed by the addition of LiAlH₄ (54 g, 1.42 mol) in several batches at 0° C. over 30 min. The resulting solution was stirred at 0° C. for 2 h, and then quenched by the addition of 15% NaOH sol (65 mL). After stirred for 1 h, the mixture was filtered and concentrated to afford the title compound.

Step 9: 5-(chloromethyl)-4-methoxy-2,6-dimethylpyrimidine: To a stirred solution of (4-methoxy-2,6-dimethylpyrimidin-5-yl)methanol (1 g, 5.95 mmol) in DCM (15 mL) was added DIPEA (3.12 mL, 17.84 mmol) and MsCl (1.390 mL, 17.84 mmol) at 0° C. under $N_2$. The resulting mixture was stirred at 15° C. for 2 h and then, diluted with water (15 mL) and extracted with DCM (3×20 mL). The combined organic layer was dried over $Na_2SO_4$, filtered and concentrated. The residue was purified by column chromatography ($SiO_2$, 0-30% EtOAc/PE) to afford the title compound. MS (ESI) m z 187 [M+1]

Intermediate C06: 2-amino-4-bromonicotinonitrile

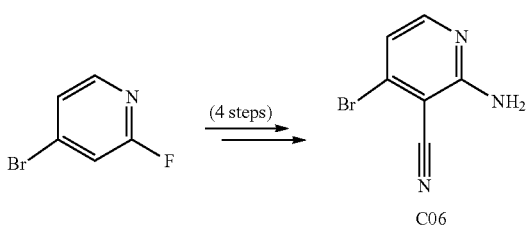 [SMILES: Fc1cc(Br)ccn1 ; N#Cc1c(Br)ccnc1N ; "C06"]

Step 1: 4-bromo-2-fluoronicotinic acid: To a solution of 4-bromo-2-fluoropyridine (10 g, 56.8 mmol) in THF (120 ml) was added LDA (34.1 ml, 68.2 mmol) dropwise at −78° C. under $N_2$, and was stirred for 0.5 h at −78° C. The mixture was poured into C02 (100 g, 2272 mmol) and diluted with $H_2O$ (100 mL) and extracted with EtOAc (2×50 mL), the pH of the aq phase was adjusted with aq HCl (37%) to pH=6. The mixture was extracted with EtOAc (3×100 mL) and washed with brine (100 mL), dried over $Na_2SO_4$, filtered and concentrated to afford the title product.

Step 2: 4-bromo-2-fluoronicotinamide: The 4-bromo-2-fluoronicotinic acid (3.37 g, 15.32 mmol) was dissolved in 1,4-dioxane (30 mL) followed by the addition of pyridine (0.743 mL, 9.19 mmol), Boc₂O (4.62 mL, 19.91 mmol) and ammonium bicarbonate (1.574 g, 19.91 mmol). The mixture was stirred at 15° C. for 12 h. The solution was concentrated and the crude was purified by prep-TLC ($SiO_2$, 50% EtOAc:PE) to afford the title compound.

Step 3: 4-bromo-2-fluoronicotinonitrile: To a solution of 4-bromo-2-fluoronicotinamide (2.27 g, 10.36 mmol) in THF (20 ml) was added TFAA (4.39 ml, 31.1 mmol) and Et₃N (4.33 ml, 31.1 mmol). The reaction was stirred at 0° C. for 1 h. The mixture was poured into water (5 mL) and extracted with EtOAc (2×15 mL). The combined organic layer was washed with sat aq $NaHCO_3$ sol (15 mL), brine (15 mL) and dried over $Na_2SO_4$, filtered and concentrated. The residue was purified by column chromatography ($SiO_2$, 5-30% EtOAc/PE) to afford the title product.

Step 4: 2-amino-4-bromonicotinonitrile: A solution of 4-bromo-2-fluoronicotinonitrile (200 mg, 0.995 mmol) in ammonia (1 ml) was stirred at 20° C. for 1 h. The solution was bubbled with $N_2$ to remove the ammonia, then extracted with EtOAc (2×5 mL). The combined organic layer was dried over $Na_2SO_4$, filtered and concentrated to afford the title product.

Intermediate C07: (6-(Chloromethyl)pyridin-3-yl)methanol

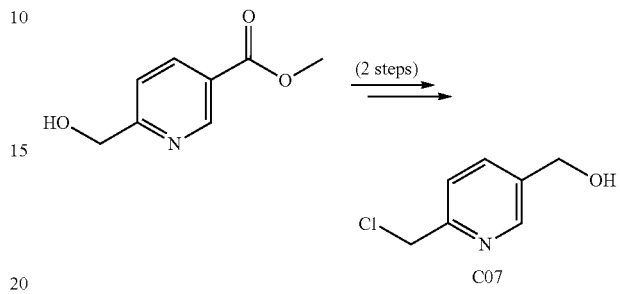

Step 1: Methyl 6-(chloromethyl)nicotinate: Methyl 6-(hydroxymethyl)nicotinate (1000 mg, 5.98 mmol) was dissolved in DCE (30 mL) at 0° C. and DIPEA (2.3 mL, 13.16 mmol) was added followed by the addition of MsCl (513 μL, 6.58 mmol). The reaction was stirred for 16 h at 25° C. The reaction was concentrated and the residue was dissolved in EtOAc (50 mL) and washed with water (2×10 mL), brine (10 mL), dried over $MgSO_4$, and concentrated. The residue was purified by flash chromatography ($SiO_2$, 0-70% EtOAc:hexanes) to afford the title compound.

Step 2: (6-(Chloromethyl)pyridin-3-yl)methanol: Methyl 6-(chloromethyl)nicotinate (1 g, 5.39 mmol) was dissolved in THF (24.49 ml) and the temperature was cooled to 0° C., then a 2 M LiAlH₄ sol in THF (1.47 mL, 5.88 mmol) was added dropwise. Upon completion of addition of LiAlH₄, the resulting mixture was stirred at 0° C. for 30 min. The reaction was quenched with the slow addition of 0.22 mL of water followed by 0.22 mL of 15% aq NaOH. This mixture was stirred for 10 min, then 0.88 mL water were added and brought to ambient temperature and the reaction mixture was stirred for additional 15 min. The mixture was filtered and diluted with DCM (20 mL), dried over $MgSO_4$, filtered and concentrated. The residue was purified by flash chromatography ($SiO_2$, 0-100% EtOAc:hexanes) to afford the title compound.

Intermediate C08: 2-(Chloromethyl)-5-(2-((tetrahydro-2H-pyran-2-yl)oxy)ethoxy)pyridine

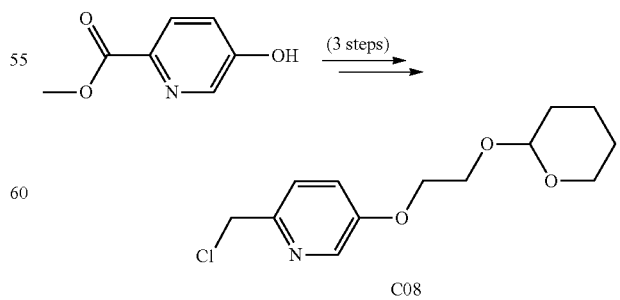

Step 1: Methyl 5-(2-((tetrahydro-2H-pyran-2-yl)oxy) ethoxy)picolinate: Methyl 5-hydroxypicolinate (100 mg, 0.653 mmol) was dissolved in DMF (3265 µL) and Cs₂CO₃ (319 mg, 0.980 mmol) and 2-(2-bromoethoxy)tetrahydro-2H-pyran (150 mg, 0.718 mmol) was added. The reaction mixture was stirred at 40° C. for 16 h, and then, diluted with EtOAc (50 mL) and washed with H₂O (20 mL) and dried over MgSO₄, filtered, and concentrated. The residue was purified by flash chromatography (SiO₂, 0-100% EtOAc/hexanes) to afford the title compound.

Step 2: (5-(2-((Tetrahydro-2H-pyran-2-yl)oxy)ethoxy)pyridin-2-yl)methanol: Methyl 5-(2-((tetrahydro-2H-pyran-2-yl)oxy)ethoxy)picolinate (95 mg, 0.338 mmol) was dissolved in THF (1535 µL) and chilled to 0° C., then a 2 M LiAlH₄ sol in THF (77 µL, 0.154 mmol) was added dropwise. Then, the reaction was stirred at 0° C. for 30 min, and quenched with sat aq Rochelle salt sol. (10 drops). The mixture was dissolved in EtOAc (10 mL) and washed with water (2×5 mL), brine, dried over MgSO₄, filtered and concentrated. The resulting crude was purified by flash chromatography (SiO₂, 0-100% EtOAc:hexanes) to give the title compound.

Step 3: 2-(Chloromethyl)-5-(2-((tetrahydro-2H-pyran-2-yl)oxy)ethoxy)pyridine: (5-(2-((Tetrahydro-2H-pyran-2-yl)oxy)ethoxy)pyridin-2-yl)methanol (2000 mg, 7.90 mmol) was dissolved in DCE (39.5 mL) and DIPEA (2.7 mL, 11.84 mmol) followed by the addition of MsCl (738 µL, 9.48 mmol) and stirred 16 h. The solution was concentrated and purified by flash chromatography (SiO₂, 0-100% EtOAc/hexanes) to give the title compound.

Intermediate C09: 2-(Chloromethyl)-5-(2-((tetrahydro-2H-pyran-2-yl)oxy)ethoxy) isonicotinonitrile

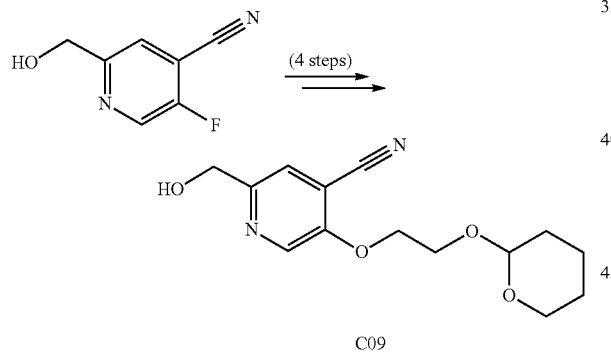

C09

Step 1: 2-(((Tert-butyldimethylsilyl)oxy)methyl)-5-fluoroisonicotinonitrile: 5-Fluoro-2-(hydroxymethyl)isonicotinonitrile (2.0 g, 13.15 mmol) was dissolved in DCM (65.7 mL) and TBSCl (2.58 g, 17.09 mmol) and imidazole (1.343 g, 19.72 mmol) were added and stirred for 16 h at 25° C. The reaction was filtered and concentrated. The resulting crude was purified by flash chromatography (SiO₂, 0-30% EtOAc/hexanes) to give the title compound.

Step 2: 2-(((Tert-butyldimethylsilyl)oxy)methyl)-5-(2-((tetrahydro-2H-pyran-2-yl)oxy)ethoxy) isonicotinonitrile: 2-((Tetrahydro-2H-pyran-2-yl)oxy)ethanol (1.405 g, 9.61 mmol) was dissolved in DMF (10 mL) and KOtBu (1.079 g, 9.61 mmol) was added and the resulting mixture was sonicated for 10 min. The reaction was cooled to 0° C., then, 2-(((tert-butyldimethylsilyl) oxy)methyl)-5-fluoroisonicotinonitrile (2.134 g, 8.01 mmol) was added in one portion. The resulting mixture was stirred for 30 min at 0° C. The reaction mixture was diluted with EtOAc (50 mL) and washed with water (2×10 mL). The organic layer was concentrated and purified by flash chromatography (SiO₂, 0-100% EtOAc/hexanes) to give the title compound.

Step 3: 2-(hydroxymethyl)-5-(2-((tetrahydro-2H-pyran-2-yl)oxy)ethoxy)isonicotinonitrile: 2-(((Tert-butyldimethylsilyl)oxy)methyl)-5-(2-((tetrahydro-2H-pyran-2-yl)oxy) ethoxy) isonicotinonitrile (2.26 g, 5.75 mmol) was dissolved in THF (28.8 mL) and a 1 M TBAF sol in THF (5.75 mL, 5.75 mmol) was added. The resulting reaction was stirred 1 h at 25° C. The mixture was diluted in EtOAc (50 mL) and washed with (2×10 mL), dried over MgSO₄, filtered and concentrated. The resulting residue was purified by flash chromatography (SiO₂, 0-100% (3:1 EtOAc:EtOH):hexanes) to give the title compound.

Step 4: 2-(Chloromethyl)-5-(2-((tetrahydro-2H-pyran-2-yl)oxy)ethoxy)isonicotinonitrile: 2-(Hydroxymethyl)-5-(2-((tetrahydro-2H-pyran-2-yl)oxy)ethoxy)isonicotinonitrile (5 g, 17.97 mmol) was dissolved in DCE (90 mL) and DIPEA (6.90 mL, 39.5 mmol) was added and the reaction was cooled to 0° C. and MsCl (1.540 mL, 19.76 mmol) was added. The resulting mixture was stirred for 16 h at 25° C. The reaction was concentrated, and the residue was dissolved in EtOAc (50 mL) and washed with water (2×20 mL), brine (20 mL), and dried over MgSO₄, filtered and concentrated. The resulting residue was purified by flash chromatography (SiO₂, 0-100% EtOAc/hexanes) to give the title compound.

Intermediate C10: Tert-butyl (3-(((tert-butyldimethylsilyl)oxy)methyl)-6-(trimethylstannyl)pyridin-2-yl) carbamate

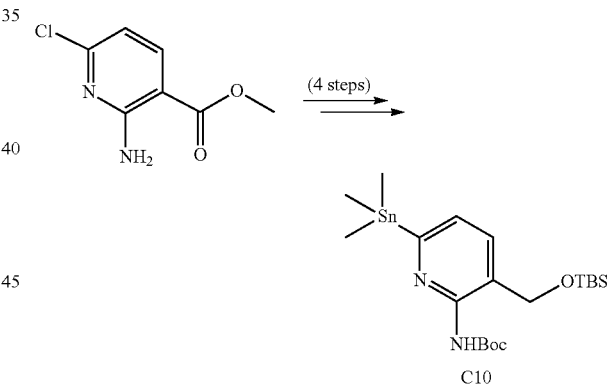

C10

Step 1: (2-Amino-6-chloropyridin-3-yl)methanol: Methyl 2-amino-6-chloronicotinate (1 g, 5.36 mmol) was dissolved in THF (25 ml) and chilled to 0° C., then a 2 M LiAlH₄ sol in THF (2.9 mL, 5.85 mmol) was added dropwise. Then, the reaction was stirred at 0° C. for 30 min. The reaction was quenched with 0.22 mL of H₂O followed by 0.22 mL of an aq 15% NaOH sol, and then an additional 0.88 mL of water. The resulting mixture was stirred at 25° C. for 30 min, and then, filtered. The filtrate was diluted with DCM (20 mL), dried over MgSO₄, filtered and concentrated. The residue was purified by flash chromatography (SiO₂, 0-80% EtOAc/hexanes) to provide the title compound.

Step 2: 3-(((Tert-butyldimethylsilyl)oxy)methyl)-6-chloropyridin-2-amine: (2-Amino-6-chloropyridin-3-yl)methanol (773 mg, 4.87 mmol) was dissolved in DMF (2.5 mL) and imidazole (398 mg, 5.85 mmol) was added followed by the addition of TBSCl (735 mg, 4.87 mmol) and stirred at 25° C. for 16 h. The reaction mixture was diluted with EtOAc (50 mL) and washed with water (2×20 mL), brine (20 mL) and dried over MgSO₄, filtered and concentrated. The resulting residue was purified by flash chromatography (SiO₂, 0-100% EtOAc/hexanes) to provide the title compound.

Step 3: Tert-butyl (3-(((tert-butyldimethylsilyl)oxy)methyl)-6-chloropyridin-2-yl)carbamate: 3-(((Tert-butyldimethylsilyl)oxy)methyl)-6-chloropyridin-2-amine (992 mg, 3.64 mmol) was dissolved in THF (18 mL) and Boc₂O (1688 µL, 7.27 mmol) followed by the addition of DMAP (4.44 mg, 0.036 mmol) and the resulting mixture was stirred at 25° C. for 16 h. The reaction was concentrated and the resulting residue was purified by flash chromatography (SiO₂, 0-30% EtOAc/hexanes) to provide the title compound. MS (ESI) m/z 373 [M+1].

Step 4: Tert-butyl (3-(((tert-butyldimethylsilyl)oxy)methyl)-6-(trimethylstannyl)pyridin-2-yl)carbamate: A mixture of tert-butyl (3-(((tert-butyldimethylsilyl)oxy)methyl)-6-chloropyridin-2-yl)carbamate (300 mg, 0.80 mmol), hexamethylditin (0.2 mL, 0.96 mmol), and Pd(PPh₃)₄ (93 mg, 0.080 mmol) in 1,4-dioxane (0.2 ml) was bubbled with N₂ for 2 min, then heated at 115° C. for 16 h. Then, the reaction was treated with a sat aq KF sol (3 mL) at 25° C. and stirred for 10 min. The mixture was filtered and the filtrate was diluted with EtOAc (10 mL) and washed with water (2×5 mL) and concentrated. The resulting crude was purified by flash chromatography (SiO₂, 0-30% EtOAc/hexanes) to provide the title compound.

Intermediate C11:
5-(chloromethyl)-4-methoxy-6-methylpyrimidine

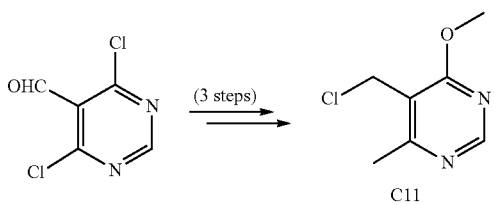

Step 1: (4,6-dichloro-2-methylpyrimidin-5-yl)methanol: A solution of 4,6-dichloro-2-methylpyrimidine-5-carbaldehyde 4,6-dichloropyrimidine-5-carbaldehyde (386 mg, 2.181 mmol) in MeOH (14 mL) was cooled to −78° C., was then added a 25% sodium methoxide sol in MeOH (0.499 mL, 2.181 mmol) dropwise. The resulting mixture was allowed to warm to 25° C. and stirred for addition 30 min, and then cooled to 0° C. in an ice bath, then NaBH₄ (83 mg, 2.181 mmol) was added in portions slowly. The reaction was quenched with water and EtOAc. The layers were separated and the aqueous layer was further extracted with EtOAc. The combined organic layer was washed with brine, dried over anhydrous Na₂SO₄, filtered and concentrated under reduced pressure. The residue was purified by flash chromatography (SiO₂, 0-50% EtOAc/hexanes) to afford the title compound.

Step 2: (4-methoxy-6-methylpyrimidin-5-yl)methanol: A stirred solution of (4-chloro-6-methoxypyrimidin-5-yl)methanol (168 mg, 0.962 mmol), PdCl₂(dppf).DCM complex (39.3 mg, 0.048 mmol) and Cs₂CO₃ (941 mg, 2.89 mmol) in 1,4-dioxane (4.0 mL) and water (802 µL) was degassed and purged with N₂, then trimethylboroxine (269 µL, 1.925 mmol) was added and heated at 100° C. for 18 h. The reaction mixture was cooled to 25° C., filtered through Celite® and concentrated. The residue was purified by flash chromatography (0-5% MeOH/DCM) to afford the title compound.

Step 3: 5-(chloromethyl)-4-methoxy-6-methylpyrimidine: To a stirred solution of 4-methoxy-6-methylpyrimidin-5-yl)methanol (106 mg, 0.69 mmol) in DCE (1.0 mL), was added thionyl chloride (2.51 mL, 34.4 mmol) and stirred at 60° C. for 3 h. The reaction mixture was concentrated to afford the title compound, which was used without further purification.

Intermediate C12: tert-butyl
(6-(chloromethyl)pyridin-2-yl)carbamate

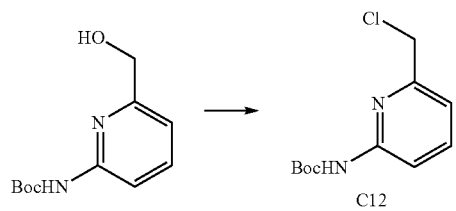

Thionyl chloride (0.199 ml, 2.72 mmol) was added slowly to a solution of tert-butyl 6-(hydroxymethyl)pyridin-2-yl-carbonate (122 mg, 0.544 mmol) in DCM (2 ml) at 0° C. The resulting mixture was stirred at 0° C. for 1 h, then at 25° C. for another 1 h. The reaction mixture was concentrated to provide the title compound, which was used without further purification.

Intermediate C13: tert-butyl
(6-(chloromethyl)-5-fluoropyridin-2-yl)carbamate

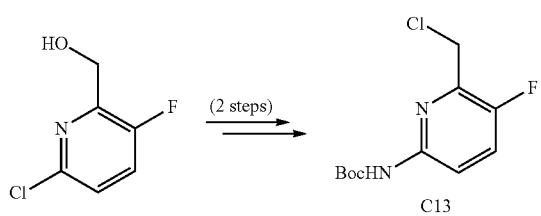

Step 1: tert-butyl (5-fluoro-6-(hydroxymethyl)pyridin-2-yl)carbamate: A mixture of (6-chloro-3-fluoropyridin-2-yl)methanol (0.129 g, 0.798 mmol), tert-butyl carbamate (0.187 g, 1.597 mmol), K₃PO₄ (0.678 g, 3.19 mmol), and Brettphos Pd G3 (0.072 g, 0.080 mmol) in 1,4-dioxane (6 ml) was bubbled with N₂ for 5 min, then heated at 90° C. for 2 h. The reaction mixture was filtered and concentrated. The residue was purified by column chromatography (SiO₂, 0-30% EtOAc:hexanes) to give the title compound.

Step 2: tert-butyl (6-(chloromethyl)-5-fluoropyridin-2-yl)carbamate: Thionyl chloride (0.093 ml, 1.28 mmol) was added slowly to a solution of tert-butyl (4-fluoro-6-(hydroxymethyl)pyridin-2-yl)carbamate (62 mg, 0.256 mmol) in DCM (2 ml) at 0° C. The mixture was stirred at 0° C. for 0.5 h, then at 25° C. for 1 h. The reaction mixture was concentrated to give the title compound, which was used without further purification.

Intermediate C14: tert-butyl (4-(chloromethyl)-5-fluoropyridin-2-yl)carbamate

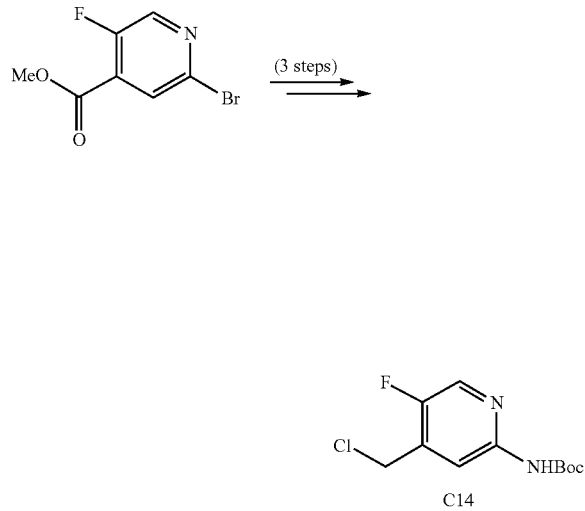

Example 1: (S)-4-(cyclopropylethynyl)-7-((6-methyl-2-oxo-1,2-dihydropyridin-3-yl)methyl)-4-(trifluoromethyl)-3,4-dihydroquinazolin-2(1H)-one

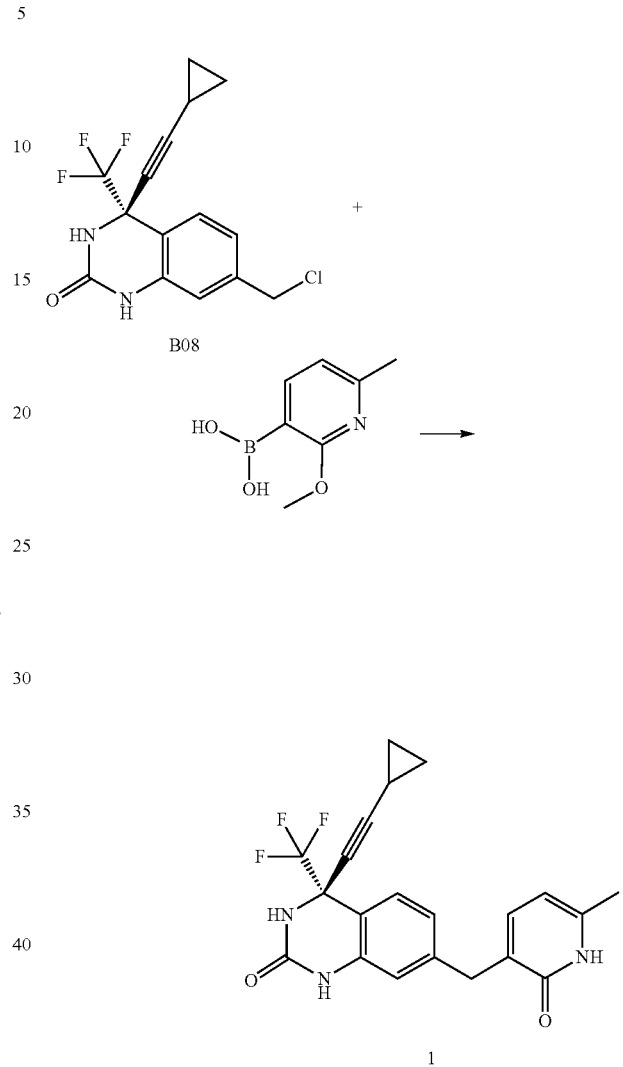

Step 1: methyl 2-((tert-butoxycarbonyl)amino)-5-fluoroisonicotinate: To a nitrogen purged suspension solution of methyl 2-bromo-5-fluoroisonicotinate (1.5 g, 6.41 mmol) in 1,4-dioxane (15 ml) was added tert-butyl carbamate (0.901 g, 7.69 mmol), $Cs_2CO_3$ (2.92 g, 8.97 mmol), Xantphos (0.148 g, 0.256 mmol) and tris(dibenzylideneacetone)dipalladium (0) (0.117 g, 0.128 mmol). The solution was stirred at 100° C. for 2 h under nitrogen atmosphere. The mixture was filtered through Celite® and diluted with water (30 mL) and extracted with EtOAc (20 mL×3). The combined organic layer was washed with water (20 mL), brine (20 mL), dried over $Na_2SO_4$, filtered and concentrated to give the title compound, which was used without further purification.

Step 2: tert-butyl (5-fluoro-4-(hydroxymethyl)pyridin-2-yl)carbamate: Methyl 2-((tert-butoxycarbonyl)amino)-5-fluoroisonicotinate (1.84 g, 6.81 mmol) and $CaCl_2$) (1.133 g, 10.21 mmol) was dissolved in EtOH (80 ml). The solution was cooled to 0° C., then $NaBH_4$ (0.775 g, 20.49 mmol) was gradually added. Then, the solution was stirred for 2 h at 25° C. The reaction mixture was quenched by water (100 mL), filtered through Celite®, and extracted with EtOAc (50 mL×3). The combined organic layer was washed with brine (150 mL), dried over $Na_2SO_4$, filtered and concentrated. The crude product was purified by flash chromatography ($SiO_2$, 25% EtOAc/PE) to give the title compound.

Step 3: tert-butyl (4-(chloromethyl)-5-fluoropyridin-2-yl) carbamate: To a mixture of tert-butyl (5-fluoro-4-(hydroxymethyl)pyridin-2-yl)carbamate (170 mg, 0.702 mmol) and DIPEA (0.245 mL, 1.404 mmol) in DCM (1 mL) was added MsCl (0.109 mL, 1.404 mmol) at 0° C. The mixture was stirred at 20° C. for 16 h. The mixture was diluted with water (30 ml) and extracted with DCM (20 ml*2). The combined organic layer was dried over $Na_2SO_4$, filtered and concentrated. The crude product was purified by prep-TLC ($SiO_2$, 25% EtOAc/PE) to give the title compound.

Intermediates used to prepare each of Examples 1-63 that were not commercially available were prepared as described above and are noted in the INT column in each of Tables 1-8.

To a solution of intermediate B08 (15 mg, 0.046 mmol), (2-methoxy-6-methylpyridin-3-yl)boronic acid (11 mg, 0.068 mmol) and XPhos Pd G2 (4 mg, 0.004 mmol) in 1,4-dioxane (0.3 mL) was added an aq $Cs_2CO_3$ solution (1.5 M, 0.09 mL, 0.137 mmol). The reaction was stirred at 80° C. for 18 h. The resulting mixture was passed through a diatomaceous earth filter and washed with EtOAc (8 mL), and concentrated to dryness. The residue was treated with pyridine hydrochloride (56 mg, 0.48 mmol) in DMA (0.2 mL). The resulting mixture was stirred at 110° C. for 1 h. The mixture was cooled down to room temperature and purified by prep HPLC (water:MeCN with 0.1% TFA) to afford the title compound. $^1$H NMR (500 MHz, DMSO-$d_6$) δ ppm 9.59 (s, 1H), 8.28 (s, 1H), 7.29 (d, J=8.0 Hz, 1H), 7.16 (d, J=6.9 Hz, 1H), 6.87 (d, J=8.1 Hz, 1H), 6.71 (s, 1H), 5.94 (d, J=6.9 Hz, 1H), 3.60 (s, 2H), 2.13 (s, 3H), 1.43 (td, J=8.3, 4.2 Hz, 1H), 0.85 (dt, J=7.6, 3.8 Hz, 2H), 0.74-0.64 (m, 2H). MS (ESI) m/z 402 [M+1].

The compounds in Table 1 were prepared in an analogous fashion to that described for Example 1.

TABLE 1

| Ex. | Structure | IUPAC Name | MS [M + 1] | INT. |
|---|---|---|---|---|
| 2 | | (S)-4-(cyclopropylethynyl)-7-((4-methyl-2-oxo-1,2-dihydropyridin-3-yl)methyl)-4-(trifluoromethyl)-3,4-dihydroquinazolin-2(1H)-one | 402 | B08 |
| 3 | | (S)-4-(cyclopropylethynyl)-7-((2-oxo-1,2-dihydropyridin-3-yl)methyl)-4-(trifluoromethyl)-3,4-dihydroquinazolin-2(1H)-one | 388 | B08 |

Example 4: (S)-4-(cyclopropylethynyl)-7-((1-methyl-6-oxo-1,6-dihydropyridin-3-yl)methyl)-4-(trifluoromethyl)-3,4-dihydroquinazolin-2(1H)-one

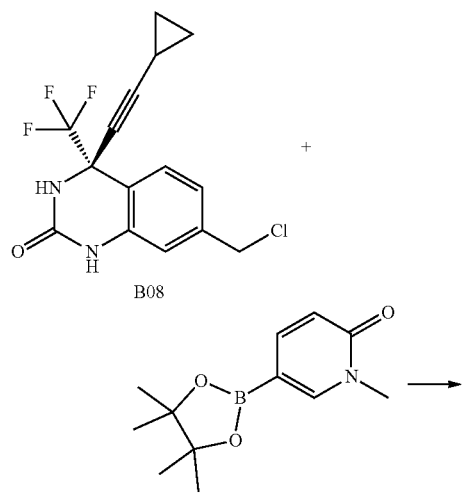

To a solution of intermediate B08 (15 mg, 0.046 mmol), 1-methyl-5-(4,4,5,5-tetramethyl-1,3-dioxolan-2-yl)pyridin-2(1H)-one (16 mg, 0.068 mmol) and PdCl$_2$(dppf) (3.3 mg, 0.005 mmol) in 1,4-dioxane (0.4 mL) was added an aq Cs$_2$CO$_3$ sol (1.5 M, 0.08 mL, 0.114 mmol). The reaction was stirred at 80° C. for 18 h. The solution was purified by prep-HPLC (water:MeCN with 0.1% TFA) to afford the title compound. $^1$H NMR (500 MHz, DMSO-d$_6$) δ ppm 9.61 (s, 1H), 8.33 (s, 1H), 7.62 (d, J=2.1 Hz, 1H), 7.34 (d, J=8.0 Hz, 1H), 7.27 (dd, J=9.3, 2.5 Hz, 1H), 6.89 (d, J=8.2 Hz, 1H), 6.69 (s, 1H), 6.36 (d, J=9.2 Hz, 1H), 3.64 (s, 2H), 3.40 (s, 3H), 1.44 (ddd, J=13.2, 8.3, 5.0 Hz, 1H), 0.91-0.81 (m, 2H), 0.74-0.64 (m, 2H). MS (ESI) m/z 402 [M+1].

Example 5: (S)-4-(cyclopropylethynyl)-7-((1-methyl-2-oxo-1,2-dihydropyridin-4-yl)methyl)-4-(trifluoromethyl)-3,4-dihydroquinazolin-2(1H)-one

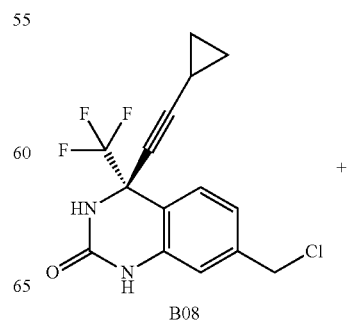

-continued

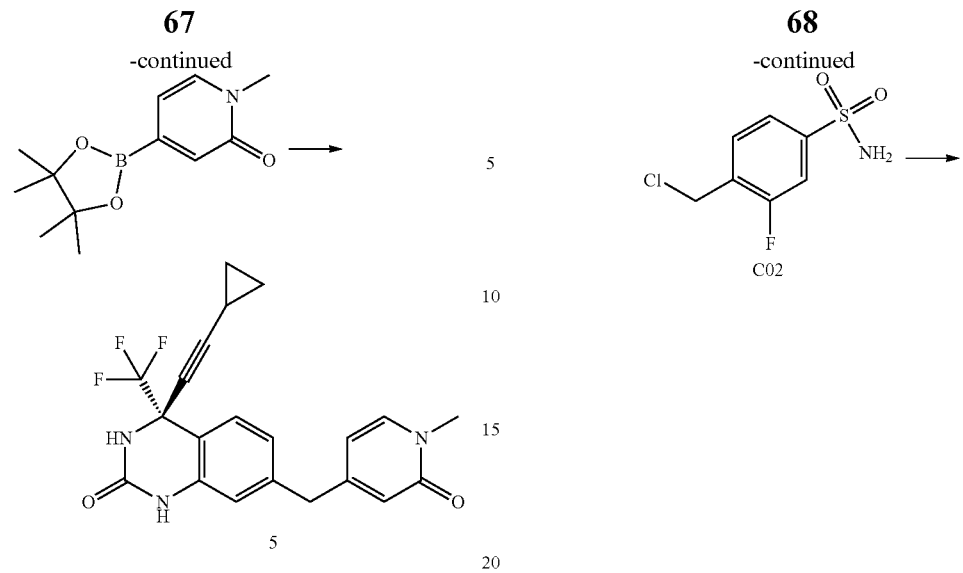

Example 5 was prepared using a procedure analogous to Example 4 except that 1-methyl-5-(4,4,5,5-tetramethyl-1,3-dioxolan-2-yl)pyridin-2(1H)-one was replaced by 1-methyl-4-(4,4,5,5-tetramethyl-1,3,2-dioxaborolan-2-yl)pyridin-2(1H)-one. $^1$H NMR (500 MHz, DMSO-d$_6$) δ ppm 9.61 (s, 1H), 8.33 (s, 1H), 7.62 (d, J=2.1 Hz, 1H), 7.34 (d, J=8.0 Hz, 1H), 7.27 (dd, J=9.3, 2.5 Hz, 1H), 6.89 (d, J=8.2 Hz, 1H), 6.69 (s, 1H), 6.36 (d, J=9.2 Hz, 1H), 3.64 (s, 2H), 3.40 (s, 3H), 1.44 (ddd, J=13.2, 8.3, 5.0 Hz, 1H), 0.91-0.81 (m, 2H), 0.74-0.64 (m, 2H). MS (ESI) m/z 402 [M+1].

Example 6: (S)-4-((4-(cyclopropylethynyl)-2-oxo-4-(trifluoromethyl)-1,2,3,4-tetrahydroquinazolin-7-yl)methyl)-3-fluorobenzenesulfonamide

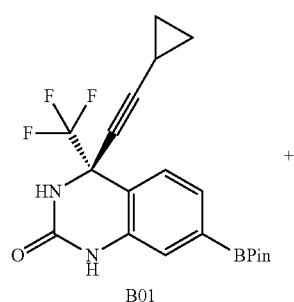

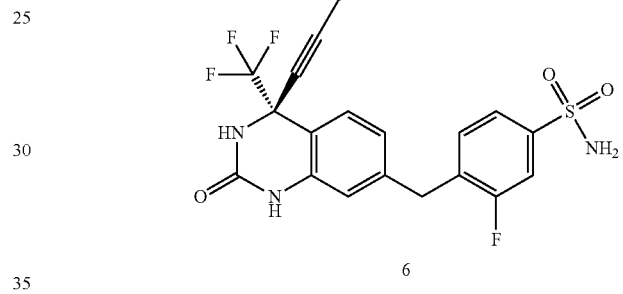

To a mixture of intermediate B01 (30 mg, 0.074 mmol), PdCl$_2$(dppf) (5.40 mg, 7.39 μmol), intermediate C02 (33.0 mg, 0.148 mmol) in 1,4-dioxane (0.8 mL) and water (0.2 mL) was added Cs$_2$CO$_3$ (72.2 mg, 0.222 mmol). The reaction was stirred at 90° C. for 3 h under N$_2$. The reaction mixture was filtered and purified by prep HPLC (water: MeCN with 0.0500 NH$_4$OH) to afford the title compound. $^1$H NMR (400 MHz, DMSO-d$_6$) δ ppm 9.64 (s, 1H), 8.32 (s, 1H), 7.65-7.49 (m, 3H), 7.44 (s, 2H), 7.35 (d, J=7.8 Hz, 1H), 6.88 (d, J=7.9 Hz, 1H), 6.71 (s, 1H), 4.00 (s, 2H), 1.44 (br s, 1H), 0.85 (dd, J=3.1, 8.1 Hz, 2H), 0.69 (br s, 2H). MS (ESI) m/z 468 [M+1].

The compounds in Table 2 were prepared in an analogous fashion to that described for Example 6.

TABLE 2

| Ex. | Structure | IUPAC Name | MS [M + 1] | INT. |
|---|---|---|---|---|
| 7 | | (S)-2-amino-4-((4-cyclopropylethynyl)-2-oxo-4-(trifluoromethyl)-1,2,3,4-tetrahydroquinazolin-7-yl)methyl)benzenesulfonamide | 465 | B01, C04 |

TABLE 2-continued

| Ex. | Structure | IUPAC Name | MS [M + 1] | INT. |
|---|---|---|---|---|
| 8 | | (S)-4-((4-(cyclopropylethynyl)-2-oxo-4-(trifluoromethyl)-1,2,3,4-tetrahydroquinazolin-7-yl)methyl)benzamide | 414 | B01 |
| 9 | | (S)-4-((4-(cyclopropylethynyl)-2-oxo-4-(trifluoromethyl)-1,2,3,4-tetrahydroquinazolin-7-yl)methyl)benzenesulfonamide | 450 | B01, C01 |
| 10 | | (S)-4-(cyclopropylethynyl)-6-fluoro-7-(4-(methylsulfonyl)-benzyl)-4-(trifluoromethyl)-3,4-dihydroquinazolin-2(1H)-one | 467 | B02 |
| 11 | | (S)-4-((4-(cyclopropylethynyl)-6-fluoro-2-oxo-4-(trifluoromethyl)-1,2,3,4-tetrahydroquinazolin-7-yl)methyl)benzenesulfonamide | 466 | B02, C01 |

Example 12: (S)-2-amino-4-((4-(cyclopropylethynyl)-2-oxo-4-(trifluoromethyl)-1,2,3,4-tetrahydroquinazolin-7-yl)methyl)pyridin-1-ium 2,2,2-trifluoroacetate

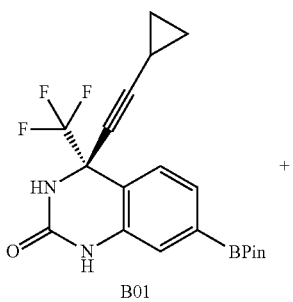

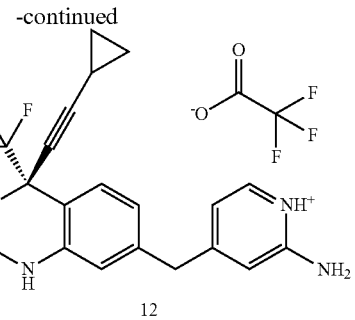

To a mixture of intermediate B01 (30 mg, 0.074 mmol), PdCl$_2$(dppf) (5.40 mg, 7.39 µmol), 2-Boc-amino-4-bromomethylpyridine (33.0 mg, 0.148 mmol) in 1,4-dioxane (0.8 mL) and water (0.2 mL) was added Cs$_2$CO$_3$ (72.2 mg, 0.222 mmol). The reaction was stirred at 90° C. for 3 h under N$_2$. The reaction mixture was filtered, treated with TFA (0.5 mL), and stirred for 30 min. The mixture was concentrated and purified by prep-HPLC (water:MeCN with 0.1% TFA) to afford the title compound. $^1$H NMR (600 MHz, DMSO-d$_6$) δ 9.73 (s, 1H), 8.38 (s, 1H), 7.95 (s, 2H), 7.85 (d, J=6.5 Hz, 1H), 7.40 (d, J=8.1 Hz, 1H), 6.92 (d, J=7.4 Hz, 1H), 6.73-6.68 (m, 3H), 3.97 (s, 2H), 1.46 (m, 1H), 0.87 (m, 2H), 0.70 (m, 2H). MS (ESI) m/z 387 [M+1].

The compounds in Table 3 were prepared in an analogous fashion to that described for Example 12.

TABLE 3

| Ex. | Structure | IUPAC Name | MS [M + 1] | INT. |
|---|---|---|---|---|
| 13 | | (S)-2-amino-6-((4-(cyclopropylethynyl)-6-fluoro-2-oxo-4-(trifluoromethyl)-1,2,3,4-tetrahydroquinazolin-7-yl)methyl)-pyridin-1-ium 2,2,2-trifluoroacetate | 466 | B02 |
| 14 | | (S)-2-amino-4-((4-(cyclopropylethynyl)-6-fluoro-2-oxo-4-(trifluoromethyl)-1,2,3,4-tetrahydroquinazolin-7-yl)methyl)-pyridin-1-ium 2,2,2-trifluoroacetate | 405 | B02 |
| 15 | | (S)-7-((2-amino-5-fluoropyrimidin-4-yl)methyl)-4-(cyclopropylethynyl)-4-(trifluoromethyl)-3,4-dihydroquinazolin-2(1H)-one | 406 | B01, C03 |

Example 16: (S)-4-(cyclopropylethynl)-7-((2-methyl-6-oxo-1,6-dihydropyrimidin-5-yl)methyl)-4-(trifluoromethyl)-3,4-dihydroquinazolin-2(1H)-one

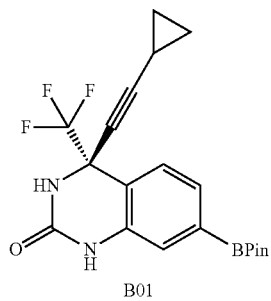

B01

+

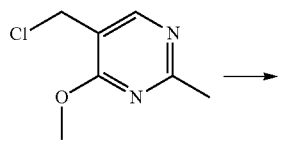

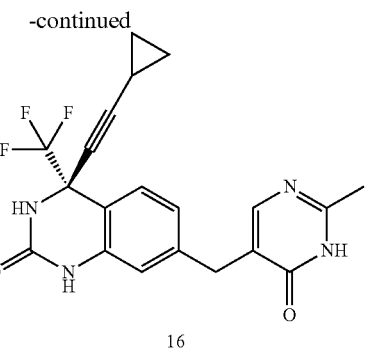

16

To a solution of intermediate B01 (21 mg, 0.052 mmol), 5-(chloromethyl)-4-methoxy-2-methylpyrimidine (16 mg, 0.078 mmol) and PdCl$_2$(dppf) (3.8 mg, 0.005 mmol) in 1,4-dioxane (0.4 mL) was added an aq Cs$_2$CO$_3$ sol (1.5 M, 0.10 mL, 0.155 mmol). The reaction was stirred at 80° C. for 18 h. The resulting mixture was passed a diatomaceous earth filter, washed with EtOAc (8 mL), and concentrated to dryness. The residue was treated with pyridine hydrochloride (60 mg, 0.52 mmol) in DMA (0.2 mL). The mixture was stirred at 110° C. for 30 min. The solution was purified by prep HPLC (water:MeCN with 0.1% TFA) to afford the title compound. $^1$H NMR (600 MHz, MeOH-d$_4$) δ 7.78 (s, 1H), 7.44 (d, J=8.3 Hz, 1H), 7.00 (d, J=8.3 Hz, 1H), 6.80 (s, 1H), 3.75 (s, 2H), 1.40 (td, J=8.7, 4.4 Hz, 1H), 0.88 (dd, J=8.2, 3.2 Hz, 2H), 0.75 (d, J=5.2 Hz, 2H). MS (ESI) m/z 403 [M+1].

The compounds in Table 4 were prepared in an analogous fashion to that described for Example 16.

TABLE 4

| Ex. | Structure | IUPAC Name | MS [M + 1] | INT. |
|---|---|---|---|---|
| 17 | | (S)-4-(cyclopropylethynyl)-7-((2,4-dimethyl-6-oxo-1,6-dihydropyrimidin-5-yl)methyl)-6-fluoro-4-(trifluoromethyl)-3,4-dihydroquinazolin-2(1H)-one | 435 | B02, C05 |
| 18 | | (S)-4-(cyclopropylethynyl)-7-((4-methyl-6-oxo-1,6-dihydropyrimidin-5-yl)methyl)-4-(trifluoromethyl)-3,4-dihydroquinazolin-2(1H)-one | 403 | B01, C11 |

TABLE 4-continued

| Ex. | Structure | IUPAC Name | MS [M + 1] | INT. |
|---|---|---|---|---|
| 19 | | (S)-4-(cyclopropylethynyl)-7-((2,4-dimethyl-6-oxo-1,6-dihydropyrimidin-5-yl)methyl)-4-(trifluoromethyl)-3,4-dihydroquinazolin-2(1H)-one | 417 | B01, C05 |

Example 20: (S)-4-((4-(cyclopropylethynyl)-4-(1,1-difluoroethyl)-2-oxo-1,2,3,4-tetrahydroquinazolin-7-yl)methyl)benzenesulfonamide

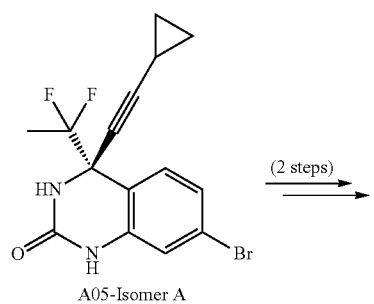

A05-Isomer A (2 steps) →

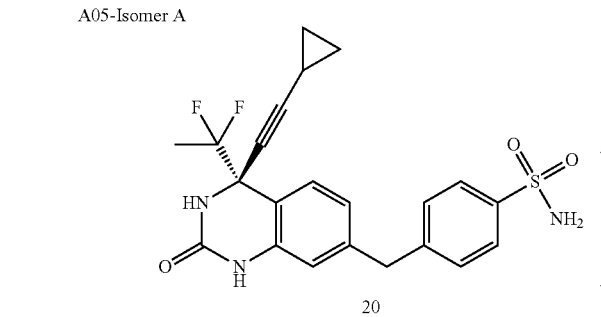

20

Step 1: (S)-4-(cyclopropylethynyl)-4-(1,1-difluoroethyl)-7-(4,4,5,5-tetramethyl-1,3,2-dioxaborolan-2-yl)-3,4-dihydroquinazolin-2(JH)-one: A mixture of intermediate A05-Isomer A (0.05 g, 0.141 mmol), BisPin (0.039 g, 0.155 mmol), KOAc (0.041 g, 0.422 mmol), PdCl₂(PPh₃)₄ (9.88 mg, 0.014 mmol) in 1,4-dioxane (1 ml) was stirred at 90° C. for 24 h. EtOAc (5 mL) and water (5 mL) were added and the mixture was filtered through Celite®. The organic layer was separated and concentrated to give the title compound, which was used without further purification. MS (ESI) m/z 403 [M+1].

Step 2: (S)-4-((4-(cyclopropylethynyl)-4-(1,1-difluoroethyl)-2-oxo-1,2,3,4-tetrahydroquinazolin-7-yl)methyl)benzenesulfonamide: To a mixture of (S)-4-(cyclopropylethynyl)-4-(1,1-difluoroethyl)-7-(4,4,5,5-tetramethyl-1,3,2-dioxaborolan-2-yl)-3,4-dihydroquinazolin-2(1H)-one (0.051 g, 0.127 mmol), PdCl₂(dppf) (9.28 mg, 0.013 mmol), 4-bromomethyl benzenesulfonamide (33.0 mg, 0.148 mmol) in 1,4-dioxane (1 mL) and water (0.25 mL) was added Cs₂CO₃ (0.124 g, 0.380 mmol). The reaction was stirred at 90° C. for 16 h. The reaction mixture was filtered, concentrated and purified by prep HPLC (water:MeCN with 0.1% TFA) to afford the title compound. ¹H NMR (500 MHz, MeOH-d₄) δ ppm 7.85 (d, J=8.3 Hz, 2H), 7.42 (m, 3H), 6.91 (d, J=8.0 Hz, 1H), 6.68 (s, 1H), 4.04 (s, 2H), 1.65 (t, J=18.4 Hz, 3H), 1.39 (ddd, J=13.3, 8.4, 5.0 Hz, 1H), 0.87 (dd, J=8.4, 2.8 Hz, 2H), 0.83-0.69 (m, 2H). MS (ESI) m/z 446 [M+1].

Example 21: (S)-4-(cyclopropylethynyl)-7-((2,4-dimethyl-6-oxo-1,6-dihydropyrimidin-5-yl)methyl)-3-ethyl-4-(trifluoromethyl)-3,4-dihydroquinazolin-2(1H)-one

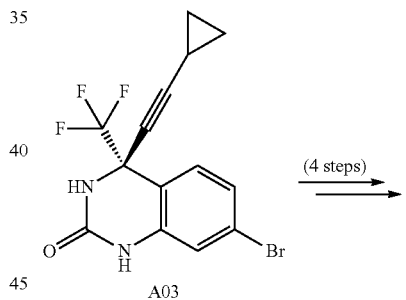

A03

(4 steps) →

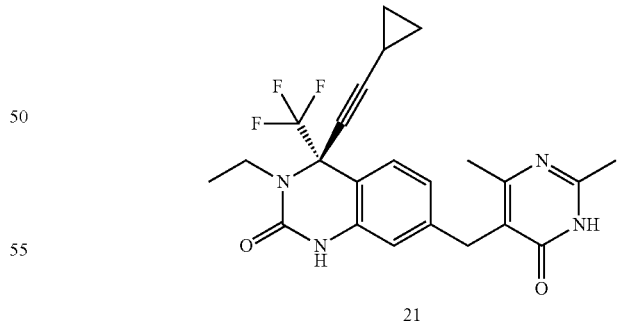

21

Step 1: (S)-7-bromo-4-(cyclopropylethynyl)-4-(trifluoromethyl)-1-((2-(trimethylsilyl)ethoxy) methyl)-3,4-dihydroquinazolin-2(1H)-one: To an ice-cold solution of intermediate A03 (3 g, 8.35 mmol) in THF (84 mL) was added 60% NaH dispersion in mineral oil (0.368 g, 9.19 mmol). The resulting mixture was stirred at 0° C. for 10 min, before addition of SEMCl (2.22 mL, 12.5 mmol). The reaction mixture was allowed to warm to room temperature and partitioned between EtOAc and water. The mixture was filtered through Celite and washed with EtOAc. The organic layer was separated and dried over anhydrous Na$_2$SO$_4$, filtered and concentrated. The residue was purified by flash chromatography (SiO$_2$, 0-60% EtOAc/hexanes) to afford the title compound. MS (ESI) m/z 489, 491 [M+1].

Step 2: (S)-4-(cyclopropylethynyl)-7-((4-methoxy-2,6-dimethylpyrimidin-5-yl)methyl)-4-(trifluoromethyl)-1-((2-(trimethylsilyl)ethoxy)methyl)-3,4-dihydroquinazolin-2(1H)-one A mixture of BisPin (88 mg, 0.347 mmol), KOAc (78 mg, 0.797 mmol), (S)-7-bromo-4-(cyclopropylethynyl)-4-(trifluoromethyl)-1-((2-(trimethylsilyl)ethoxy)methyl)-3,4-dihydroquinazolin-2(1H)-one (130 mg, 0.266 mmol), and PdCl$_2$(PPh$_3$)$_4$ (18.64 mg, 0.027 mmol) in 1,4-dioxane (2.7 mL) was flushed with N$_2$, and then heated at 100° C. under N$_2$ for 2 h. Then, intermediate C05 (59.5 mg, 0.319 mmol), PdCl$_2$(dppf)-DCM adduct (21.69 mg, 0.027 mmol) and an aq Cs$_2$CO$_3$ sol (3 M, 177 μL, 0.531 mmol) were added. The resulting mixture was flushed with N$_2$, and heated at 100° C. for 1 h. The mixture was passed through a Celite funnel and washed with DCM (2×). The filtrate was concentrated and the resulting residue was purified by flash chromatography (SiO$_2$, 0-100% EtOAc/hexanes) to afford the title compound. MS (ESI) m/z 561.7 [M+1].

Step 3: (S)-4-(cyclopropylethynyl)-7-((2,4-dimethyl-6-oxo-1,6-dihydropyrimidin-5-yl)methyl)-3-ethyl-4-(trifluoromethyl)-3,4-dihydroquinazolin-2(1H)-one: To a solution of (S)-4-(cyclopropylethynyl)-7-((4-methoxy-2,6-dimethylpyrimidin-5-yl)methyl)-4-(trifluoromethyl)-1-((2-(trimethylsilyl)ethoxy)methyl)-3,4-dihydroquinazolin-2(1H)-one (29.3 mg, 0.052 mmol) in anhydrous 1,4-dioxane (500 μL), was added 60% NaH dispersion in mineral oil (6.27 mg, 0.157 mmol). After 10 min, iodoethane (40 μL, 0.388 mmol) was added dropwise. The resulting mixture was stirred at 25° C. overnight. The mixture was quenched with sat aq NH$_4$Cl sol and extracted with EtOAc (3×). The combined organic layers were dried over Na$_2$SO$_4$, filtered and concentrated. The residue was dissolved in MeCN (2 mL) and treated with pyridine hydrochloride (120 mg, 1.04 mmol), and irradiated at 120° C. in microwave oven for 30 min. The crude mixture was purified by prep HPLC (water:MeCN with 0.1% TFA) to afford the title compound. $^1$H NMR (600 MHz, CDCl$_3$) δ ppm 7.47 (d, J=8.4 Hz, 1H), 7.30 (s, 1H), 6.94 (d, J=8.1 Hz, 1H), 3.96 (dd, J=7.2, 13.8 Hz, 2H), 3.61 (dd, J=7.1, 14.3 Hz, 2H), 2.67 (s, 3H), 2.65 (s, 3H), 1.41-1.36 (m, 1H), 1.17 (t, J=6.7 Hz, 3H), 0.90 (d, J=8.1 Hz, 2H), 0.79 (d, J=4.9 Hz, 2H). MS (ESI) m/z 445.5 [M+1].

The compounds in Table 5 were prepared in an analogous fashion to that described for Example 21.

TABLE 5

| Ex. | Structure | IUPAC Name | MS [M + 1] | INT. |
|---|---|---|---|---|
| 22 | | (S)-4-cyclopropylethynyl)-7-((2,4-dimethyl-6-oxo-1,6-dihydropyrimidin-5-1)methyl)-3-methyl-4-(trifluoromethyl)-3,4-dihydroquinazolin-2(1H)-one | 431 | A03, C05 |
| 23 | | (S)-4-(cyclopropylethynyl)-7-((2,4-dimethyl-6-oxo-1,6-dihydropyrimidin-5-1)methyl)-3-isopropyl-4-(trifluoromethyl)-3,4-dihydroquinazolin-2(1H)-one | 459 | A03, C05 |
| 24 | | (S)-4-(cyclopropylethynyl)-3-(2,2-difluoroethyl)-7-((2,4-dimethyl-6-oxo-1,6-dihydropyrimidin-5-1)methyl)-4-(trifluoromethyl)-3,4-dihydroquinazolin-2(1H)-one | 481 | A03, C05 |

Example 25: (S)-7-((2-aminopyrimidin-4-yl)methyl)-4-(cyclopropylethynyl)-4-(trifluoromethyl)-3,4-dihydroquinazolin-2(1H)-one

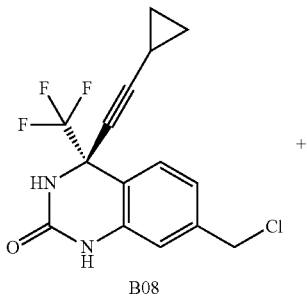

B08

+

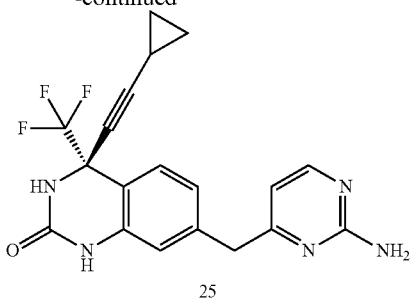

-continued

25

A mixture of 4-chloropyrimidin-2-amine (628 mg, 4.87 mmol), hexamethylditin (1.0 ml, 5.25 mmol), and Pd(PPh$_3$)$_4$ (554 mg, 0.48 mmol) in 1,4-dioxane (6 ml) was bubbled with N$_2$ for 2 min, then heated at 115° C. for 4 h. Intermediate B08 (1613 mg, 6.25 mmol), CuI (928 mg, 4.87 mmol) and Pd(PPh$_3$)$_4$ (563 mg, 0.487 mmol) were added to the reaction mixture. The resulting mixture was bubbled with N$_2$ for 2 min, then heated at 115° C. for 16 h. The reaction mixture was treated with KF and stirred for 30 min. The reaction mixture was filtered and concentrated and purified by column chromatography (SiO$_2$, 0-8% DCM/MeOH) to give the title product. $^1$H NMR (500 MHz, DMSO-d$_6$) δ 9.65 (s, 1H), 8.31 (s, 1H), 8.13 (d, J=5.0 Hz, 1H), 7.35 (d, J=7.9 Hz, 1H), 6.94-6.89 (m, 1H), 6.72 (s, 1H), 6.55 (s, 2H), 6.43 (d, J=5.0 Hz, 1H), 3.76 (s, 2H), 1.45 (ddd, J=13.2, 8.3, 5.0 Hz, 1H), 0.86 (dp, J=9.3, 4.7 Hz, 2H), 0.70 (dq, J=7.9, 4.5, 3.9 Hz, 2H). MS (ESI) m/z 388 [M+1].

The compounds in Table 6 were prepared in an analogous fashion to that described for Example 25.

TABLE 6

| Ex. | Structure | IUPAC Name | MS [M + 1] | INT. |
|---|---|---|---|---|
| 26 | | (S)-7-((2-aminopyrimidin-4-yl)methyl)-4-(cyclopropyl-ethynyl)-4-(1,1-difluoroethyl)-3,4-dihydroquinazolin-2(1H)-one | 384 | B11 |
| 27 | | (S)-7-((2-amino-6-methylpyrimidin-4-yl)methyl)-4-(cyclopropylethynyl)-4-(trifluoromethyl)-3,4-dihydroquinazolin-2(1H)-one | 402 | B08 |

TABLE 6-continued

| Ex. | Structure | IUPAC Name | MS [M + 1] | INT. |
| --- | --- | --- | --- | --- |
| 28 | | (S)-7-((2-amino-5-chloropyr-imidin-4-yl)methyl)-4-(cyclo-propylethynyl)-4-(trifluoro-methyl)-3,4-dihydroquinazo-lin-2(1H)-one | 422 | B08 |
| 29 | | (S)-7-((2-amino-5-fluoropyr-imidin-4-yl)methyl)-4-(cyclo-propylethynyl)-6-fluoro-4-(trifluoromethyl)-3,4-dihydro-quinazolin-2(1H)-one | 424 | B09 |
| 30B | Racemic product was separated by SFC (LUX Cellulose; 50% MeOH (0.1%NH$_3$H$_2$O): CO$_2$; 70 g/min; 40° C; 100 bar) | Faster eluting Isomer A: (R)-7-((2-aminopyrimidin-4-yl)-methyl)-6-chloro-4-(cyclo-propylethynyl)-3-methyl-4-(trifluoromethyl)-3,4-dihydro-quinazolin-2(1H)-one; AND Slower eluting Isomer B: (S)-7-((2-aminopyrimidin-4-yl)-methyl)-6-chloro-4-(cyclo-propylethynyl)-3-methyl-4-(trifluoromethyl)-3,4-dihydro-quinazolin-2(1H)-one | 436 | B12 |
| 31 | | (S)-7-((2-aminopyrimidin-4-yl)methyl)-6-chloro-4-(cyclo-propylethynyl)-4-(trifluoro-methyl)-3,4-dihydroquinazo-lin-2(1H)-one | 422 | B10 |
| 32 | | (S)-7-((2-amino-5-fluoropyr-imidin-4-yl)methyl)-6-chloro-4-(cyclopropylethynyl)-4-(trifluoromethyl)-3,4-dihydro-quinazolin-2(1H)-one | 440 | B10 |

TABLE 6-continued

| Ex. | Structure | IUPAC Name | MS [M + 1] | INT. |
|---|---|---|---|---|
| 33 | | (S)-7-((2-aminopyrimidin-4-yl)methyl)-4-(cyclopropyl-ethynyl)-6-methyl-4-(trifluoromethyl)-3,4-dihydroquinazolin-2(1H)-one | 402 | B16 |
| 34 | | (S)-7-((2-amino-5-methylpyrimidin-4-yl)methyl)-4-(cyclopropylethynyl)-4-(trifluoromethyl)-3,4-dihydroquinazolin-2(1H)-one | 402 | B08 |

Example 35: (S)-7-((6-aminopyridin-2-yl)methyl)-4-(cyclopropylethynyl)-4-(trifluoromethyl)-3,4-dihydroquinazolin-2(1H)-one

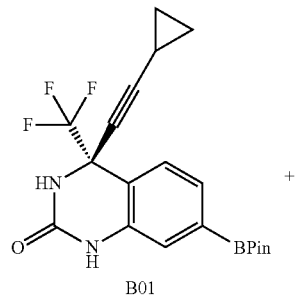

B01

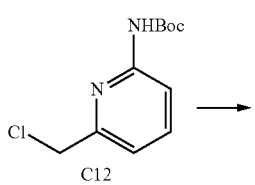

C12

-continued

35

A mixture of intermediate B01 (75 mg, 0.185 mmol), Na$_2$CO$_3$ (117 mg, 1.108 mmol), PdCl$_2$(dppf) (13.51 mg, 0.018 mmol), and intermediate Cl$_2$ (132 mg, 0.489 mmol) in 1,4-dioxane (2.5 mL) and water (750 µl) was placed in a vial, sealed and irradiated at 100° C. for 1 h in microwave. The reaction mixture was diluted with EtOAc (5 ml) and washed with water (2×5 ml). The organic layer was dried over Na$_2$SO$_4$, concentrated, and purified by column chromatography (SiO$_2$, 0-35% EtOAc/Hexane). The resulting oil was dissolved in DCM (0.5 ml) and treated with a 4 M solution of HCl in 1,4-dioxane (0.27 ml, 1.09 mmol). The reaction mixture was stirred at 25° C. for 2 h. The reaction mixture was concentrated and purified by column chromatography (SiO$_2$, 0-10% DCM/MeOH) to give the title compound. $^1$H NMR (500 MHz, MeOH-d$_4$) δ 7.87 (dd, J=8.9, 7.3 Hz, 1H), 7.54 (d, J=8.0 Hz, 1H), 7.00 (dd, J=8.1, 1.7 Hz, 1H), 6.89 (d, J=8.7 Hz, 1H), 6.77 (s, 1H), 6.74 (d, J=7.3 Hz, 1H), 1.42 (ddd, J=13.3, 8.3, 5.0 Hz, 1H), 0.98-0.87 (m, 2H), 0.76 (tt, J=4.9, 2.2 Hz, 2H). MS (ESI) m/z 387 [M+1].

The compounds in Table 7 were prepared in an analogous fashion to that described for Example 35.

TABLE 7

| Ex. | Structure | IUPAC Name | MS [M + 1] | INT. |
|---|---|---|---|---|
| 36 | | (S)-7-((6-amino-3-fluoro-pyridin-2-yl)methyl)-4-(cyclopropylethynyl)-4-(trifluoromethyl)-3,4-dihydroquinazolin-2(1H)-one | 405 | B01, C13 |
| 37 | | (S)-7-((2-amino-5-fluoro-pyridin-4-yl)methyl)-4-(cyclopropylethynyl)-4-(trifluoromethyl)-3,4-dihydroquinazolin-2(1H)-one | 288 | B01, C14 |

Example 38: (S)-7-((2-aminopyrimidin-4-yl)methyl)-4-(cyclopropylethynyl)-6-fluoro-4-(trifluoromethyl)-3,4-dihydroquinazolin-2(1H)-one

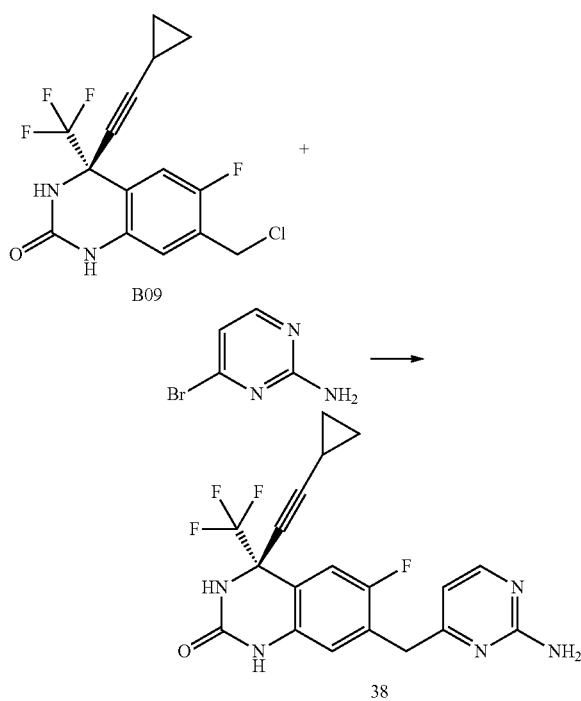

A mixture of intermediate B09 (504 mg, 1.45 mmol), 4-bromopyrimidin-2-amine (304 mg, 1.74 mmol), picolinimidamide hydrochloride (68.7 mg, 0.44 mmol), NaI (218 mg, 1.45 mmol), dichloro(dimethoxyethane)nickel (96 mg, 0.44 mmol) and zinc (238 mg, 3.63 mmol) in DMA (8 ml) was stirred at 25° C. for 1 h. The reaction mixture was filtered and purified by prep HPLC (water:MeCN with 0.05% NH$_4$OH) to afford the title compound. $^1$H NMR (500 MHz, DMSO-d$_6$) δ 9.72 (s, 1H), 8.40 (s, 1H), 8.14 (d, J=4.8 Hz, 1H), 7.17 (d, J=9.6 Hz, 1H), 6.77 (d, J=6.3 Hz, 1H), 6.57 (s, 2H), 6.41 (d, J=4.9 Hz, 1H), 3.88-3.77 (m, 2H), 1.48 (tt, J=8.4, 5.1 Hz, 1H), 0.88 (dd, J=8.0, 2.8 Hz, 2H), 0.73 (s, 2H). MS (ESI) m/z 406 [M+1].

Example 39: (S)-7-((2-aminopyrimidin-4-yl)methyl)-4-(cyclopropylethynyl)-3-methyl-4-(trifluoromethyl)-3,4-dihydroquinazolin-2(1H)-one

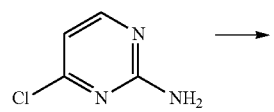

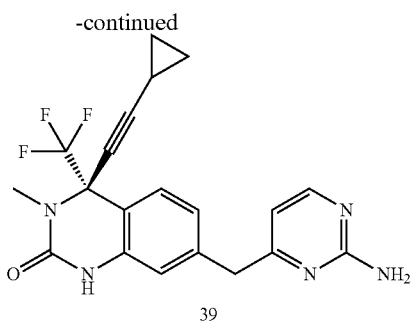

A mixture of 4-chloropyrimidin-2-amine (19 mg, 0.16 mmol), hexamethylditin (0.03 ml, 0.16 mmol), and Pd(PPh$_3$)$_4$ (17 mg, 0.01 mmol) in 1,4-dioxane (0.5 ml) was bubbled with N$_2$ for 2 min, then heated at 115° C. for 4 h. The reaction mixture added to a mixture of intermediate B17 (45 mg, 0.131 mmol), CuI (25.0 mg, 0.131 mmol), and Pd(PPh$_3$)$_4$ (15.17 mg, 0.013 mmol) in 1,4-dioxane (2 ml). The resulting mixture was bubbled with N$_2$ for 2 min, then heated at 115° C. for 2 h. The reaction mixture was treated with KF and stirred for 30 min. The reaction mixture was filtered and concentrated and purified by column chromatography (SiO$_2$, 0-8% DCM/MeOH) to give the title product. $^1$H NMR (500 MHz, CDCl$_3$) δ 8.20 (s, 1H), 7.82 (s, 1H), 7.53 (d, J=8.0 Hz, 1H), 6.95 (d, J=8.1 Hz, 1H), 6.58 (s, 1H), 6.45 (d, J=5.0 Hz, 1H), 5.21 (s, 2H), 3.87 (s, 2H), 3.30 (s, 3H), 1.42 (ddd, J=13.3, 8.3, 5.0 Hz, 1H), 0.96-0.89 (m, 2H), 0.86-0.80 (m, 2H). MS (ESI) m/z 402 [M+1].

Example 40: (S)-7-((2-aminopyrimidin-4-yl) methyl)-4-(cyclopropylethynyl)-6-fluoro-3-methyl-4-(trifluoromethyl)-3,4-dihydroquinazolin-2(1H)-one

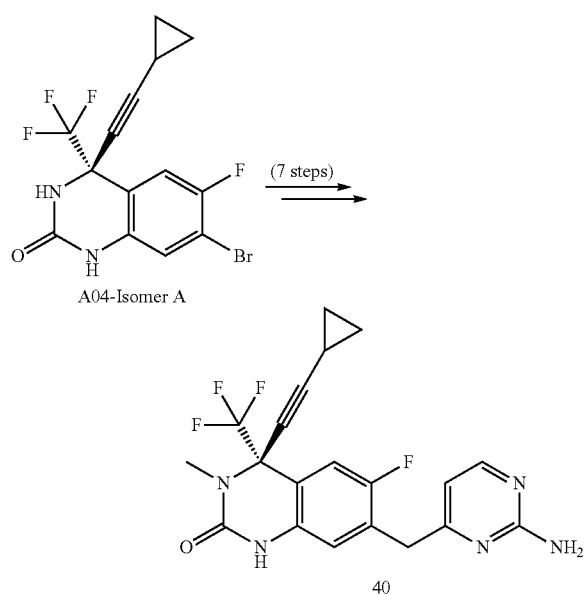

Step 1: (S)-7-bromo-4-(cyclopropylethynyl)-6-fluoro-1-(4-methoxybenzyl)-4-(trifluoromethyl)-3,4-dihydroquinazolin-2(1H)-one: A mixture of intermediate A04-Isomer A (2 g, 5.30 mmol), Cs$_2$CO$_3$ (2.073 g, 6.36 mmol) and PMBCl (0.794 ml, 5.83 mmol) in DMF (26.5 ml) was stirred at 25° C. for 16 h. The mixture was diluted with water, extracted with EtOAc (3×). The combined organic layer was dried over Na$_2$SO$_4$, filtered and concentrated. The resulting residue was purified by flash chromatography (SiO$_2$, 0-100% EtOAc/hexanes) to provide the title compound. MS (ESI) m/z 497, 499 [M+1].

Step 2: (S)-7-bromo-4-(cyclopropylethynyl)-6-fluoro-1-(4-methoxybenzyl)-3-methyl-4-(trifluoromethyl)-3,4-dihydroquinazolin-2(1H)-one: A solution of (S)-7-bromo-4-(cyclopropylethynyl)-6-fluoro-1-(4-methoxybenzyl)-4-(trifluoromethyl)-3,4-dihydroquinazolin-2(1H)-one (580 mg, 1.17 mmol) in 1,4-dioxane (12 ml), was treated with NaH (93 mg, 2.33 mmol). Then, MeI (0.22 mL, 3.50 mmol) was added and the mixture stirred at 25° C. for 16 h. The mixture was quenched with aq sat NH$_4$Cl sol and extracted with EtOAc (3×). The combined organic layer was dried over Na$_2$SO$_4$, filtered and concentrated. The resulting residue was purified by flash chromatography (SiO$_2$, 0-100% EtOAc:hexanes) to provide the title compound. MS (ESI) m/z 511, 513 [M+1].

Step 3: (S)-4-(cyclopropylethynyl)-6-fluoro-1-(4-methoxybenzyl)-7-(((4-methoxybenzyl)oxy)methyl)-3-methyl-4-(trifluoromethyl)-3,4-dihydroquinazolin-2(1H)-one A mixture of (S)-7-bromo-4-(cyclopropylethynyl)-6-fluoro-1-(4-methoxybenzyl)-3-methyl-4-(trifluoromethyl)-3,4-dihydroquinazolin-2(1H)-one (440 mg, 0.86 mmol), potassium (4-methoxy)benzyloxymethyltrifluoroborate (489 mg, 1.89 mmol) and PdCl$_2$(dppf) (70 mg, 0.09 mmol) in 1,4-dioxane (10 mL), was treated with an aq 3 M Cs$_2$CO$_3$ sol (1.7 mL, 5.16 mmol). The resulting mixture was irradiated at 150° C. in microwave oven for 30 min. The mixture was quenched with aq sat NH$_4$Cl sol and extracted with EtOAc (3×). The combined organic layer was dried over Na$_2$SO$_4$, filtered and concentrated. The residue was purified by flash chromatography (SiO$_2$, 0-100% EtOAc/hexanes) to give the title compound. MS (ESI) m/z 583 [M+1].

Step 4: (S)-4-(cyclopropylethynyl)-6-fluoro-7-(hydroxymethyl)-1-(4-methoxybenzyl)-3-methyl-4-(trifluoromethyl)-3,4-dihydroquinazolin-2(1H)-one: A mixture of (S)-4-(cyclopropylethynyl)-6-fluoro-1-(4-methoxybenzyl)-7-(((4-methoxybenzyl)oxy)methyl)-3-methyl-4-(trifluoromethyl)-3,4-dihydroquinazolin-2(1H)-one (318 mg, 0.546 mmol) and HCl in 1,4-dioxane (4 M, 1.365 ml, 5.46 mmol) in DCM (1 ml) was stirred at 25° C. for 3 h. The reaction mixture was concentrated and purified by flash chromatography (SiO$_2$, 0-7% MeOH:DCM) to give the title compound. MS (ESI) m/z 463 [M+1].

Step 5: (S)-7-(chloromethyl)-4-(cyclopropylethynyl)-6-fluoro-1-(4-methoxybenzyl)-3-methyl-4-(trifluoromethyl)-3,4-dihydroquinazolin-2(1H)-one: A mixture of (S)-4-(cyclopropylethynyl)-6-fluoro-7-(hydroxymethyl)-1-(4-methoxybenzyl)-3-methyl-4-(trifluoromethyl)-3,4-dihydroquinazolin-2(1H)-one (230 mg, 0.497 mmol) and thionyl chloride (0.036 ml, 0.497 mmol) in DCM (1 ml) was stirred at 45° C. for 16 h. The reaction mixture was concentrated to provide the title compound, which was used without further purification.

Step 6: (S)-7-((2-aminopyrimidin-4-yl)methyl)-4-(cyclopropylethynyl)-6-fluoro-1-(4-methoxybenzyl)-3-methyl-4-(trifluoromethyl)-3,4-dihydroquinazolin-2(1H)-one: A mixture of 4-chloropyrimidin-2-amine (24 mg, 0.20 mmol), hexamethylditin (0.04 ml, 0.20 mmol), and Pd(PPh$_3$)$_4$ (21 mg, 0.01 mmol) in 1,4-dioxane (1 ml) was bubbled with N$_2$ for 2 min, then heated at 115° C. for 4 h. The reaction mixture added to a mixture of (S)-7-(chloromethyl)-4-(cyclopropylethynyl)-6-fluoro-1-(4-methoxybenzyl)-3-methyl-4-(trifluoromethyl)-3,4-dihydroquinazolin-2(1H)-one (26 mg, 0.05 mmol), CuI (10 mg, 0.05 mmol), and Pd(PPh$_3$)$_4$ (6.3 mg, 5.4 mmol) in 1,4-dioxane (2 ml). The resulting mixture was bubbled with $N_2$ for 2 min, then heated at 120° C. for 2 h. The reaction mixture was treated with KF and stirred for 30 min. The reaction mixture was filtered, concentrated and purified by column chromatography ($SiO_2$, 0-8% MeOH/DCM) to give the title product. MS (ESI) m/z 522 [M+1].

Step 7: (S)-7-((2-aminopyrimidin-4-yl)methyl)-4-(cyclopropylethynyl)-6-fluoro-3-methyl-4-(trifluoromethyl)-3,4-dihydroquinazolin-2(1H)-one: A mixture of (S)-7-((2-aminopyrimidin-4-yl)methyl)-4-(cyclopropylethynyl)-1-(4-methoxybenzyl)-3-methyl-4-(trifluoromethyl)-3,4-dihydroquinazolin-2(1H)-one (26 mg, 0.06 mmol) and CAN (51.8 mg, 0.09 mmol) in MeCN (0.8 ml)/water (0.2 ml) was stirred at 70° C. for 3 h. The reaction mixture was concentrated and the resulting residue was purified by HPLC (MeCN:water with 0.1% TFA). $^1$H NMR (500 MHz, MeOH-$d_4$) δ ppm 8.21 (d, J=6.2 Hz, 1H), 7.32 (d, J=9.8 Hz, 1H), 6.85 (dd, J=6.2, 3.0 Hz, 2H), 4.22-4.09 (m, 2H), 3.25 (s, 3H), 1.54 (ddd, J=13.3, 8.4, 5.0 Hz, 1H), 0.99 (dq, J=8.8, 3.1 Hz, 2H), 0.83 (ddd, J=6.4, 4.9, 3.4 Hz, 2H). MS (ESI) m/z 420 [M+1].

Example 41: (S)-2-((4-(cyclopropylethynyl)-6-fluoro-2-oxo-4-(trifluoromethyl)-1,2,3,4-tetrahydroquinazolin-7-yl)methyl)-5-(hydroxymethyl)pyridin-1-ium 2,2,2-trifluoroacetate

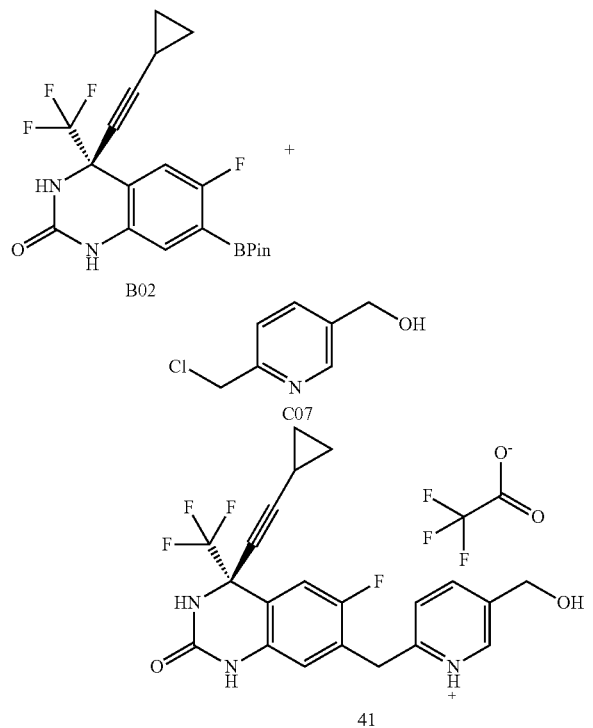

Aq $K_3PO_4$ (1.5M, 853 μL, 1.28 mmol) was added to a vial containing intermediate B02 (181 mg, 0.43 mmol), $PdCl_2$(dppf) (31.2 mg, 0.043 mmol), intermediate C07 (101 mg, 0.64 mmol) in 1,4-dioxane (2.1 mL) under $N_2$. The resulting mixture was stirred at 90° C. for 16 h. EtOAc (10 mL) was added and the mixture was filtered through Celite®. The organic layer was concentrated, and the residue was purified by prep-HPLC (water:MeCN with 0.1% TFA) to afford the title compound. $^1$H NMR (500 MHz, DMSO-$d_6$) δ ppm 9.71 (s, 1H), 8.52 (s, 1H), 8.41 (s, 1H), 7.91 (d, J=7.8 Hz, 1H), 7.43 (d, J=8.1 Hz, 1H), 7.17 (d, J=9.7 Hz, 1H), 6.79 (d, J=6.5 Hz, 1H), 4.55 (s, 2H), 4.17 (d, J=5.1 Hz, 2H), 1.54-1.42 (m, 1H), 0.87 (dd, J=8.2, 3.1 Hz, 2H), 0.72 (dt, J=5.3, 3.1 Hz, 2H). MS (ESI) m/z 420 [M+1].

Example 42: (S)-4-(cyclopropylethynyl)-6-fluoro-7-((5-(2-hydroxyethoxy)pyridin-2-yl)methyl)-4-(trifluoromethyl)-3,4-dihydroquinazolin-2(1H)-one

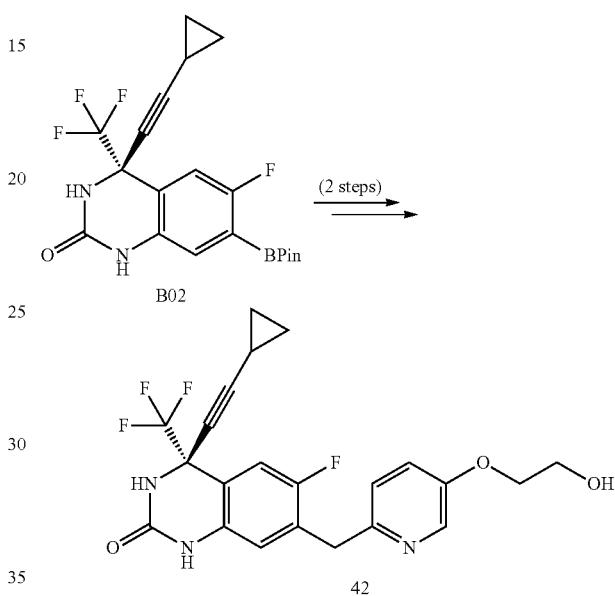

Step 1: (S)-4-(cyclopropylethynyl)-7-((5-(2-((tetrahydro-2H-pyran-2-yl)oxy)ethoxy)pyridin-2-yl)methyl)-4-(trifluoromethyl)-3,4-dihydroquinazolin-2(1H)-one: Water (200 μl) was added to a vial containing intermediate B02 (80 mg, 0.189 mmol), intermediate C08 (77 mg, 0.283 mmol), $PdCl_2$(dppf) (13.80 mg, 0.019 mmol) and $K_3PO_4$ (60 mg, 0.28 mmol) in 1,4-dioxane (800 μL) under $N_2$. The mixture was stirred at 90° C. for 16 h. EtOAc (10 mL) and water (2 mL) were added and the mixture was filtered through Celite®. The organic layer was separated, concentrated, and the residue was purified with flash chromatography ($SiO_2$, 0-100% (EtOAc:EtOH; 3:1)/hexanes) to provide the title compound. MS (ESI) m/z 534 [M+1].

Step 2: (S)-4-(cyclopropylethynyl)-6-fluoro-7-((5-(2-hydroxyethoxy)pyridin-2-yl)methyl)-4-(trifluoromethyl)-3,4-dihydroquinazolin-2(1H)-one: (S)-4-(cyclopropylethynyl)-7-((5-(2-((tetrahydro-2H-pyran-2-yl)oxy)ethoxy)pyridin-2-yl)methyl)-4-(trifluoromethyl)-3,4-dihydroquinazolin-2(1H)-one (30 mg, 0.056 mmol) was dissolved in MeOH (800 μL) and pTsOH·$H_2O$ (32.1 mg, 0.169 mmol) was added and the resulting mixture was stirred at 25° C. for 1 h. The organic was concentrated and the residue was purified by prep-HPLC (water:MeCN with 0.05% $NH_4OH$) to afford the title compound. $^1$H NMR (500 MHz, DMSO-$d_6$) δ ppm 9.65 (s, 1H), 8.37 (s, 1H), 8.19 (d, J=2.9 Hz, 1H), 7.35 (dd, J=8.6, 3.0 Hz, 1H), 7.18 (dd, J=39.2, 9.1 Hz, 2H), 6.75 (d, J=6.5 Hz, 1H), 4.89 (t, J=5.5 Hz, 1H), 4.02 (dt, J=9.4, 5.4 Hz, 4H), 3.71 (q, J=5.1 Hz, 2H), 1.56-1.38 (m, 1H), 0.95-0.83 (m, 2H), 0.72 (dt, J=5.2, 3.1 Hz, 2H). MS (ESI) m/z 450 [M+1].

Example 43: (S)-4-cyano-2-((4-(cyclopropylethynyl)-6-fluoro-2-oxo-4-(trifluoromethyl)-1,2,3,4-tetrahydroquinazolin-7-yl)methyl)-5-(2-hydroxyethoxy)pyridine 1-oxide

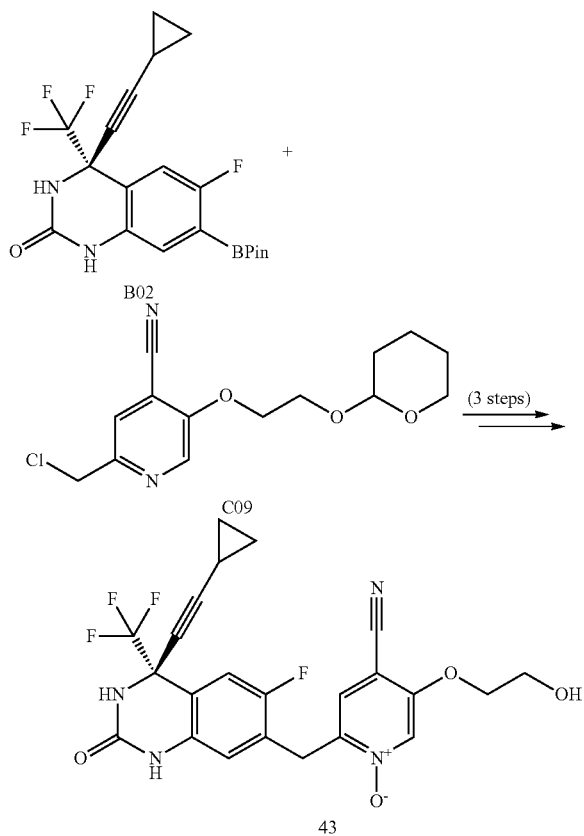

Step 1: 2—(((S)-4-(cyclopropylethynyl)-6-fluoro-2-oxo-4-(trifluoromethyl)-1,2,3,4-tetrahydroquinazolin-7-yl)methyl)-5-(2-((tetrahydro-2H-pyran-2-yl)oxy)ethoxy)isonicotinonitrile: In a vial, intermediate B02 (100 mg, 0.25 mmol), Cs$_2$CO$_3$ (241 mg, 0.74 mmol), PdCl$_2$(dppf) (18.01 mg, 0.025 mmol), intermediate C09 (146 mg, 0.49 mmol) in 1,4-dioxane (0.8 mL) was stirred at 80° C. under N$_2$ for 16 h. EtOAc (2 mL) and water (2 mL) were added and the organic layer was separated and concentrated. The residue was purified by flash chromatography (SiO$_2$, 0-100% EtOAc/hexanes) to give title compound. MS (ESI) m/z 541 [M+1].

Step 2: (S)-2-((4-(Cyclopropylethynyl)-6-fluoro-2-oxo-4-(trifluoromethyl)-1,2,3,4-tetrahydroquinazolin-7-yl)methyl)-5-(2-hydroxyethoxy)isonicotinonitrile: 2-(((S)-4-(Cyclopropylethynyl)-6-fluoro-2-oxo-4-(trifluoromethyl)-1,2,3,4-tetrahydroquinazolin-7-yl)methyl)-5-(2-((tetrahydro-2H-pyran-2-yl)oxy)ethoxy)isonicotinonitrile (45 mg, 0.08 mmol) was dissolved in MeOH (0.8 mL) and p-TsOH monohydrate (15.8 mg, 0.08 mmol). The reaction was stirred for 1 h and then diluted with EtOAc (2 mL) and water (2 mL). The organic layer was separated and concentrated to give the title compound, which was used without further purification. MS (ESI) m/z 457 [M+1].

Step 3: (S)-4-cyano-2-((4-(cyclopropylethynyl)-6-fluoro-2-oxo-4-(trifluoromethyl)-1,2,3,4-tetrahydroquinazolin-7-yl)methyl)-5-(2-hydroxyethoxy)pyridine 1-oxide: (S)-2-((4-(cyclopropylethynyl)-6-fluoro-2-oxo-4-(trifluoromethyl)-1,2,3,4-tetrahydroquinazolin-7-yl)methyl)-5-(2-hydroxyethoxy)isonicotinonitrile (25 mg, 0.055 mmol) was dissolved in DCM (0.8 mL) and m-CPBA (14.18 mg, 0.082 mmol) was added and stirred at 25° C. for 16 h. The reaction was neutralized with a aq. sat. Na$_2$SO$_3$ sol. The organic layer was separated and concentrated, and the residue was purified by prep-HPLC (water:MeCN with 0.05% NH$_4$OH) to afford the title compound. $^1$H NMR (500 MHz, DMSO-d$_6$) δ ppm 9.58 (s, 1H), 8.45 (s, 1H), 8.31 (s, 1H), 8.01 (s, 1H), 7.32 (d, J=8.0 Hz, 1H), 6.89 (d, J=6.5 Hz, 1H), 6.72 (s, 1H), 4.27-4.17 (m, 2H), 4.01 (s, 2H), 3.81-3.67 (m, 2H), 1.47-1.39 (m, 1H), 0.86 (dd, J=8.3, 3.0 Hz, 2H), 0.70 (dd, J=7.3, 4.2 Hz, 2H). MS (ESI) m/z 473 [M+1].

Example 44: (S)-4-((4-(cyclopropylethynyl)-2-thioxo-4-(trifluoromethyl)-1,2,3,4-tetrahydroquinazolin-7-yl)methyl)benzenesulfonamide

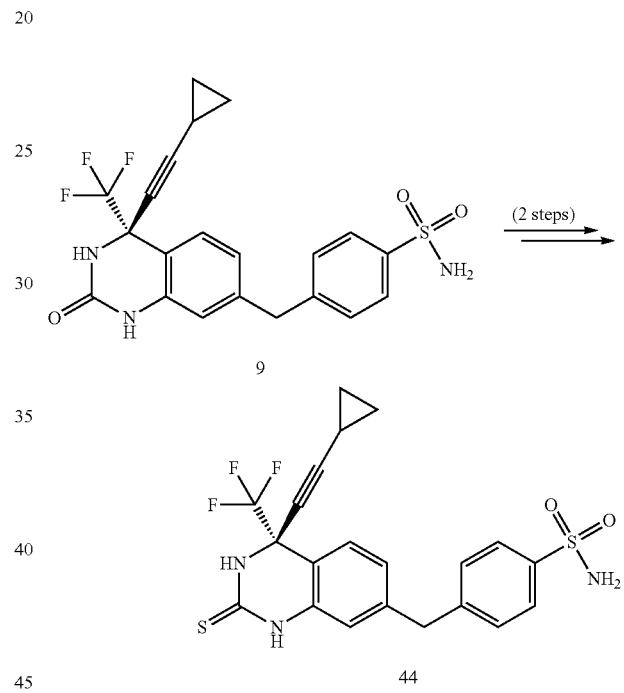

Step 1: (S)-4-((2-chloro-4-(cyclopropylethynyl)-4-(trifluoromethyl)-3,4-dihydroquinazolin-7-yl)methyl)benzenesulfonamide: A mixture of Example 9 (50 mg, 0.111 mmol) in POCl$_3$ (1 mL, 10.73 mmol) containing Na$_2$CO$_3$ (17.69 mg, 0.167 mmol) was heated to 95° C. for 5 h. The reaction was cooled to 25° C. and concentrated to give the title compound, which was used without further purification. MS (ESI) m/z 468 [M+1].

Step 2: (S)-4-((4-(cyclopropylethynyl)-2-thioxo-4-(trifluoromethyl)-1,2,3,4-tetrahydroquinazolin-7-yl)methyl)benzenesulfonamide: A solution of (S)-4-((2-chloro-4-(cyclopropylethynyl)-4-(trifluoromethyl)-3,4-dihydroquinazolin-7-yl)methyl)benzenesulfonamide (50 mg, 0.107 mmol) in ethanol (534 µL) containing thiourea (24.40 mg, 0.321 mmol) was heated to 95° C. for 5 h. The reaction was then concentrated and the residue was purified by prep HPLC (water:MeCN with 0.1% TFA) to afford the title compound. $^1$H NMR (500 MHz, DMSO-d$_6$) δ ppm 11.10 (s, 1H), 9.89 (s, 1H), 7.76 (d, J=8.3 Hz, 2H), 7.48-7.37 (m, 3H), 7.29 (s, 2H), 7.01 (d, J=8.1 Hz, 1H), 6.91 (s, 1H), 4.01 (s, 2H), 1.57-1.39 (m, 1H), 0.87 (dd, J=8.3, 3.5 Hz, 2H), 0.83-0.64 (m, 2H). MS (ESI) m/z 466 [M+1].

Example 45: (S)-7-((6-amino-5-(hydroxymethyl) pyridin-2-yl)methyl)-4-(cyclopropylethynyl)-4-(trifluoromethyl)-3,4-dihydroquinazolin-2(1H)-one

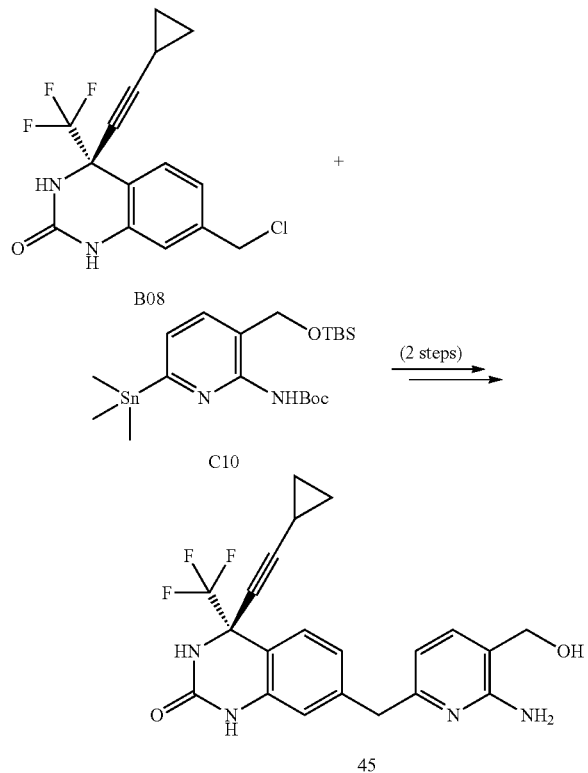

Example 46: (S)-7-((6-amino-5-(hydroxymethyl) pyrazin-2-yl)methyl)-4-(cyclopropylethynyl)-6-fluoro-4-(trifluoromethyl)-3,4-dihydroquinazolin-2 (1H)-one

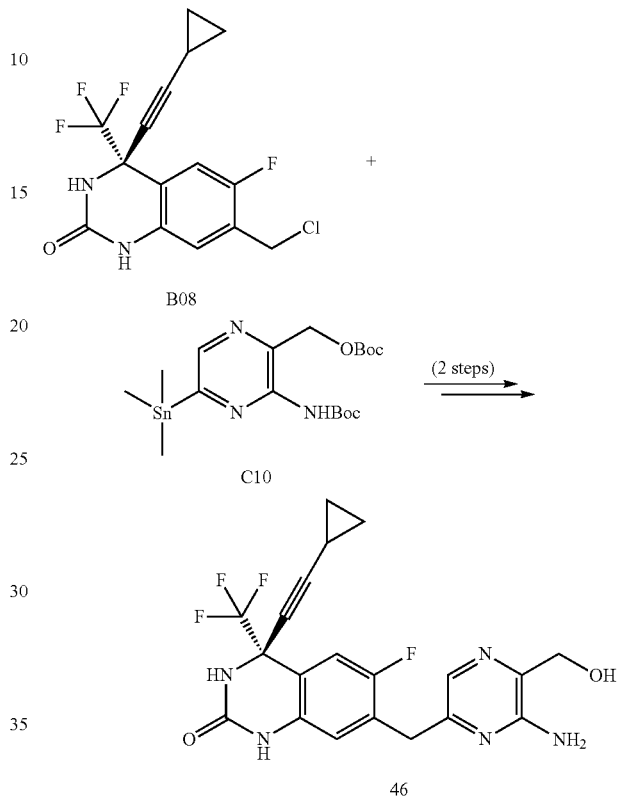

Step 1: Tert-butyl (S)-(3-(((tert-butyldimethylsilyl)oxy)methyl)-6-((4-(cyclopropylethynyl)-2-oxo-4-(trifluoromethyl)-1,2,3,4-tetrahydroquinazolin-7-yl)methyl)pyridin-2-yl)carbamate: A mixture of intermediate C10 (200 mg, 0.399 mmol), intermediate B08 (100 mg, 0.304 mmol), CuI (57.9 mg, 0.304 mmol), and Pd(PPh$_3$)$_4$ (35.2 mg, 0.030 mmol) in 1,4-dioxane (3 mL) was bubbled with N$_2$ for 2 min, then heated at 110° C. for 16 h. The reaction mixture was diluted with EtOAc and washed with water. The organic layer was dried over Na$_2$SO$_4$, concentrated, and purified with flash chromatography (0-100%, (3:1 EtOAc:EtOH)/hexanes) to give the title compound. MS (ESI) m/z 631 [M+1].

Step 2: (S)-7-((6-amino-5-(hydroxymethyl)pyridin-2-yl) methyl)-4-(cyclopropylethynyl)-4-(trifluoromethyl)-3,4-dihydroquinazolin-2(1H)-one: A mixture of tert-butyl (S)-(3-(((tert-butyldimethylsilyl)oxy)methyl)-6-((4-(cyclopropylethynyl)-2-oxo-4-(trifluoromethyl)-1,2,3,4-tetrahydroquinazolin-7-yl)methyl)pyridin-2-yl)carbamate (58 mg, 0.092 mmol) in TFA (460 μL): DCM (460 μL) was stirred for 16 h at 25° C. The reaction was concentrated and the residue was purified by prep HPLC (water:MeCN with 0.1% TFA) to afford the title compound. $^1$H NMR (500 MHz, MeOH-d$_4$) δ ppm 7.42 (dd, J=7.6, 4.4 Hz, 2H), 6.95 (d, J=8.1 Hz, 1H), 6.74 (s, 1H), 6.54 (d, J=7.4 Hz, 1H), 4.51 (s, 2H), 3.91 (s, 2H), 1.49-1.36 (m, 1H), 0.89 (dd, J=8.4, 2.9 Hz, 2H), 0.76 (ddt, J=6.9, 4.8, 2.2 Hz, 2H). MS (ESI) m/z 417 [M+1].

Step 1: (S)-tert-butyl (3-(((tert-butoxycarbonyl)oxy) methyl)-6-((4-(cyclopropylethynyl)-6-fluoro-2-oxo-4-(trifluoromethyl)-1,2,3,4-tetrahydroquinazolin-7-yl)methyl) pyrazin-2-yl)carbamate: A mixture of intermediate C10 (131 mg, 0.22 mmol), intermediate B08 (70 mg, 0.20 mmol), CuI (38 mg, 0.20 mmol), and Pd(PPh$_3$)$_4$ (23 mg, 0.02 mmol) in 1,4-dioxane (2 mL) was bubbled with N$_2$ for 2 min, then heated at 110° C. for 16 h. The reaction mixture was diluted with EtOAc and washed with water. The organic layer was separated and dried over Na$_2$SO$_4$, concentrated to isolate the title compound.

Step 2: (S)-7-((6-amino-5-(hydroxymethyl)pyrazin-2-yl) methyl)-4-(cyclopropylethynyl)-6-fluoro-4-(trifluoromethyl)-3,4-dihydroquinazolin-2(1H)-one: (S)-tert-butyl (3-(((tert-butoxycarbonyl)oxy)methyl)-6-((4-(cyclopropylethynyl)-6-fluoro-2-oxo-4-(trifluoromethyl)-1,2,3,4-tetrahydroquinazolin-7-yl)methyl)pyrazin-2-yl)carbamate (149 mg, 0.203 mmol) was dissolved in DCM (1 mL):TFA (1 mL) for 16 h. The solution was concentrated and purified by reverse phase chromatography (MeCN:water with 0.1% TFA) to give the title compound. $^1$H NMR (500 MHz, DMSO-d$_6$) δ 9.66 (d, J=21.5 Hz, 1H), 8.38 (d, J=5.7 Hz, 1H), 7.87-7.66 (m, 2H), 7.54 (dd, J=15.1, 6.6 Hz, 1H), 7.27-7.04 (m, 1H), 6.74 (d, J=6.5 Hz, 1H), 4.46 (s, 2H), 4.05-3.80 (m, 2H), 1.59-1.38 (m, 1H), 0.87 (dd, J=8.2, 2.8 Hz, 2H), 0.80-0.61 (m, 2H). MS (ESI) m/z 436 [M+1].

Example 47: (S)-7-((2-aminopyrimidin-4-yl)methyl)-4-(cyclopropylethynyl)-4-(1,1-difluoroethyl)-6-fluoro-3,4-dihydroquinazolin-2(1H)-one Example 48: (S)-7-((2-amino-6-chloropyrimidin-4-yl)methyl)-4-(cyclopropylethynyl)-4-(trifluoromethyl)-3,4-dihydroquinazolin-2(1H)-one

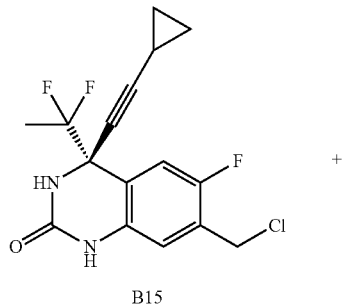

B15

+

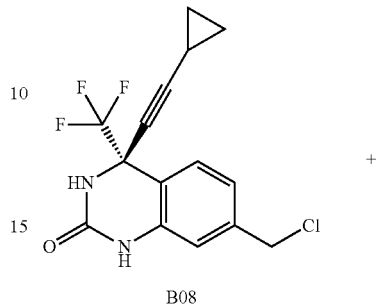

B08

+

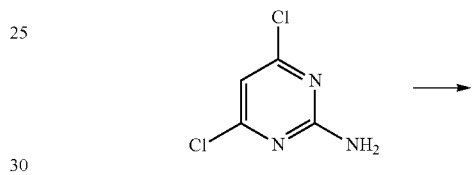

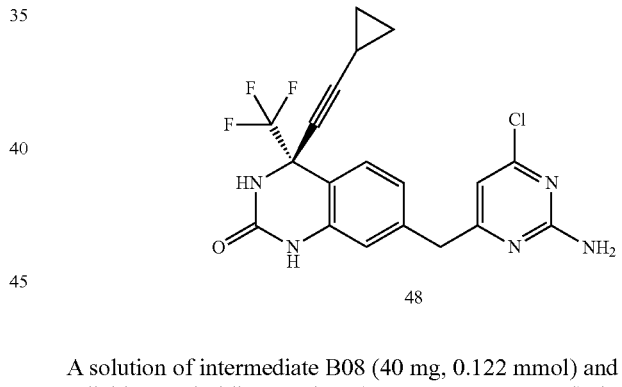

48

A mixture of 4-chloropyrimidin-2-amine (100 mg, 4.87 mmol), hexamethylditin (0.14 ml, 0.69 mmol), and Pd(PPh₃)₄ (26.8 mg, 0.023 mmol) in 1,4-dioxane (3 ml) was heated under N₂ for 2 min at 105° C. for 16 h. The reaction mixture was added to a mixture of intermediate B15 (1613 mg, 6.25 mmol), CuI (3.7 mg, 0.02 mmol), and Pd(PPh₃)₄ (11.3 mg, 9.77 μmol) in 1,4-dioxane (1 ml). The resulting mixture heated at 105° C. for 16 h under N₂. The mixture was purified by prep TLC(SiO₂, 10% MeOH/EtOAc) to give the crude product, which was repurified by prep-HPLC (MeCN:water with 0.1% TFA) to give the title compound. ¹H NMR (400 MHz, MeCN-d₃) δ ppm 0.68-0.75 (m, 2H), 0.82-0.90 (m, 2H), 1.31-1.43 (m, 1H), 1.68 (t, J=18.8 Hz, 3H), 3.99-4.11 (m, 2H), 6.23 (br s, 1H), 6.71 (d, J=6.0 Hz, 1H), 6.75 (d, J=6.5 Hz, 1H), 7.26 (d, J=10.0 Hz, 1H), 7.76 (br s, 1H), 8.14 (br s, 1H). MS (ESI) m/z 402.1 [M+1].

A solution of intermediate B08 (40 mg, 0.122 mmol) and 4,6-dichloropyrimidin-2-amine (10 mg, 0.061 mmol) in DME (0.5 ml) was transferred into glove box and added 4,4'-di-tert-butyl-2,2'-bipyridine (3.27 mg, 0.012 mmol), (TMS)₃SiH (30.3 mg, 0.122 mmol) and (Ir[dF(CF₃)ppy]₂(dtbbpy))PF₆ (1.365 mg, 1.217 μmol) and NiCl₂(DME) (5.35 mg, 0.024 mmol) and Na₂CO₃ (25.8 mg, 0.243 mmol). The reaction mixture was bubbled with N₂ and capped and taken out of glove box. Then, the vial was irradiated with Integrated Photoreactor, 34 w LED blue light for 1 h at 25° C. The residue was purified by prep HPLC (MeCN:water with 0.1% TFA) to give the title compound. ¹H NMR (400 MHz, DMSO-d₆) δ ppm 9.66 (s, 1H), 8.33 (s, 1H), 7.35 (d, J=8.0 Hz, 1H), 7.11 (br s, 2H), 6.92 (d, J=7.0 Hz, 1H), 6.71 (s, 1H), 6.59 (s, 1H), 3.78 (s, 2H), 1.53-1.39 (m, 1H), 0.95-0.81 (m, 2H), 0.78-0.55 (m, 2H). MS (ESI) 422.1 [M+1].

The compounds in Table 8 were prepared in an analogous fashion to that described for Example 48.

TABLE 8

| Ex. | Structure | IUPAC Name | MS [M + 1] | INT. |
| --- | --- | --- | --- | --- |
| 49 | | (S)-7-((4-amino-1,3,5-triazin-2-yl)methyl)-4-(cyclopropylethynyl)-4-(trifluoromethyl)-3,4-dihydroquinazolin-2(1H)-one | 389 | B08 |
| 50 | | (S)-2-amino-4-((4-(cyclopropylethynyl)-2-oxo-4-(trifluoromethyl)-1,2,3,4-tetrahydroquinazolin-7-yl)methyl)nicotinonitrile | 412 | B08, C06 |
| 51 | | (S)-4-(cyclopropylethynyl)-6-fluoro-7-(pyrazin-2-ylmethyl)-4-(trifluoromethyl)-3,4-dihydroquinazolin-2(1H)-one | 391 | B09 |
| 52 | | (S)-2-amino-4-((4-(cyclopropylethynyl)-6-fluoro-2-oxo-4-(trifluoromethyl)-1,2,3,4-tetrahydroquinazolin-7-yl)methyl)nicotinonitrile | 430 | B08 |
| 53 | | (S)-4-(cyclopropylethynyl)-6-fluoro-7-(pyridin-2-ylmethyl)-4-(trifluoromethyl)-3,4-dihydroquinazolin-2(1H)-one | 390 | B09 |

| Ex. | Structure | IUPAC Name | MS [M + 1] | INT. |
|---|---|---|---|---|
| 54 | | (S)-7-((6-aminopyrazin-2-yl)-methyl)-4-(cyclopropyl-ethynyl)-4-(trifluoromethyl)-3,4-dihydroquinazolin-2(1H)-one | 388 | B08 |

Example 55: (n)-2-amino-4-((4-cyclopropylethy-nyl)-2-oxo-4-(trifluoromethyl)-1,2,3,4-tetrahydro-quinazolin-7-yl)methyl)nicotinamide Example 56: (S)-4-((4-(cyclopropylethynyl)-6-fluoro-2-oxo-4-(trifluoromethyl)-1,2,3,4-tetrahydro-quinazolin-7-yl)methyl)nicotinonitrile

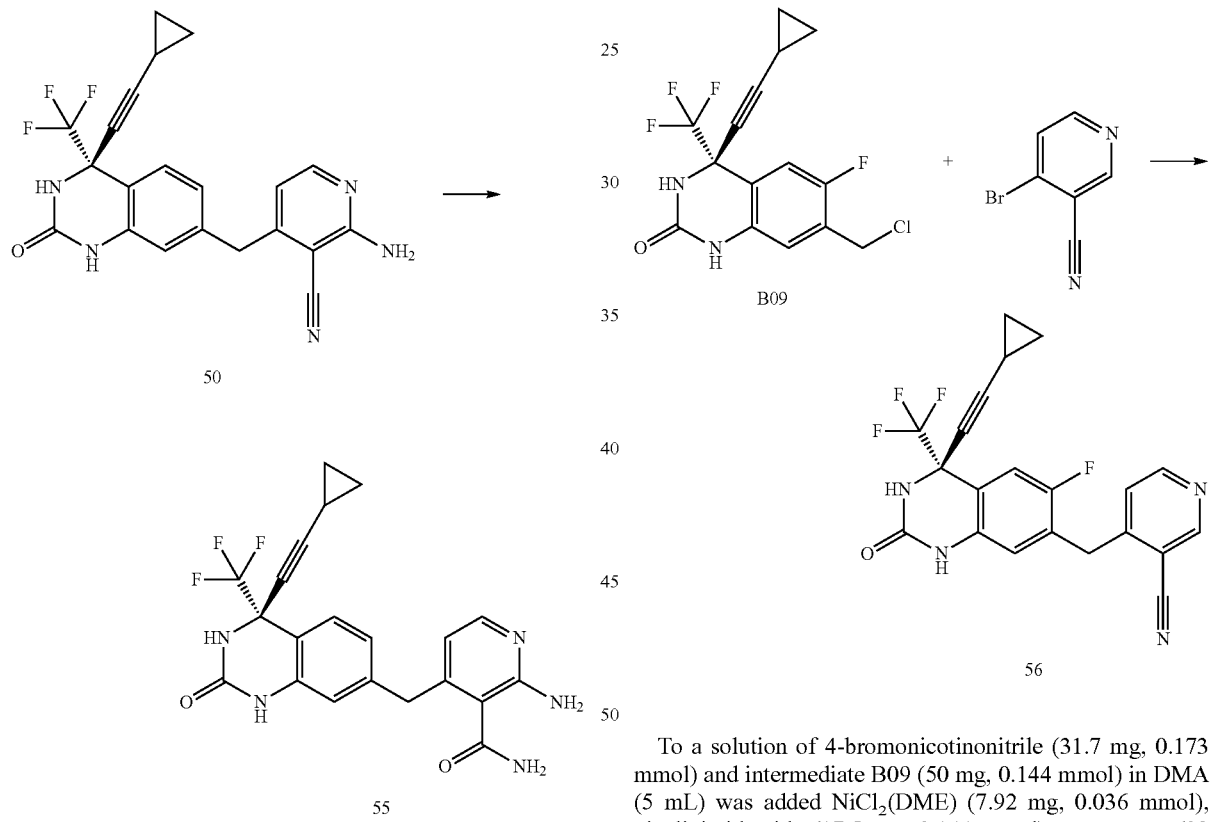

To a solution of Example 50 (14 mg, 0.034 mmol) in EtOH (4.2 ml) was added KOH (477 mg, 1.702 mmol), the mixture was stirred at 100° C. for 8 h. The solution was dried under a stream of N₂ gas and the resulting crude was purified by prep-HPLC (MeCN:water with 10 mM NH₄HCO₃) to give the title product. $^1$H NMR (400 MHz, MeCN-d₃) δ ppm 7.91 (d, J=5.29 Hz, 1H), 7.83 (s, 1H), 7.43 (d, J=8.16 Hz, 1H), 6.88-6.96 (m, 1H), 6.67 (s, 1H), 6.53 (s, 1H), 6.44 (d, J=5.29 Hz, 1H), 6.40 (s, 1H), 6.32 (s, 1H), 5.15 (br s, 2H), 3.94 (s, 2H), 1.32-1.43 (m, 1H), 0.83-0.91 (m, 2H), 0.68-0.77 (m, 2H). MS (ESI) m/z 430.1 [M+1].

To a solution of 4-bromonicotinonitrile (31.7 mg, 0.173 mmol) and intermediate B09 (50 mg, 0.144 mmol) in DMA (5 mL) was added NiCl₂(DME) (7.92 mg, 0.036 mmol), picolinimidamide (17.5 mg, 0.144 mmol), manganese (32 mg, 0.58 mmol) and TBAI (12.2 mg, 0.033 mmol) in a dry glove box. The reaction was stirred at 80° C. for 2 h. The reaction mixture was quenched with water (20 mL). The reaction mixture was extracted with EtOAc (25 mL×3). The organic layer was separated, dried over Na₂SO₄, filtered and concentrated. The residue was purified by prep HPLC (MeCN:water with 0.1% TFA) to give the title compound. $^1$H NMR (400 MHz, MeCN-d₃) δ ppm 0.68-0.79 (m, 2H), 0.81-0.93 (m, 2H), 1.38 (tt, J=8.3, 4.9 Hz, 1H), 4.20 (d, J=2.1 Hz, 2H), 6.52 (br s, 1H), 6.72 (d, J=6.4 Hz, 1H), 7.25-7.40 (m, 2H), 7.89 (br s, 1H), 8.69 (d, J=5.2 Hz, 1H), 8.87 (s, 1H). MS (ESI) m/z 415.1 [M+1].

Example 57: (S)-4-(cyclopropylethynyl)-6-fluoro-7-(pyridin-4-ylmethyl)-4-(trifluoromethyl)-3,4-dihydroquinazolin-2(1H)-one

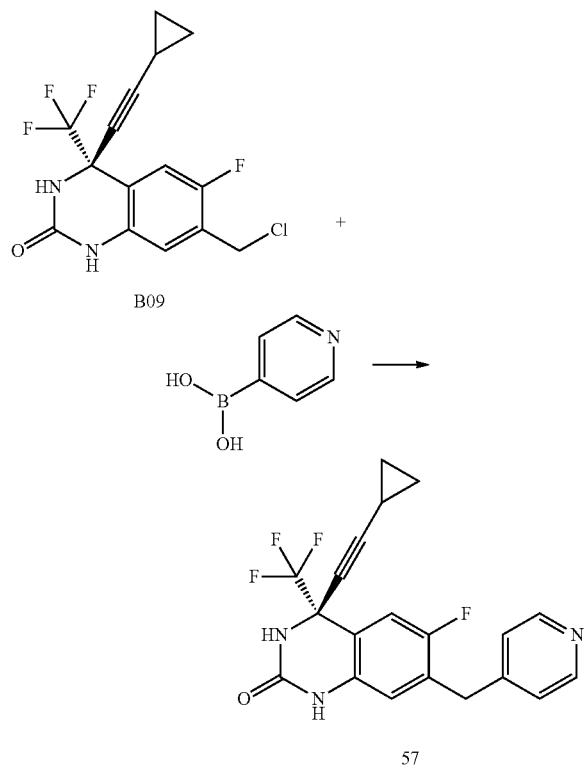

To a solution of intermediate B09 (30 mg, 0.09 mmol) and pyridin-4-ylboronic acid (13.83 mg, 0.112 mmol) was dissolved in water (0.15 mL) and 1,4-dioxane (1.5 mL), was added followed by Na$_2$CO$_3$ (27.5 mg, 0.260 mmol) and Pd(PPh$_3$)$_4$ (10.0 mg, 8.65 μmol) under N$_2$, the mixture was stirred at 100° C. for 4 h. The organic layers were separated and concentrated. The crude was purified by prep-TLC (SiO$_2$, 30% EtOAc/PE) to give the title compound. $^1$H NMR (400 MHz, CD$_3$OD) δ ppm 0.76 (br d, J=1.54 Hz, 2H) 0.89 (br dd, J=7.72, 2.43 Hz, 2H) 1.33-1.52 (m, 1H) 3.89-4.20 (m, 2H) 6.76 (d, J=6.39 Hz, 1H) 7.25 (br d, J=9.70 Hz, 1H) 7.29 (br d, J=4.85 Hz, 2H) 8.44 (br d, J=3.53 Hz, 2H). MS (ESI) m/z 390.1 [M+1].

Example 58: (S)-7-((2-amino-5-fluoropyrimidin-4-yl)methyl)-4-(cyclopropylethynyl)-4-(1,1-difluoroethyl)-3,4-dihydroquinazolin-2(1H)-one

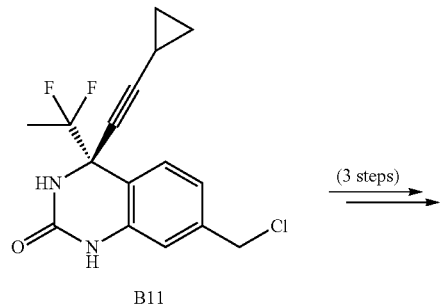

(3 steps) →

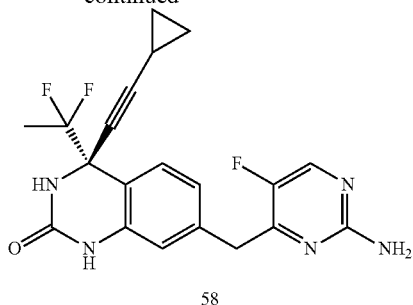

Step 1: (S)-7-((2-chloro-5-fluoropyrimidin-4-yl)methyl)-4-(cyclopropylethynyl)-4-(1,1-difluoroethyl)-3,4-dihydroquinazolin-2(1H)-one: To a solution of 2,4-dichloro-5-fluoropyrimidine (77 mg, 0.46 mmol) and intermediate B11 (100 mg, 0.31 mmol) in DMA (3.6 mL) was added NiCl$_2$(DME) (16.91 mg, 0.077 mmol), picolinimidamide (37.3 mg, 0.31 mmol), manganese (67.7 mg, 1.23 mmol) and TBAI (26.2 mg, 0.071 mmol) in the glovebox. The reaction was stirred at 70° C. for 2 h. The mixture was directly purified by prep-HPLC (MeCN:water with 0.1% TFA) to give the title compound. MS (ESI) m/z 421.1[M+H].

Step 2: (S)-tert-butyl (4-((4-(cyclopropylethynyl)-4-(1,1-difluoroethyl)-2-oxo-1,2,3,4-tetrahydroquinazolin-7-yl)methyl)-5-fluoropyrimidin-2-yl)carbamate: To a solution of (S)-7-((2-chloro-5-fluoropyrimidin-4-yl)methyl)-4-(cyclopropylethynyl)-4-(1,1-difluoroethyl)-3,4-dihydroquinazolin-2(1H)-one (20 mg, 0.048 mmol) in toluene (2 mL) were added tert-butyl carbamate (6.68 mg, 0.057 mmol), Xphos Pd G3 (4.02 mg, 4.75 μmol) and NaOtBu (9.13 mg, 0.095 mmol). The reaction was stirred at 100° C. for 16 h. The reaction was purified by prep-TLC (SiO$_2$, 50% EtOAc:PE) to give the title compound.

Step 3: (S)-7-((2-amino-5-fluoropyrimidin-4-yl)methyl)-4-(cyclopropylethynyl)-4-(1,1-difluoroethyl)-3,4-dihydroquinazolin-2(1H)-one: To a solution of (S)-tert-butyl (4-((4-(cyclopropylethynyl)-4-(1,1-difluoroethyl)-2-oxo-1,2,3,4-tetrahydroquinazolin-7-yl)methyl)-5-fluoropyrimidin-2-yl)carbamate (12 mg, 0.024 mmol) in DCM (0.5 mL) was added TFA (0.05 mL). The reaction was stirred at 25° C. for 1 h. The reaction was purified by prep-HPLC (MeCN:water with 10 mM NH$_4$HCO$_3$) to give the title compound. $^1$H NMR (400 MHz, MeCN-d$_3$) δ=8.09 (d, J=1.9 Hz, 1H), 7.57 (br s, 1H), 7.42-7.40 (d, J=7.9 Hz, 1H), 6.94-6.92 (d, J=8.1 Hz, 1H), 6.69 (s, 1H), 6.06 (br s, 1H), 5.34 (br s, 2H), 3.92 (s, 2H), 1.68-1.58 (t, J=18.8 Hz, 4H), 1.42-1.29 (m, 1H), 0.85-0.82 (dd, J=2.9, 8.3 Hz, 2H), 0.70 (br s, 2H). MS (ESI) m/z 402.2 [M+1].

Example 59: (S)-7-((2-aminopyrimidin-4-yl)methyl)-4-(cyclopropylethynyl)-6,8-difluoro-4-(trifluoromethyl)-3,4-dihydroquinazolin-2(1H)-one

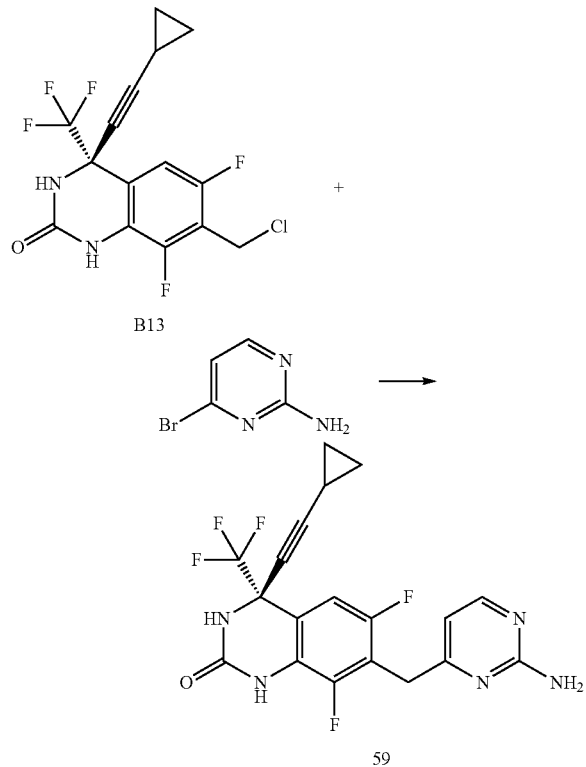

Example 59 was prepared using a procedure analogous to Example 56 except that intermediate B09 was replaced by intermediate B13 and 4-bromonicotinonitrile was replaced by 4-bromopyrimidin-2-amine. $^1$H NMR (400 MHz, MeCN-d$_3$): δ ppm 0.75-0.79 (m, 2H), 0.90-0.98 (m, 2H), 1.40-1.44 (m, 1H), 4.10 (s, 2H), 6.60 (s, 1H), 6.68-6.69 (d, J=5.2 Hz, 1H), 7.01 (s, 1H), 7.23-7.25 (d, J=8.8 Hz, 1H), 7.86 (s, 1H), 8.14 (s, 1H). MS (ESI) m/z 424.1 [M+1].

Example 60: Racemate, Isomer 60A and Isomer 60B: (S)-7-((R)-(2-aminopyrazin-4-yl)fluoromethyl)-4-(cyclopropylethynyl)-6-fluoro-4-(trifluoromethyl)-3,4-dihydroquinazolin-2(1H)-one AND (S)-7-((S)-(2-aminopyrazin-4-yl)fluoromethyl)-4-(cyclopropylethynyl)-6-fluoro-4-(trifluoromethyl)-3,4-dihydroquinazolin-2(1H)-one

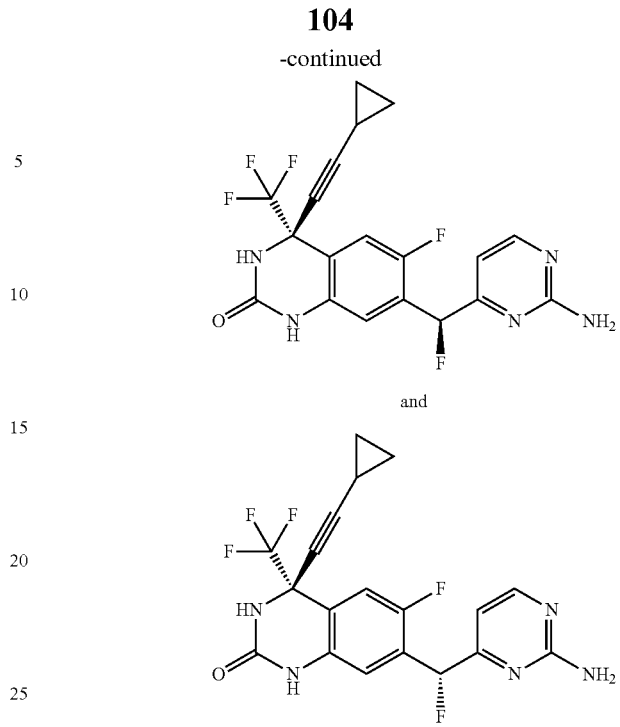

To the solution of Example 38 (15 mg, 0.037 mmol) in MeCN (2.5 ml) was added 1-chloromethyl-4-fluoro-1,4-diazoniabicyclo[2.2.2]octane bis(tetrafluoroborate) (13.76 mg, 0.039 mmol) at 25° C. Then the reaction was stirred at 50° C. for 5 h. The mixture was purified by prep-HPLC (MeCN:water with 0.1% TFA) to give the title products: Isomer 60A (faster eluting): $^1$H NMR (400 MHz, MeCN-d$_3$) δ ppm 0.74-0.82 (m, 2H), 0.90-0.92 (m, 2H), 1.37-1.47 (m, 1H), 6.55 (d, J=44 Hz, 1H), 6.57 (s, 1H), 6.89-6.91 (d, J=5.2 Hz, 1H), 7.03-7.04 (d, J=4.8 Hz, 1H), 7.39-7.42 (d, J=10.0 Hz, 1H), 7.93 (br s, 1H), 8.34-8.36 (d, J=6.0 Hz, 1H). MS (ESI) m/z 424.2 [M+1]; and Isomer 60B (slower eluting): $^1$H NMR (400 MHz, MeCN-d$_3$) δ ppm 0.71-0.81 (m, 2H), 0.90-0.92 (m, 2H), 1.34-1.46 (m, 1H), 6.56 (d, J=44 Hz, 1H), 6.57 (s, 1H), 6.90-6.91 (d, J=6.0 Hz, 1H), 7.04-7.05 (d, J=5.6 Hz, 2H), 7.18-7.20 (d, J=8.0 Hz, 1H), 7.39-7.42 (d, J=10.0 Hz, 1H), 7.97 (s, 1H), 8.34-8.35 (d, J=5.60 Hz, 1H). MS (ESI) m/z 424.2 [M+1].

Example 61: (S)-4-(cyclopropylethynyl)-7-((3-hydroxypyrazin-2-yl)methyl)-4-(trifluoromethyl)-3,4-dihydroquinazolin-2(1H)-one

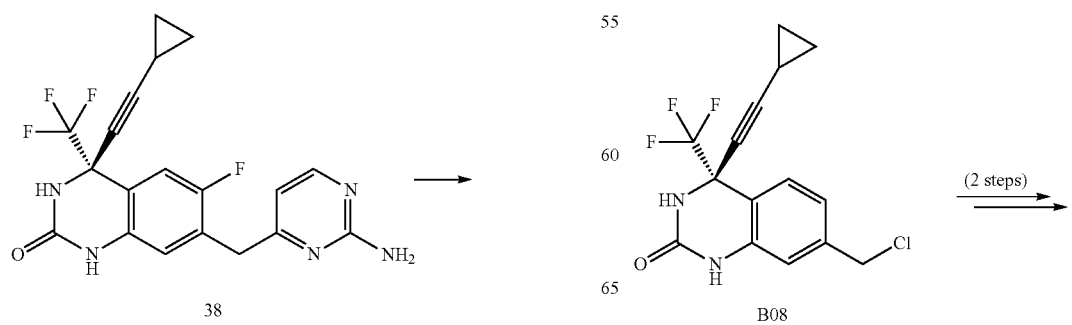

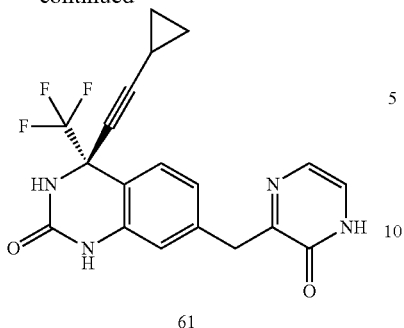

61

Step 1: (S)-7-((3-chloropyrazin-2-yl)methyl)-4-(cyclopropylethynyl)-4-(trifluoromethyl)-3,4-dihydroquinazolin-2(1H)-one: A solution of intermediate B08 (60 mg, 0.183 mmol) and 2,3-dichloropyrazine (68.0 mg, 0.46 mmol) in DME (1 ml) was transferred into the glovebox and added 4,4'-di-tert-butyl-2,2'-bipyridine (2.94 mg, 0.011 mmol), (TMS)$_3$SiH (45.4 mg, 0.183 mmol) and (Ir[dF(CF$_3$)ppy]2(dtbbpy))PF$_6$ (6.1 mg, 5.5 μmol) and NiCl$_2$(DME) (2.0 mg, 9.1 μmol) and Na$_2$CO$_3$ (38.7 mg, 0.36 mmol). The reaction mixture was bubbled with N$_2$ and capped and taken out of glove box. Then, the vial was irradiated with Integrated Photoreactor, 34 w LED blue light for 16 h at 25° C. The residue was purified by prep HPLC (MeCN:water with 0.1% TFA) to give the title compound.

Step 2: (S)-4-(cyclopropylethynyl)-7-((3-hydroxypyrazin-2-yl)methyl)-4-(trifluoromethyl)-3,4-dihydroquinazolin-2(1H)-one: A solution of (S)-7-((3-chloropyrazin-2-yl)methyl)-4-(cyclopropylethynyl)-4-(trifluoromethyl)-3,4-dihydroquinazolin-2(1H)-one (5 mg, 0.012 mmol) in AcOH (1 ml) was stirred at 130° C. for 3 h under microwave irradiation. The reaction mixture was concentrated and the resulting crude was purified by prep HPLC (MeCN:water with 0.1% TFA) to give the title product. $^1$H NMR (400 MHz, MeCN-d$_3$) δ ppm 0.70-0.71 (m, 2H), 0.84-0.88 (m, 2H), 1.33-1.37 (m, 1H), 3.97 (s, 2H), 6.32 (br s, 1H), 6.83 (s, 1H), 6.97-6.99 (d, J=7.8 Hz, 1H), 7.07-7.08 (d, J=4.3 Hz, 1H), 7.17 (d, J=4.3 Hz, 1H), 7.41-7.43 (d, J=7.7 Hz, 1H), 8.01 (br s, 1H). MS (ESI) m/z 389 [M+1].

Example 62: Racemate, Isomer 62A and Isomer 62B: (S)-6-chloro-4-(cyclopropylethynyl)-7-((2,4-dimethyl-6-oxo-1,6-dihydropyrimidin-5-yl)methyl)-4-(trifluoromethyl)-3,4-dihydroquinazolin-2(1H)-one, AND (R)-6-chloro-4-(cyclopropylethynyl)-7-((2,4-dimethyl-6-oxo-1,6-dihydropyrimidin-5-yl)methyl)-4-(trifluoromethyl)-3,4-dihydroquinazolin-2(1H)-one

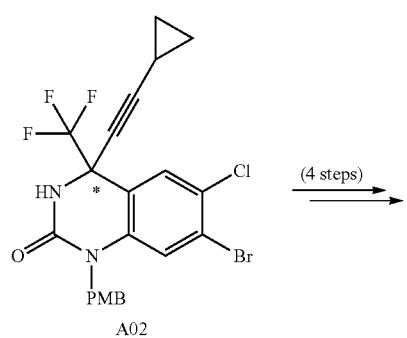

A02 (4 steps) →

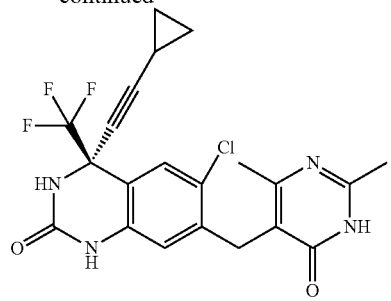

Isomer 62A

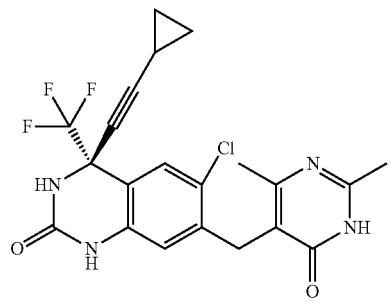 [SMILES: Cc1nc(C)c(Cc2ccc3c(c2)NC(=O)N[C@]3(C#CC2CC2)C(F)(F)F)c(=O)[nH]1]

Isomer 62B

Step 1: 6-chloro-4-(cyclopropylethynyl)-1-(4-methoxybenzyl)-7-(4,4,5,5-tetramethyl-1,3,2-dioxaborolan-2-yl)-4-(trifluoromethyl)-3,4-dihydroquinazolin-2(1H)-one: A solution of intermediate A02 (2.2 g, 4.28 mmol), BisPin (1.631 g, 6.42 mmol), and KOAc (1.261 g, 12.85 mmol) in 1,4-dioxane (44 mL) was added Pd(PPh$_3$)$_2$Cl$_2$ (0.301 g, 0.428 mmol) under N$_2$ and the resulting mixture was stirred at 80° C. for 5 h under N$_2$. The residue was purified by prep HPLC (MeCN:water with 0.05% HCl) to give the title compound. MS (ESI) m/z 434 [M+1].

Step 2: 6-chloro-4-(cyclopropylethynyl)-7-((4-methoxy-2,6-dimethylpyrimidin-5-yl)methyl)-1-(4-methoxybenzyl)-4-(trifluoromethyl)-3,4-dihydroquinazolin-2(1H)-one: To a solution of 6-chloro-4-(cyclopropylethynyl)-1-(4-methoxybenzyl)-7-(4,4,5,5-tetramethyl-1,3,2-dioxaborolan-2-yl)-4-(trifluoromethyl)-3,4-dihydroquinazolin-2(1H)-one_(800 mg, 1.671 mmol) in THF (8 mL) and water (0.8 mL) was added intermediate C05 (312 mg, 1.671 mmol), KOAc (710 mg, 3.34 mmol) and XPhos Pd G3 (263 mg, 0.334 mmol). The reaction was stirred at 100° C. for 3 h under N$_2$. The mixture was purified by flash chromatography (SiO$_2$, 0-30% EtOAc/PE) to give the title compound. MS (ESI) m/z 585.3 [M+1].

Step 3: 6-chloro-4-(cyclopropylethynyl)-7-((2,4-dimethyl-6-oxo-1,6-dihydropyrimidin-5-yl)methyl)-1-(4-methoxybenzyl)-4-(trifluoromethyl)-3,4-dihydroquinazolin-2(1H)-one: To a mixture of 6-chloro-4-(cyclopropylethynyl)-7-((4-methoxy-2,6-dimethylpyrimidin-5-yl)methyl)-1-(4-methoxybenzyl)-4-(trifluoromethyl)-3,4-dihydroquinazolin-2(1H)-one (50 mg, 0.09 mmol) in DMF (2.5 mL) was added pyridine hydrochloride (50 mg, 0.43 mmol). The reaction was stirred at 100° C. for 2 h. The reaction was dissolved in water (10 mL) and extracted with EtOAc (10 mL×3). The organic layer was washed with brine (30 mL), dried over Na$_2$SO$_4$, filtered and concentrated to give the title product, which was used in the next step as is.

Step 4: 6-chloro-4-(cyclopropylethynyl)-7-((2,4-dimethyl-6-oxo-1,6-dihydropyrimidin-5-yl)methyl)-4-(trifluoromethyl)-3,4-dihydroquinazolin-2(1H)-one: To a stirred solution of 6-chloro-4-(cyclopropylethynyl)-7-((2,4-dimethyl-6-oxo-1,6-dihydropyrimidin-5-yl)methyl)-1-(4-methoxybenzyl)-4-(trifluoromethyl)-3,4-dihydroquinazolin-2(1H)-one (50 mg, 0.09 mmol) in MeCN (1 mL) and water (0.33 mL) was added CAN (192 mg, 0.35 mmol) and the mixture was stirred at 40° C. for 1 h. The reaction was dissolved in water (10 mL) and extracted with EtOAc (10 mL×3). The organic layer was washed with brine (30 mL), dried over $Na_2SO_4$, filtered and concentrated. The crude product was purified by prep-HPLC (MeCN:water with 0.1% TFA). The resulting racemic product was separated by SFC (DAICEL CHIRALPAK AS, 40% MeOH (0.1% $NH_3H_2O$)/C02, 70 mL/min, 40° C.) to give: Isomer 62A (faster eluting): $^1$H NMR (400 MHz, MeOH-$d_4$): δ ppm 7.48 (s, 1H), 6.52 (s, 1H), 3.93 (s, 2H), 2.40 (s, 3H), 2.23 (s, 3H), 1.38-1.50 (m, 1H), 0.90-0.94 (m, 2H), 0.78 (dq, J=4.9, 3.3 Hz, 2H). MS (ESI) m/z 451.1 [M+1]; and Isomer 62B (slower eluting): $^1$H NMR (400 MHz, MeOH-$d_4$): δ ppm 7.48 (s, 1H), 6.51 (s, 1H), 4.10 (q, J=7.1 Hz, 1H), 3.92 (s, 2H), 2.39 (s, 3H), 2.22 (s, 3H), 1.38-1.48 (m, 1H), 0.86-0.95 (m, 2H), 0.77 (dq, J=4.9, 3.3 Hz, 2H). MS (ESI) m/z 451.1 [M+1]

Example 63: (S)-4-(cyclopropylethynyl)-7-((2-(hydroxymethyl)-4-methyl-6-oxo-1,6-dihydropyrimidin-5-yl)methyl)-4-(trifluoromethyl)-3,4-dihydroquinazolin-2(1H)-one

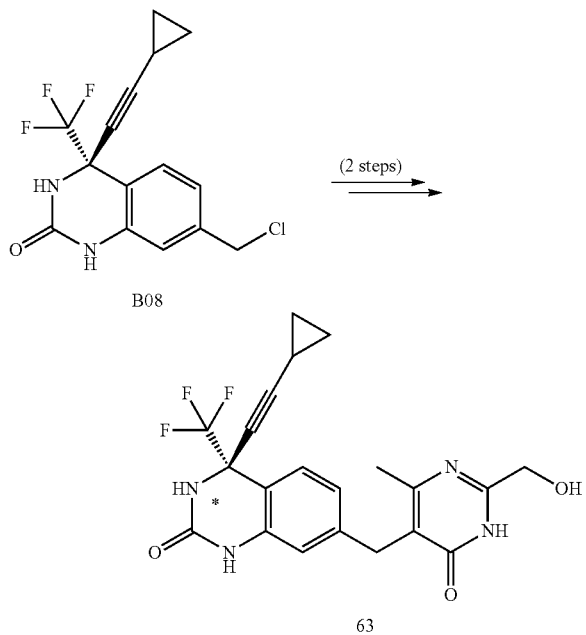

Step 1: ethyl 2-(((S)-4-(cyclopropylethynyl)-2-oxo-4-(trifluoromethyl)-1,2,3,4-tetrahydroquinazolin-7-yl)methyl)-3-oxobutanoate: To a solution of intermediate B08 (100 mg, 0.304 mmol) and ethyl 3-oxobutanoate (396 mg, 3.04 mmol) and sodium ethoxide (31.1 mg, 0.456 mmol) in EtOH (2 mL) was stirred 80° C. for 16 h. The reaction mixture was concentrated and purified by prep-TLC ($SiO_2$, 50% EtOAc/PE) to give the title compound.

Step 2: (S)-4-(cyclopropylethynyl)-7-((2-(hydroxymethyl)-4-methyl-6-oxo-1,6-dihydropyrimidin-5-yl)methyl)-4-(trifluoromethyl)-3,4-dihydroquinazolin-2(1H)-one: A mixture of ethyl 2-(((S)-4-(cyclopropylethynyl)-2-oxo-4-(trifluoromethyl)-1,2,3,4-tetrahydroquinazolin-7-yl)methyl)-3-oxobutanoate (50 mg, 0.118 mmol), 2-hydroxyacetamidamide hydrochloride (52.3 mg, 0.47 mmol) and $K_2CO_3$ (48.8 mg, 0.35 mmol) in EtOH (1 mL) was stirred at 40° C. for 12 h. The reaction mixture was concentrated and purified by prep-HPLC (MeCN:water with 0.1% TFA) to give the title compound. $^1$H NMR (400 MHz, MeOH-$d_4$) δ ppm 0.72-0.77 (m, 2H), 0.85-0.91 (m, 2H), 1.36-1.44 (m, 1H), 2.31 (s, 3H), 3.88 (s, 2H), 4.48 (s, 2H), 6.72 (s, 1H), 6.92-6.98 (d, J=7.9 Hz, 1H), 7.40 (d, J=7.9 Hz, 1H). MS (ESI) m/z 433.2 [M+1].

Determination of Cell Kill (HIV-TACK) Activity:

PBMCs derived from healthy donors were grown in complete media (RPMI 1640 with L-glutamine; 10% heat inactivated Fetal Bovine Serum; 100 U/mL Penicillin-Streptomycin) containing 5 μg/mL Phytohemagglutinin at about 2.5×106 cells/mL for 3 days at 5% C02, 37° C., and 90% humidity. On day 4, PHA stimulated cells were washed and resuspended at about 20×106 cells/mL in complete media with IL-2 (10 U/mL) with VSV-G pseudotyped HIV virus stock (VSV-G/pNLG1-P2A-ΔEnv-20 μg/mL p24) and incubated for 4 hours at 37° C., 5% C02 and 90% humidity. VSV-G/pNLG1-P2A-ΔEnv is a VSV-G pseudotyped virus derived from pNL43 with egfp inserted 5' of nef and eGFP expression driven off normal spliced RNA transcripts. Virus contained Vif truncated by 50 amino acids due to deletion of a single nucleotide causing a frameshift and does not express Nef due to a stop codon after gfp. HIV Env is not expressed due to a frameshift resulting in multiple stop codons. Infected cells were then washed with complete media plus 10 U/mL IL-2 3-times with centrifuging at 200×g for 3 minutes at 22° C. Cells were resuspended at 5×106 cells/mL in complete media plus 10 U/mL IL-2 and incubated overnight at 37° C., 5% CO2 and 90% humidity.

For compound treatment infected PBMCs were diluted to 4×105 cells/mL with RPMI 1640 with L-glutamine, 50% Normal Human Serum (NHS), 100 U/mL Penicillin-Streptomycin plus IL-2 (10 U/mL) and 20,000 cells were transferred to each well in a 384-well poly-D-lysine coated compound plate containing compounds with final DMSO <0.5%. Compounds were tested with 10-point 3-fold titration. Plates were analyzed on an Acumen ex3 imager using the Blue Laser 488 nm and the number of GFP positive objects were collected with loss of GFP representing death of infected cells. Titration curves and EC50 values were calculated using a four-parameter logistic fit. Results are shown in Table 9.

TABLE 9

| Ex. No. | TACK $EC_{50}$ (nM) |
| --- | --- |
| 1 | 120 |
| 2 | 132 |
| 3 | 237 |
| 4 | 148 |
| 5 | 160 |
| 6 | 284 |
| 7 | 230 |
| 8 | 262 |
| 9 | 193 |
| 10 | 380 |
| 11 | 257 |
| 12 | 132 |
| 13 | 130 |

TABLE 9-continued

| Ex. No. | TACK EC$_{50}$ (nM) |
|---|---|
| 14 | 121 |
| 15 | 21.4 |
| 16 | 153 |
| 17 | 46 |
| 18 | 174 |
| 19 | 136 |
| 20 | 115 |
| 21 | 139 |
| 22 | 230 |
| 23 | 151 |
| 24 | 146 |
| 25 | 45.5 |
| 26 | 31.2 |
| 27 | 152 |
| 28 | 144 |
| 29 | 49.7 |
| 30 | 64.7 |
| 31 | 58.7 |
| 32 | 156 |
| 33 | 183 |
| 34 | 155 |
| 35 | 106 |
| 36 | 155 |
| 37 | 168 |
| 38 | 38.6 |
| 39 | 60.3 |
| 40 | 41.6 |
| 41 | 90.7 |
| 42 | 161 |
| 43 | 166 |
| 44 | 180 |
| 45 | 53.2 |
| 46 | 108 |
| 47 | 17.1 |
| 48 | 142 |
| 49 | 146 |
| 50 | 34.9 |
| 51 | 96.4 |
| 52 | 21.4 |
| 53 | 137 |
| 54 | 67.3 |
| 55 | 191 |
| 56 | 83.5 |
| 57 | 120 |
| 58 | 82.8 |
| 59 | 122 |
| 60A | 146 |
| 60B | 86.3 |
| 61 | 65 |
| 62B | 68.7 |
| 63 | 176 |

What is claimed is:

1. A compound of Formula I:

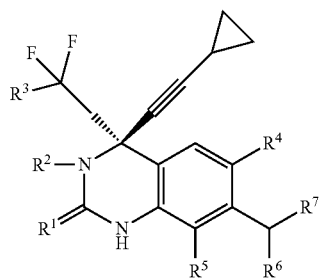

or a pharmaceutically acceptable salt thereof, wherein:

$R^1$ is O or S;

$R^2$ is —H or —$C_{1-8}$alkyl unsubstituted or substituted with 1 to 17 of F;

$R^3$ is halo or —$C_{1-8}$alkyl unsubstituted or substituted with 1 to 17 of F;

$R^4$ is —H, halo, or —$C_{1-8}$alkyl;

$R^5$ is —H or halo;

$R^6$ is —H or halo; and $R^7$ is a 6-membered ring selected from (a) phenyl and (b) a heteroaryl of carbon atoms and 1, 2 or 3 nitrogen atoms, wherein one of the nitrogen atoms may optionally be in the form of an N-oxide, wherein the heteroaryl ring is attached by a carbon atom in the ring to the adjacent carbon atom in —C($R^6$)—; and wherein the 6-membered ring is unsubstituted or substituted with one or more substituents up to the maximum number allowed by valence, independently selected at each occurrence from:

(i) halo, (ii) —CN, (iii) —NR$^{8a}$R$^{9a}$, (iv) —S(O)$_2$NR$^{8b}$R$^{9b}$, (v) —C(O)NR$^{8c}$R$^{9c}$, (vi) —S(O)$_2$C$_{1-8}$alkyl, and (vii) oxo (=O), (viii) —C$_{1-8}$alkyl unsubstituted or substituted with 1 to 8 substituents independently selected at each occurrence from —OH and halo, (ix) —O—(C$_{1-8}$alkyl) unsubstituted or substituted with 1 to 8 substituents independently selected at each occurrence from —OH and halo, and (x) —C$_{3-6}$cycloalkyl unsubstituted or substituted with 2 to 5 substituents independently selected at each occurrence from —OH and halo; and R$^{8a}$, R$^{8b}$, R$^{8c}$, R$^{9a}$, R$^{9b}$ and R$^{9c}$ are each independently selected at each occurrence from —H and —C$_{1-8}$alkyl unsubstituted or substituted with 1 to 8 substituents independently selected at each occurrence from —OH and halo.

2. The compound of claim 1 or a pharmaceutically acceptable salt thereof, wherein $R^2$ is (i) —H, or (ii) an alkyl group selected from —C$_{1-6}$alkyl, —C$_{1-5}$alkyl, —C$_{1-4}$alkyl, or —C$_{1-3}$alkyl, wherein the alkyl group is unsubstituted or substituted with one or more of —F up to the maximum number allowed by valence.

3. The compound of claim 2 or a pharmaceutically acceptable salt thereof, wherein $R^3$ is (i) halo or (ii) an alkyl group selected from —C$_{1-6}$alkyl, —C$_{1-5}$alkyl, —C$_{1-4}$alkyl, or —C$_{1-3}$alkyl, wherein the alkyl group is unsubstituted or substituted with one or more of halo up to the maximum number allowed by valence.

4. The compound of claim 3 or a pharmaceutically acceptable salt thereof, wherein $R^4$ is —H, halo or —C$_{1-6}$alkyl.

5. The compound of claim 4 or a pharmaceutically acceptable salt thereof, wherein $R^5$ is —H, F, Cl or Br.

6. The compound of claim 5 or a pharmaceutically acceptable salt thereof, wherein $R^6$ is —H, F, Cl or Br.

7. The compound of claim 6 or a pharmaceutically acceptable salt thereof, wherein R$^{8a}$, R$^{8b}$, R$^{8c}$, R$^{9a}$, R$^{9b}$ and R$^{9c}$ are each independently selected from —H or —C$_{1-6}$alkyl unsubstituted or substituted with 1 to 6 substituents independently selected at each occurrence from —OH and halo.

8. The compound of claim 1, or a pharmaceutically acceptable salt thereof wherein $R^1$ is O.

9. The compound of claim 1, or a pharmaceutically acceptable salt thereof wherein $R^1$ is S.

10. The compound of claim 1, or a pharmaceutically acceptable salt thereof, wherein $R^7$ is a 6-membered ring selected from phenyl, pyridine, pyridinone, pyridine n-oxide, pyrimidine, pyrimidinone, pyrazine and triazine, unsubstituted or substituted with one or more substituents up to the maximum number allowed by valence, independently selected at each occurrence from:
(i) halo, (ii) —CN, (iii) —NR$^{8a}$R$^{9a}$, (iv) —S(O)$_2$NR$^{8b}$R$^{9b}$, (v) —C(O)NR$^{8c}$R$^{9c}$,
(vi) —S(O)$_2$C$_{1-8}$alkyl,
(vii) —C$_{1-8}$alkyl unsubstituted or substituted with 1 to 8 substituents independently selected at each occurrence from —OH and halo,
(viii) —O—(C$_{1-8}$alkyl) unsubstituted or substituted with 1 to 8 substituents independently selected at each occurrence from —OH and halo, and
(ix) —C$_{3-6}$cycloalkyl unsubstituted or substituted with 2 to 5 substituents independently selected at each occurrence from —OH and halo; and
R$^{8a}$, R$^{8b}$, R$^{8c}$, R$^{9a}$, R$^{9b}$ and R$^{9c}$ are each independently selected at each occurrence from —H and —C$_{1-8}$alkyl unsubstituted or substituted with 1 to 8 substituents independently selected at each occurrence from —OH and halo.

11. The compound of claim 1, or a pharmaceutically acceptable salt thereof wherein, R$^1$ is O or S; R$^2$ is —H or —C$_{1-6}$alkyl unsubstituted or substituted with 1 to 13 of —F; R$^3$ is halo or —C$_{1-6}$alkyl; R$^4$ is —H, -halo or C$_{1-6}$alkyl; R$^5$ is —H, —F or —Cl; R$^6$ is —H, —F or —Cl; wherein the 6-membered ring of R$^7$ is unsubstituted or substituted with one or more substituents up to the maximum number allowed by valence, independently selected at each occurrence from:
(i) halo, (ii) —CN, (iii) —NR$^{8a}$R$^{9a}$, (iv) —S(O)$_2$NR$^{8b}$R$^{9b}$, (v) —C(O)NR$^{8c}$R$^{9c}$,
(vi) —S(O)$_2$C$_{1-6}$alkyl, (vii) —C$_{1-6}$alkyl unsubstituted or substituted with 1 to 6 substituents independently selected at each occurrence from —OH and halo, and
(viii) —O—(C$_{1-6}$alkyl) unsubstituted or substituted with 1 to 6 substituents independently selected at each occurrence from —OH and halo; and
R$^{8a}$, R$^{8b}$, R$^{8c}$, R$^{9a}$, R$^{9b}$ and R$^{9c}$ are each independently selected from —H or —C$_{1-6}$alkyl unsubstituted or substituted with 1 to 6 substituents independently selected at each occurrence from —OH and halo.

12. The compound of claim 1 having Formula II

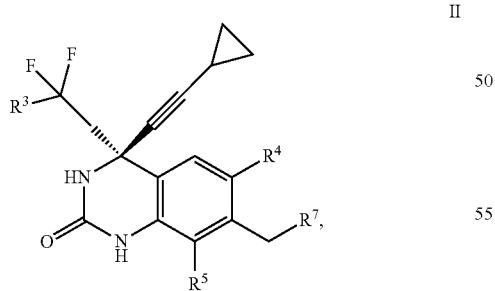

II or a pharmaceutically acceptable salt thereof.

13. The compound of claim 12, or a pharmaceutically acceptable salt thereof, wherein R$^3$ is halo or —C$_{1-6}$alkyl.

14. The compound of claim 13, or a pharmaceutically acceptable salt thereof, wherein R$^4$ is is —H, halo or —C$_{1-6}$alkyl.

15. The compound of claim 13, or a pharmaceutically acceptable salt thereof, wherein R$^5$ is —H, —F, —Cl or Br.

16. The compound of claim 15, or a pharmaceutically acceptable salt thereof, wherein R$^7$ is selected from:

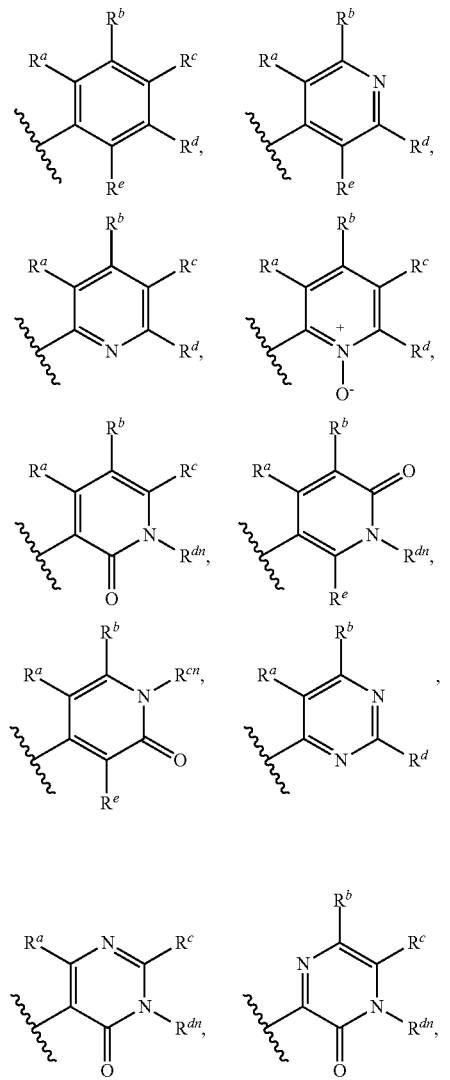

R$^a$ is —H, —C$_{1-6}$alkyl or halo;
R$^b$ is —H, halo, —CN or —C$_{1-6}$alkyl;
R$^c$ is (i) —H, (ii) —C$_{1-6}$alkyl unsubstituted or substituted with —OH, (iii) —OC$_{1-6}$alkyl unsubstituted or substituted with —OH; or (iv) —SO$_2$NR$^8$R$^9$, (v) SO$_2$—C$_{1-3}$alkyl or (vi) —C(O)NR$^8$R$^9$;
R$^{cn}$ is —H or —C$_{1-3}$alkyl;
R$^d$ is —H, —NR$^8$R$^9$ or —C$_{1-6}$alkyl;
R$^{dn}$ is —H or —C$_{1-3}$alkyl; and
R$^e$ is —H, halo, —CN or —C(O)NR$^8$R$^9$.

17. The compound of claim 1 that is:

(S)-4-(cyclopropylethynyl)-7-((6-methyl-2-oxo-1,2-dihydropyridin-3-yl)methyl)-4-(trifluoromethyl)-3,4-dihydroquinazolin-2(1H)-one;
(S)-4-(cyclopropylethynyl)-7-((4-methyl-2-oxo-1,2-dihydropyridin-3-yl)methyl)-4-(trifluoromethyl)-3,4-dihydroquinazolin-2(1H)-one;
(S)-4-(cyclopropylethynyl)-7-((2-oxo-1,2-dihydropyridin-3-yl)methyl)-4-(trifluoromethyl)-3,4-dihydroquinazolin-2(1H)-one;
(S)-4-(cyclopropylethynyl)-7-((1-methyl-6-oxo-1,6-dihydropyridin-3-yl)methyl)-4-(trifluoromethyl)-3,4-dihydroquinazolin-2(1H)-one;
(S)-4-(cyclopropylethynyl)-7-((1-methyl-2-oxo-1,2-dihydropyridin-4-yl)methyl)-4-(trifluoromethyl)-3,4-dihydroquinazolin-2(1H)-one;
(S)-4-((4-(cyclopropylethynyl)-2-oxo-4-(trifluoromethyl)-1,2,3,4-tetrahydroquinazolin-7-yl)methyl)-3-fluorobenzenesulfonamide;
(S)-2-amino-4-((4-(cyclopropylethynyl)-2-oxo-4-(trifluoromethyl)-1,2,3,4-tetrahydroquinazolin-7-yl)methyl)benzenesulfonamide;
(S)-4-((4-(cyclopropylethynyl)-2-oxo-4-(trifluoromethyl)-1,2,3,4-tetrahydroquinazolin-7-yl)methyl)benzamide;
(S)-4-((4-(cyclopropylethynyl)-2-oxo-4-(trifluoromethyl)-1,2,3,4-tetrahydroquinazolin-7-yl)methyl)benzenesulfonamide;
(S)-4-(cyclopropylethynyl)-6-fluoro-7-(4-(methylsulfonyl)benzyl)-4-(trifluoromethyl)-3,4-dihydroquinazolin-2(1H)-one;
(S)-4-((4-(cyclopropylethynyl)-6-fluoro-2-oxo-4-(trifluoromethyl)-1,2,3,4-tetrahydroquinazolin-7-yl)methyl)benzenesulfonamide;
(S)-2-amino-4-((4-(cyclopropylethynyl)-2-oxo-4-(trifluoromethyl)-1,2,3,4-tetrahydroquinazolin-7-yl)methyl)pyridin-1-ium 2,2,2-trifluoroacetate;
(S)-2-amino-6-((4-(cyclopropylethynyl)-6-fluoro-2-oxo-4-(trifluoromethyl)-1,2,3,4-tetrahydroquinazolin-7-yl)methyl)pyridin-1-ium 2,2,2-trifluoroacetate;
(S)-2-amino-4-((4-(cyclopropylethynyl)-6-fluoro-2-oxo-4-(trifluoromethyl)-1,2,3,4-tetrahydroquinazolin-7-yl)methyl)pyridin-1-ium 2,2,2-trifluoroacetate;
(S)-7-((2-amino-5-fluoropyrimidin-4-yl)methyl)-4-(cyclopropylethynyl)-4-(trifluoromethyl)-3,4-dihydroquinazolin-2(1H)-one;
(S)-4-(cyclopropylethynyl)-7-((2-methyl-6-oxo-1,6-dihydropyrimidin-5-yl)methyl)-4-(trifluoromethyl)-3,4-dihydroquinazolin-2(1H)-one;
(S)-4-(cyclopropylethynyl)-7-((2,4-dimethyl-6-oxo-1,6-dihydropyrimidin-5-yl)methyl)-6-fluoro-4-(trifluoromethyl)-3,4-dihydroquinazolin-2(1H)-one;
(S)-4-(cyclopropylethynyl)-7-((4-methyl-6-oxo-1,6-dihydropyrimidin-5-yl)methyl)-4-(trifluoromethyl)-3,4-dihydroquinazolin-2(1H)-one;
(S)-4-(cyclopropylethynyl)-7-((2,4-dimethyl-6-oxo-1,6-dihydropyrimidin-5-yl)methyl)-4-(trifluoromethyl)-3,4-dihydroquinazolin-2(1H)-one;
(S)-4-((4-(cyclopropylethynyl)-4-(1,1-difluoroethyl)-2-oxo-1,2,3,4-tetrahydroquinazolin-7-yl)methyl)benzenesulfonamide;
(S)-4-(cyclopropylethynyl)-7-((2,4-dimethyl-6-oxo-1,6-dihydropyrimidin-5-yl)methyl)-3-ethyl-4-(trifluoromethyl)-3,4-dihydroquinazolin-2(1H)-one;
(S)-4-(cyclopropylethynyl)-7-((2,4-dimethyl-6-oxo-1,6-dihydropyrimidin-5-yl)methyl)-3-ethyl-4-(trifluoromethyl)-3,4-dihydroquinazolin-2(1H)-one;
(S)-4-(cyclopropylethynyl)-7-((2,4-dimethyl-6-oxo-1,6-dihydropyrimidin-5-yl)methyl)-3-isopropyl-4-(trifluoromethyl)-3,4-dihydroquinazolin-2(1H)-one;
(S)-4-(cyclopropylethynyl)-3-(2,2-difluoroethyl)-7-((2,4-dimethyl-6-oxo-1,6-dihydropyrimidin-5-yl)methyl)-4-(trifluoromethyl)-3,4-dihydroquinazolin-2(1H)-one;
(S)-7-((2-aminopyrimidin-4-yl)methyl)-4-(cyclopropylethynyl)-4-(trifluoromethyl)-3,4-dihydroquinazolin-2(1H)-one;
(S)-7-((2-aminopyrimidin-4-yl)methyl)-4-(cyclopropylethynyl)-4-(1,1-difluoroethyl)-3,4-dihydroquinazolin-2(1H)-one;
(S)-7-((2-amino-6-methylpyrimidin-4-yl)methyl)-4-(cyclopropylethynyl)-4-(trifluoromethyl)-3,4-dihydroquinazolin-2(1H)-one;
(S)-7-((2-amino-5-chloropyrimidin-4-yl)methyl)-4-(cyclopropylethynyl)-4-(trifluoromethyl)-3,4-dihydroquinazolin-2(1H)-one;
(S)-7-((2-amino-5-fluoropyrimidin-4-yl)methyl)-4-(cyclopropylethynyl)-6-fluoro-4-(trifluoromethyl)-3,4-dihydroquinazolin-2(1H)-one;
(S)-7-((2-aminopyrimidin-4-yl)methyl)-6-chloro-4-(cyclopropylethynyl)-3-methyl-4-(trifluoromethyl)-3,4-dihydroquinazolin-2(1H)-one;
(S)-7-((2-aminopyrimidin-4-yl)methyl)-6-chloro-4-(cyclopropylethynyl)-4-(trifluoromethyl)-3,4-dihydroquinazolin-2(1H)-one;
(S)-7-((2-amino-5-fluoropyrimidin-4-yl)methyl)-6-chloro-4-(cyclopropylethynyl)-4-(trifluoromethyl)-3,4-dihydroquinazolin-2(1H)-one;
(S)-7-((2-aminopyrimidin-4-yl)methyl)-4-(cyclopropylethynyl)-6-methyl-4-(trifluoromethyl)-3,4-dihydroquinazolin-2(1H)-one;
(S)-7-((2-amino-5-methylpyrimidin-4-yl)methyl)-4-(cyclopropylethynyl)-4-(trifluoromethyl)-3,4-dihydroquinazolin-2(1H)-one;
(S)-7-((6-aminopyridin-2-yl)methyl)-4-(cyclopropylethynyl)-4-(trifluoromethyl)-3,4-dihydroquinazolin-2(1H)-one;
(S)-7-((6-amino-3-fluoropyridin-2-yl)methyl)-4-(cyclopropylethynyl)-4-(trifluoromethyl)-3,4-dihydroquinazolin-2(1H)-one;
(S)-7-((2-amino-5-fluoropyridin-4-yl)methyl)-4-(cyclopropylethynyl)-4-(trifluoromethyl)-3,4-dihydroquinazolin-2(1H)-one;
(S)-7-((2-aminopyrimidin-4-yl)methyl)-4-(cyclopropylethynyl)-6-fluoro-4-(trifluoromethyl)-3,4-dihydroquinazolin-2(1H)-one;
(S)-7-((2-aminopyrimidin-4-yl)methyl)-4-(cyclopropylethynyl)-3-methyl-4-(trifluoromethyl)-3,4-dihydroquinazolin-2(1H)-one;

-continued (S)-7-((2-aminopyrimidin-4-yl)methyl)-4-(cyclopropylethynyl)-6-fluoro-3-methyl-4-(trifluoromethyl)-3,4-dihydroquinazolin-2(1H)-one;
(S)-2-((4-(cyclopropylethynyl)-6-fluoro-2-oxo-4-(trifluoromethyl)-1,2,3,4-tetrahydroquinazolin-7-yl)methyl)-5-(hydroxymethyl)pyridin-1-ium 2,2,2-trifluoroacetate;
(S)-4-(cyclopropylethynyl)-6-fluoro-7-((5-(2-hydroxyethoxy)pyridin-2-yl)methyl)-4-(trifluoromethyl)-3,4-dihydroquinazolin-2(1H)-one;
(S)-4-cyano-2-((4-(cyclopropylethynyl)-6-fluoro-2-oxo-4-(trifluoromethyl)-1,2,3,4-tetrahydroquinazolin-7-yl)methyl)-5-(2-hydroxyethoxy)pyridine 1-oxide;
(S)-4-((4-(cyclopropylethynyl)-2-thioxo-4-(trifluoromethyl)-1,2,3,4-tetrahydroquinazolin-7-yl)methyl)benzenesulfonamide;
(S)-7-((6-amino-5-(hydroxymethyl)pyridin-2-yl)methyl)-4-(cyclopropylethynyl)-4-(trifluoromethyl)-3,4-dihydroquinazolin-2(1H)-one;
(S)-7-((6-amino-5-(hydroxymethyl)pyrazin-2-yl)methyl)-4-(cyclopropylethynyl)-6-fluoro-4-(trifluoromethyl)-3,4-dihydroquinazolin-2(1H)-one;
(S)-7-((2-aminopyrimidin-4-yl)methyl)-4-(cyclopropylethynyl)-4-(1,1-difluoroethyl)-6-fluoro-3,4-dihydroquinazolin-2(1H)-one;
(S)-7-((2-amino-6-chloropyrimidin-4-yl)methyl)-4-(cyclopropylethynyl)-4-(trifluoromethyl)-3,4-dihydroquinazolin-2(1H)-one;
(S)-7-((4-amino-1,3,5-triazin-2-yl)methyl)-4-(cyclopropylethynyl)-4-(trifluoromethyl)-3,4-dihydroquinazolin-2(1H)-one;
(S)-2-amino-4-((4-(cyclopropylethynyl)-2-oxo-4-(trifluoromethyl)-1,2,3,4-tetrahydroquinazolin-7-yl)methyl)nicotinonitrile;
(S)-4-(cyclopropylethynyl)-6-fluoro-7-(pyrazin-2-ylmethyl)-4-(trifluoromethyl)-3,4-dihydroquinazolin-2(1H)-one;
(S)-2-amino-4-((4-(cyclopropylethynyl)-6-fluoro-2-oxo-4-(trifluoromethyl)-1,2,3,4-tetrahydroquinazolin-7-yl)methyl)nicotinonitrile;
(S)-4-(cyclopropylethynyl)-6-fluoro-7-(pyridin-2-ylmethyl)-4-(trifluoromethyl)-3,4-dihydroquinazolin-2(1H)-one;
(S)-7-((6-aminopyrazin-2-yl)methyl)-4-(cyclopropylethynyl)-4-(trifluoromethyl)-3,4-dihydroquinazolin-2(1H)-one;
(S)-2-amino-4-((4-(cyclopropylethynyl)-2-oxo-4-(trifluoromethyl)-1,2,3,4-tetrahydroquinazolin-7-yl)methyl)nicotinamide;
(S)-4-((4-(cyclopropylethynyl)-6-fluoro-2-oxo-4-(trifluoromethyl)-1,2,3,4-tetrahydroquinazolin-7-yl)methyl)nicotinonitrile;
(S)-4-(cyclopropylethynyl)-6-fluoro-7-(pyridin-4-ylmethyl)-4-(trifluoromethyl)-3,4-dihydroquinazolin-2(1H)-one;
(S)-7-((2-amino-5-fluoropyrimidin-4-yl)methyl)-4-(cyclopropylethynyl)-4-(1,1-difluoroethyl)-3,4-dihydroquinazolin-2(1H)-one;
(S)-7-((2-aminopyrimidin-4-yl)methyl)-4-(cyclopropylethynyl)-6,8-difluoro-4-(trifluoromethyl)-3,4-dihydroquinazolin-2(1H)-one;
(S)-7-((R)-(2-aminopyrazin-4-yl)fluoromethyl)-4-(cyclopropylethynyl)-6-fluoro-4-(trifluoromethyl)-3,4-dihydroquinazolin-2(1H)-one;
(S)-7-((S)-(2-aminopyrazin-4-yl)fluoromethyl)-4-(cyclopropylethynyl)-6-fluoro-4-(trifluoromethyl)-3,4-dihydroquinazolin-2(1H)-one;
(S)-4-(cyclopropylethynyl)-7-((3-hydroxypyrazin-2-yl)methyl)-4-(trifluoromethyl)-3,4-dihydroquinazolin-2(1H)-one;
(S)-6-chloro-4-(cyclopropylethynyl)-7-((2,4-dimethyl-6-oxo-1,6-dihydropyrimidin-5-yl)methyl)-4-(trifluoromethyl)-3,4-dihydroquinazolin-2(1H)-one;
(S)-4-(cyclopropylethynyl)-7-((2-(hydroxymethyl)-4-methyl-6-oxo-1,6-dihydropyrimidin-5-yl)methyl)-4-(trifluoromethyl)-3,4-dihydroquinazolin-2(1H)-one;

or a pharmaceutically acceptable salt thereof.

18. A pharmaceutical composition comprising an effective amount of the compound according to claim 1, or a pharmaceutically acceptable salt thereof, and a pharmaceutically acceptable carrier.

19. The pharmaceutical composition of claim 18 further comprising an effective amount of one or more compatible HIV antiviral gents selected from nucleoside or nucleotide HIV reverse transcriptase inhibitors, nucleoside or nucleotide reverse transcriptase translocation inhibitors, non-nucleoside HIV reverse transcriptase inhibitors, HIV integrase inhibitors, HIV fusion inhibitors, HIV entry inhibitors, HIV maturation inhibitors, post-attachment inhibitors and latency reversing agents.

20. A method for the treatment or prophylaxis of infection by HIV, or for the treatment, prophylaxis or delay in the onset or progression of AIDS or ARC in a human subject in need thereof which comprises administering to the subject an effective amount of the compound according to claim 1, or a pharmaceutically acceptable salt thereof.

21. A method for eliciting GAG-POL dimerization in HIV-infected cells in a human subject in need thereof which comprises administering to the subject an effective amount of the compound according to claim 1, or a pharmaceutically acceptable salt thereof.

22. A method for selectively killing HIV infected GAG-POL expressing cells in a human subject which comprises administering to the subject an effective amount of the compound according to claim 1, or a pharmaceutically acceptable salt thereof.

23. A method for selectively killing HIV infected GAG-POL expressing cells without concomitant cytotoxicity to HIV naïve cells in a human subject which comprises administering to the human subject an effective amount of the compound according to claim 1, or a pharmaceutically acceptable salt thereof.

24. A method for augmenting the suppression of HIV viremia in a human subject whose viremia is being suppressed by administration of one or more compatible HIV antiviral agents, which comprises additionally administering to the subject an effective amount of the compound according to claim 1, or a pharmaceutically acceptable salt thereof.

25. The method of claim 24 further comprising administering to the human subject an effective amount of one or more additional compatible HIV antiviral agents selected from nucleoside or nucleotide HIV reverse transcriptase inhibitors, nucleoside reverse transcriptase translocation inhibitors, non-nucleoside HIV reverse transcriptase inhibitors, HIV integrase inhibitors, HIV fusion inhibitors, HIV entry inhibitors, HIV maturation inhibitors, post-attachment inhibitors and latency reversing agents.

* * * * *